United States Patent
Martín Palma et al.

(10) Patent No.: US 12,492,403 B2
(45) Date of Patent: Dec. 9, 2025

(54) APTAMERS AND THE USE THEREOF IN THE TREATMENT OF CANCER

(71) Applicant: FUNDACIÓN PARA LA INVESTIGACIÓN BIOMÉDICA DEL HOSPITAL RAMÓN Y CAJAL, Madrid (ES)

(72) Inventors: María Elena Martín Palma, Madrid (ES); Víctor Manuel González Muñoz, Madrid (ES); Celia Pinto Díez, Madrid (ES); Raquel Ferreras Martín, Madrid (ES)

(73) Assignee: FUNDACIÓN PARA LA INVESTIGACIÓN BIOMÉDICA DEL HOSPITAL RAMÓN Y CAJAL, Madrid (ES)

( * ) Notice: Subject to any disclaimer, the term of this patent is extended or adjusted under 35 U.S.C. 154(b) by 43 days.

(21) Appl. No.: 17/299,110

(22) PCT Filed: Dec. 3, 2019

(86) PCT No.: PCT/EP2019/083547
§ 371 (c)(1),
(2) Date: Jun. 2, 2021

(87) PCT Pub. No.: WO2020/115072
PCT Pub. Date: Jun. 11, 2020

(65) Prior Publication Data
US 2022/0042018 A1 Feb. 10, 2022

(30) Foreign Application Priority Data

Dec. 3, 2018 (EP) ..................................... 18382888

(51) Int. Cl.
*C12N 15/115* (2010.01)
(52) U.S. Cl.
CPC ........ *C12N 15/115* (2013.01); *C12N 2310/16* (2013.01)
(58) Field of Classification Search
CPC .......................... C12N 15/115; C12N 2310/16
See application file for complete search history.

(56) References Cited

U.S. PATENT DOCUMENTS 10,907,156 B2 2/2021 Bermejo et al.
2020/0270310 A1 8/2020 Ibáñez De Cáceres et al.

FOREIGN PATENT DOCUMENTS

WO  03/037362 A2  5/2003

OTHER PUBLICATIONS

Morita, Y., Leslie, M., Kameyama, H., Volk, D. E., & Tanaka, T. (2018). Aptamer therapeutics in cancer: current and future. Cancers, 10(3), 80. (Year: 2018).*
Hori, S. I., Herrera, A., Rossi, J. J., & Zhou, J. (2018). Current advances in aptamers for cancer diagnosis and therapy. Cancers, 10 (1), 9. (Year: 2018).*
Ruiz Ciancio, D., Vargas, M. R., Thiel, W. H., Bruno, M. A., Giangrande, P. H., & Mestre, M. B. (2018). Aptamers as diagnostic tools in cancer. Pharmaceuticals, 11(3), 86. (Year: 2018).*
Sun, H., Zhu, X., Lu, P. Y., Rosato, R. R., Tan, W., & Zu, Y. (2014). Oligonucleotide aptamers: new tools for targeted cancer therapy. Molecular Therapy-Nucleic Acids, 3. (Year: 2014).*
Walsh, R., & DeRosa, M. C. (2009). Retention of function in the DNA homolog of the RNA dopamine aptamer. Biochemical and biophysical research communications, 388(4), 732-735. (Year: 2009).*
Álvarez-Martos, I., & Ferapontova, E. E. (2017). A DNA sequence obtained by replacement of the dopamine RNA aptamer bases is not an aptamer. Biochemical and biophysical research communications, 489(4), 381-385. (Year: 2017).*
Abnous Ph.D. et al., "A novel chemotherapy drug-free delivery system composed of three therapeutic aptamers for the treatment of prostate and breast cancers in vitro and in vivo", *Nanomedicine: Nanotechnology, Biology And Medicine* 13(6):1933-1940, Apr. 13, 2017.
Armengol et al., "4E-Binding Protein 1: A Key Molecular 'Funnel Factor' in Human Cancer with Clinical Implications," *Cancer Res* 67(16):7551-7555, Aug. 15, 2007.
Bahrami et al., "The potential value of the PI3K/Akt/mTOR signaling pathway for assessing prognosis in cervical cancer and as a target for therapy," *J Cell Biochem*:1-21, May 17, 2017.
Brachmann et al., "PI3K and mTOR inhibitors—a new generation of targeted anticancer agents," *Curr Opin Cell Biol* 21(2):194-198, 2009.
Briones et al., "Applications of peptide nucleic acids (PNAs) and locked nucleic acids (LNAs) in biosensor development," *Anal Bioanal Chem* 402:3071-3089, Feb. 2, 2012.
Brown et al., "MNK Controls mTORC1: Substrate Association through Regulation of TELO2 Binding with mTORC1," *Cell reports* 18(6):1444-1457, Feb. 7, 2017.
Chappell et al., "Ras/Raf/MEK/ERK and PI3K/PTEN/Akt/mTOR Inhibitors: Rationale and Importance to Inhibiting These Pathways in Human Health," *Oncotarget* 2(3):135-164, Mar. 11, 2011.
Chrestensen et al., "MNK1 and MNK2 Regulation in Breast Cancer Lines," *J Biol Chem* 282(7):4243-4252, Feb. 16, 2007, HER2-overexpressing.
Costa et al., "Abordagem terapêutica do carcinoma pulmonary de não pequenas células no idosa/Treatment of non-small cell lung cancer in elderly patients," *Rev Port Pneumol* 13(6):841-854, 2007 (with English abstract).

(Continued)

*Primary Examiner* — Jennifer Dunston
*Assistant Examiner* — Christina Tran
(74) *Attorney, Agent, or Firm* — Seed Intellectual Property Law Group LLP

(57) ABSTRACT

Disclosed herein are aptamers that can selectively bind to isoforms MNK1a and MNK1b of the protein kinase MNK1. Also disclosed are pharmaceutical compositions containing the aptamers, and methods of using the aptamers for inhibiting the replication of cancer cells and for treating cancers.

15 Claims, 51 Drawing Sheets
Specification includes a Sequence Listing.

(56) References Cited

OTHER PUBLICATIONS

Franken et al., "Clonogenic assay of cells in vitro," *Protocol* 1(5):2315-2319, Dec. 21, 2006 (5 pages).
García-Recio et al., "Characterization of MNK1b DNA Aptamers That Inhibit Proliferation in MDA-MB231 Breast Cancer Cells," *Molecular Therapy-Nucleic Acids 5:e275*, Jan. 1, 2016 (13 pages).
Geyer et al., "Nucleobase Pairing in Expanded Watson-Crick-like Genetic Information Systems," *Strcture* 11:1485-1498, Dec. 2003.
Gonzalez et al., "MAP kinase interacting 1b (MNK1b) DNA aptamers as potential tool for breast cancer therapy," *New Biotechnology* 33(3):418-419, May 1, 2016.
Horvath et al., "An Automated DNA Synthesizer Employing Deoxynucleoside 3'—Phosphoramidites,"*Methods in Enzymology* 154:314-326, 1987.
Hou et al., "Targeting Mnks for Cancer Therapy," *Oncotarget* 3(2):118-131, Mar. 3, 2012.
Kolb et al., "Endogenous Expression of an Anti-TAR Aptamer Reduces HIV-1 Replication," *RNA Biology* 3(4):150-156, 2006, (8 pages).
McCubrey et al., "Therapeutic Resistance Resulting from Mutations in Raf/MEK/ERK and PI3K/PTEN/Akt/mTOR Signaling Pathways," *J Cell Physiol* 226(11):2762-2781, Feb. 1, 2011.
Mendoza et al., "The Ras-ERK and PI3K-mTOR Pathways: Crosstalk and Compensation," *Trends in Biochemical Sciences* 36(6):320-328, Jun. 2011.
Meric-Bernstam et al., "Targeting the mTOR Signaling Network for Cancer Therapy," *J Clin Oncol* 27(13):2278-2287, May 1, 2009.
O'Loghlen et al., "Identification and molecular characterization of Mnk1b, a splice variant of human MAP kinase-interacting kinase Mnk1," *Exp Cell Res* 299(2):343-355, 2004.
Phillips et al., "MNK1 and EIF4E are downstream effectors of MEKs in the regulation of the nuclear export of HDM2 mRNA," *Oncogene* 27(11):1645-1649, 2008.
Pinheiro et al., "The XNA world: progress towards replication and evolution of synthetic genetic polymers," *Current Opinion in Chemical Biology* 16:245-252, Jun. 14, 2012.
Pinto-Díez et al, "Increased expression of MNK1b, the spliced isoform of MNK1, predicts poor prognosis and is associated with triple-negative breast cancer", *Oncotarget* 9(17):13501-13516, Mar. 2, 2018.
Raught et al., "Signaling to Translation Initiation," in M.B. M, N. S, J.W.B. H. (ed.), *Translational Control in Biology and Medicine*, New York: Cold Spring Harbor Laboratory Press, 2007, 369-400.
Shahbazian et al., "The mTOR/PI3K and MAPK pathways converge on eIF4B to control its phosphorylation and activity," *EMBO J* 25(12):2781-2791, Jun. 8, 2006.
Ueda et al., "Combined deficiency for MAP kinase-interacting kinase 1 and 2 (Mnk1 and Mnk2) delays tumor development," *Proc Natl Acad Sci USA* 107(32):13984-13990, Aug. 10, 2010.
Wendel et al., "Dissecting eIF4E action in tumorigenesis," *Genes Dev* 21(24):3232-3237, 2007.
Carrión-Marchante et al., "An Aptamer against MNK1 for Non-Small Cell Lung Cancer Treatment," Pharmaceutics 15 (1273):1-19, Apr. 18, 2023. (19 pages).
Liu et al., "Multifunctional aptamer-based nanoparticles for targeted drug delivery to circumvent cancer resistance," Biomaterials 91:44-56, 2016. (13 pages).
Pinto-Díez et al., "An optimized MNK1b aptamer, apMNKQ2, and its potential use as a therapeutic agent in breast cancer," Molecular Therapy: Nucleic Acids 30:553-568, Dec. 2022. (16 pages).
Viglasky et al., "Potential uses of G-quadruplex-forming aptamers," Gen. Physiol. Biophys. 32:149-172, 2013. (24 pages).

\* cited by examiner apMNK2F

ΔG= -3.08 apMNK2FT

ΔG= -2.64

APTAMERS AND THE USE THEREOF IN THE TREATMENT OF CANCER

STATEMENT REGARDING SEQUENCE LISTING

The Sequence Listing associated with this application is provided in text format in lieu of a paper copy, and is hereby incorporated by reference into the specification. The name of the text file containing the Sequence Listing is 370083_402USPC_SL_V2_.txt. The text file is 2,559 bytes, was created on Dec. 20, 2024, and is being submitted electronically via Patent Center.

TECHNICAL FIELD OF THE INVENTION

The present invention relates to the field of aptamers (nucleic acid molecules obtained by in vitro selection or evolution that have the ability to bind specifically to a given molecular target) and the use thereof for the treatment of cancer, particularly breast cancer. Therefore, the present invention is comprised in the field of biotechnology, and specifically in the field of the development and production of pharmaceutical compositions for the treatment of oncological diseases.

BACKGROUND OF THE INVENTION

Breast cancer is one of the most commonly diagnosed cancers in women. The PI3K/AKT/mTOR signaling cascade is among one of the most frequently deregulated mechanisms in patients with this type of cancer. This pathway plays a key role in tumor cell proliferation, survival and development, and deregulation thereof is therefore closely linked to tumorigenesis and to the sensitivity and resistance to cancer therapies. Said deregulation is often the result of genetic alterations and/or mutations [Hou, J. et al. Oncotarget 2012, 3(2):118-131]. Growth factors, mitogens, and cytokines activate PI3K which initiates a cascade of cellular events. The 3' phosphoinositol-dependent kinase-1 (PDK1) activates the protein AKT which, by means of the inactivation of tumor suppressor complex 1 and 2 (TSC1/2), activates protein kinase mTOR complex 1, mTORC1. The activation of PDK1 and AKT by PI3K is negatively regulated by PTEN [Chappell, W. H. et al. Oncotarget 2011, 2(3):135-164], a tumor suppressor gene which is usually mutated or silenced in human cancers [McCubrey J. A., et al., J Cell Physiol 2011, 226(11):2762-2781]. The loss of PTEN causes the activation of AKT and of mTORC1 signaling. mTORC1 phosphorylates the 4E-BPs and also promotes the activation of the kinase S6K which phosphorylates ribosomal protein S6 [Shahbazian, D. et al., EMBO J 2006, 25(12):2781-2791]. Furthermore, it has been demonstrated that a prolonged treatment of tumor cell lines or patients with mTOR inhibitors causes an increase in PI3K activity, which entails the survival of cancer cells [Costa F. J. and Barata F. Rev Port Pneumol 2007, 13(6):841-854]. There are also papers which have demonstrated that 4E-BPs undergo significant phosphorylation which is associated with tumor progression in breast, ovarian, prostate, and colon cancer [Armengol, G., et al. Cancer Res 2007, 67(16): 7551-7555].

Due to the importance of this signaling pathway in cancer, the kinases of this pathway have been used as therapeutic targets and pharmacological inhibitors thereof have been identified [Brachmann, S. et al., Curr Opin Cell Biol 2009, 21(2):194-198 and Meric-Bernstam, F. and Gonzalez-Angulo, A. M. J Clin Oncol 2009, 27(13):2278-2287]. In a very recent review [Bahrami A, et al., J Cell Biochem. 2017 May 17], Bahrami et al. present a detailed view of the potential of PI3K/AKT/mTOR pathway inhibitors in patients with breast cancer, and describe in detail the preclinical and clinical studies that are active today. The results of these studies seem to indicate that the estrogen receptor (ER) and PI3K signaling pathways regulate one another. In that sense, low PI3K activation has been observed with high ER levels and hyper PI3K activation has been observed to give rise to a decrease in ER levels. Although patients who are positive for hormone receptors are often treated with endocrine therapies, many of them develop resistance and the disease progresses. Part of this resistance may be due to activation of the PI3K/AKT/mTOR pathway.

Protein kinases MNKs, MNK1 and MNK2, which belong to the MAPK pathway, are phosphorylated and activated by ERK1/2 and p38MAPK and phosphorylate eIF4E. eIF4E activity is regulated by two different mechanisms: (MNK-mediated) eIF4E phosphorylation or eIF4E availability to participate in the initiation of translation through binding with 4E-BP proteins which form an inactive complex with eIF4E, preventing the binding thereof to eIF4G, and thereby preventing the formation of the eIF4F complex which is required for initiating protein synthesis [Raught B, Gingras A-C: In: Translational Control in Biology and Medicine. edn. Edited by M. B. M, N. S, J. W. B. H. New York: Cold Spring Harbor Laboratory Press; 2007: 369-400]. mTORC1 regulates the assembly of the eIF4F complex through the phosphorylation of 4E-BPs, which involves the disassociation of eIF4E and the binding thereof to eIF4G, where it becomes available for being phosphorylated by MNKs.

The expression of each MNK gene gives rise to two different mRNAs generated by alternative "splicing". The inventors of the present invention described for the first time the isoform MNK1b [O'Loghlen A, et al., Exp Cell Res, 2004. 299(2): p. 343-55.]. MNK1a and MNK1b are identical at the N-terminal end and in the catalytic domains, but have different C-terminal ends. MNK1a contains the MAP kinase-binding domain at the C-terminal end, a domain that form "b" lacks. MNK1b has eIF4E kinase constitutive activity independent of the activation of the MAP kinase signaling cascades. Furthermore, another important feature differentiating the two isoforms is that while MNK1a is found in the cytoplasm, MNK1b is also found in the nucleus. The biological role of MNK1b may be linked to its ability to remain in the nucleus (unlike MNK1a) and phosphorylate eIF4E or/and other substrates in this subcellular compartment.

Results supporting the fact that phosphorylation of eIF4E by MNK1/2 constitutes an absolute requirement for the oncogenic action of eIF4E have been published in recent years [Chrestensen, C. A., et al., J Biol Chem, 2007. 282(7): p. 4243-52; Phillips, A. and J. P. Blaydes, Oncogene, 2008. 27(11): p. 1645-9; Wendel, H. G., et al. Genes Dev, 2007. 21(24): p. 3232-7]. Furthermore, Ueda et al. [Ueda, T., et al., Proc Natl Acad Sci USA, 2010. 107(32): p. 13984-90] have demonstrated that the absence of MNK1/2 does not alter the normal development of mice, although it delays mouse tumor development. In that sense, pharmacological inhibitors targeting MNK would provide an effective anti-tumor strategy that is not harmful for non-tumor cells [reviewed by Hou et al., 2012, Oncotarget, 3, 118-131].

On the other hand, the two pathways, i.e., PI3K/AKT/ mTOR and MAPKs, are interconnected and may influence one another (reviewed by [Mendoza, M. C., Er, E. E. and Blenis, J. Trends in Biochemical Sciences 2011, 36(6):320-328]). Brown and Gromeier [Brown, M. C. and Gromeier, M. Cell reports 2017, 18(6):1444-1457] have quite recently demonstrated that MNKs stimulate mTORC1. MNK binds to mTORC1, which promotes association with TELO 2 (PI3K related kinase (PIKK) stabilizer), and this interaction modulates mTORC1:substrate binding. This new mechanism represents another point of convergence between both pathways which may play an important role in tumorigenesis and chemoresistance.

Several studies have shown that treatment with rapamycin, an mTOR inhibitor, and its synthetic analogues (temsirolimus and everolimus) cause an increase in eIF4E phosphorylation and AKT activation, which contributes to the development of resistance to mTOR inhibitors. The cell adapts to mTOR inhibition by reducing 4E-BP protein levels, which causes an increase of the eIF4E/4E-BP1 ratio, limiting the effect of mTOR inhibitors. For this reason, therapies aimed at inhibiting eIF4E by inhibiting MNKs can prevent this feedback effect. Several studies have demonstrated that the combination of MNK and mTOR inhibitors increases anti-tumor response by inhibiting cell proliferation and inducing apoptosis, with respect to the effect obtained with monotherapy.

BRIEF DESCRIPTION OF THE DRAWINGS

In FIG. 7B, the degradation of aptamer apMNKQ2 in human plasma at 0, 6, 16, 24, 48, and 72 hours is depicted.

DESCRIPTION OF THE INVENTION

Definitions

Figure 1:
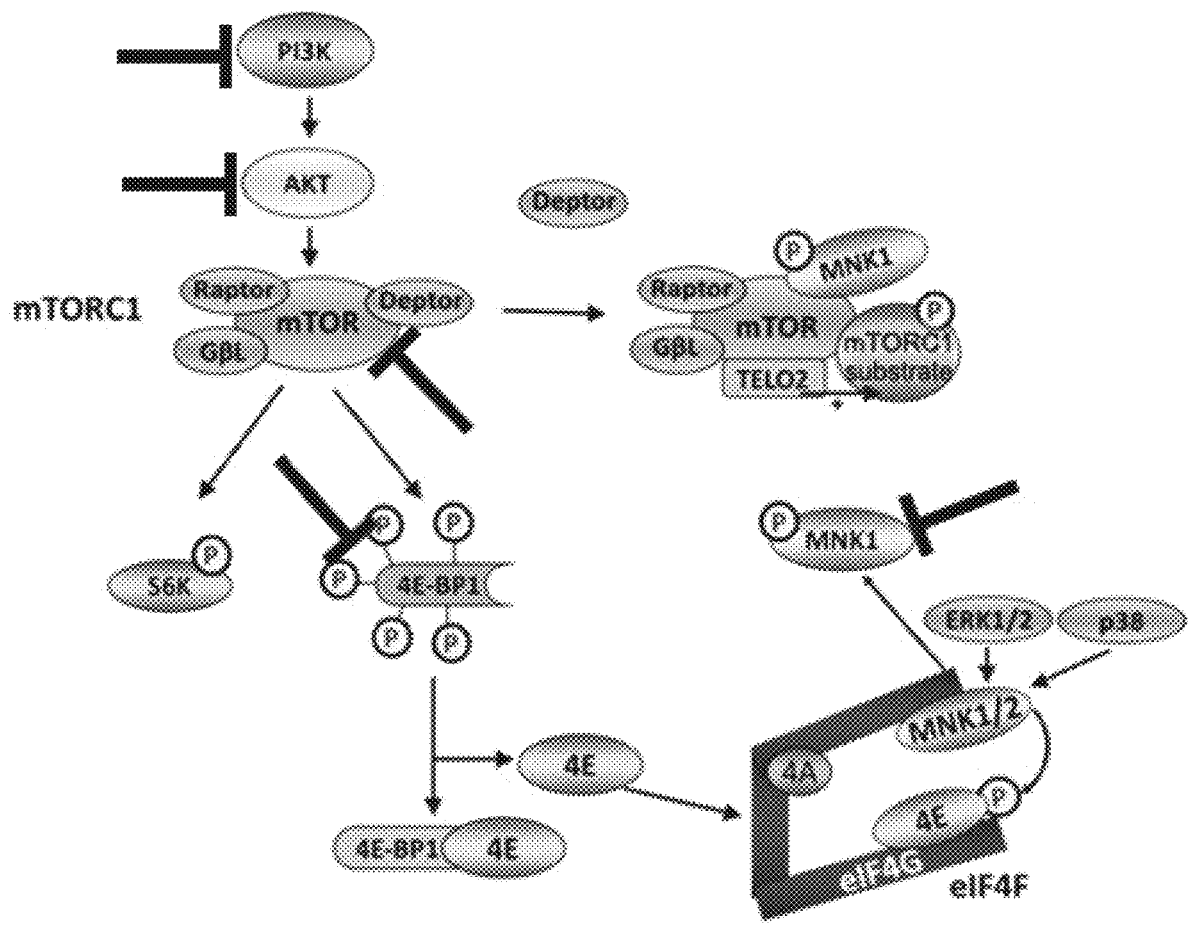
FIG. 1: In response to growth factors or other stimuli, PI3K activation initiates a cascade of events which activates AKT and then mTORC1, promoting S6K activation. Furthermore, 4EBP1 phosphorylation occurs, so the initiation factor eIF4E is released. Protein kinases ERK and p38 promote MNK activation. The MNKs bind to eIF4G and phosphorylate eIF4E, also forming the eIF4F complex. Activated MNKs bind to mTORC1, which promotes association with TELO, and this interaction modulates mTORC1: substrate binding. The bold, T-shaped inhibitory arrows indicate the targets for which aptamers will be developed in this invention.

In the context of the present invention, protein kinase MNK1 is understood to mean an enzyme with serine/threonine kinase activity which interacts with MAP kinase.

In the context of the present invention, "MNK1a" and "MNK1b" are understood to mean each of the two isoforms of the protein kinase MNK1.

In the context of the present invention, the term "triple-negative breast cancer" is understood to mean that breast cancer the cells of which do not express any of the following receptors: estrogen receptor, HER2 receptor, and progesterone receptor. Due to the absence of these receptors, specific drugs targeting same cannot be used, so as there are fewer treatment options available, this type of cancer is more difficult to treat and more aggressive.

In the context of the present invention, "higher affinity for MNK1b than for MNK1a" is understood to mean the aptamer having a higher capacity to recognize isoform MNK1b compared to isoform MNK1a.

In the context of the present invention, the term "jetPEI" is understood to mean a polymer-based reagent which is used for administering nucleic acids in animal models. JetPEI® forms stable complexes with the nucleic acid, protecting it from degradation and thereby facilitating in vivo delivery. With a proven record (more than 700 publications), in vivo-jetPEI® has already been used against a wide range of organs using various routes of administration.

In the context of the present invention, the term "lipofectamine" and more specifically "Lipofectamine™ 2000" is understood to mean a common transfection reagent produced and sold by Invitrogen. Lipofectamine consists of a cationic liposome formulation, which complexes with negatively charged nucleic acid molecules to allow them to overcome the electrostatic repulsion of the cell membrane.

Description

The present invention is based on the identification by the inventors of a series of new aptamers containing a minimum common motif and binding specifically at the intracellular level to protein kinases MNK1, more specifically to MNK1a and MNK1b, respectively, particularly with a higher affinity for MNK1b than for MNK1a. As illustrated in the examples of the present invention, said binding between the aptamer and the protein MNK1 provides an effective therapy in the treatment of cancer, more specifically in the treatment of breast cancer, even more specifically in the treatment of triple-negative breast cancer. Therefore, these molecules are useful for the production of new pharmaceutical compositions for oncological treatment.

A first aspect of the present invention relates to an aptamer capable of binding specifically to the protein kinase MNK1, more specifically to MNK1a and MNK1b, preferably with an affinity that is at least two-, three-, or four-fold higher for MNK1b than for MNK1a, and the aptamer comprises or consists of a sequence structure:

$Mon^1$-$Mon^2$-$Mon^3$-$Mon^4$-$Mon^5$-$Mon^6$-$Mon^7$-$Mon^8$-$Mon^9$ .... $Mon^{18}$ (SEQ ID NO 7)

where $Mon^1$ to $Mon^{18}$ are monomers of a nucleic acid or of a chemical nucleic acid analogue.

Preferably, said aptamer comprises or consists of a sequence structure:

$Mon^1$-$Mon^2$-$Mon^3$-$Mon^4$-$Mon^5$-$Mon^6$-$Mon^7$-$Mon^8$-$Mon^9$ .... $Mon^{29}$ (SEQ ID NO 6)

where $Mon^1$ to $Mon^{29}$ are monomers of a nucleic acid or of a chemical nucleic acid analogue.

According to the present invention, the term "monomer of a nucleic acid" refers to a nucleotide in which the nucleotide base thereof is adenine (A), guanine (G), cytosine (C), thymine (T), or uracil (U). According to the present invention, the term "monomer of a chemical nucleic acid analogue" refers to the minimum unit which, when polymerized, forms a chemical nucleic acid analogue, each of these minimum units containing a nitrogenous base (A, G, C, T, or U) covalently bound to the analogous ribose-phosphate or deoxyribose-phosphate backbone component typical of nucleic acids. In the present description, the term "chemical nucleic acid analogue" may also be referred to by synonymous terms such as "analogous nucleic acid molecule," "nucleic acid analogue," or "synthetic nucleic acid analogue".

Therefore, in the aptamers of the present invention the nitrogenous base of Mon1 is a T, the nitrogenous base of Mon2 is a G, the nitrogenous base of Mon3 is a G, the nitrogenous base of Mon4 is a G, the nitrogenous base of Mon5 is a G, the nitrogenous base of Mon6 is a T, the nitrogenous base of Mon7 is a G, the nitrogenous base of Mon8 is a G, the nitrogenous base of Mon9 is a G, the nitrogenous base of Mon10 is a C, the nitrogenous base of Mon11 is a G, the nitrogenous base of Mon12 is a G, the nitrogenous base of Mon13 is a G, the nitrogenous base of Mon14 is a C or a G, T, U, or A, the nitrogenous base of Mon15 is a G, the nitrogenous base of Mon16 is a G, the nitrogenous base of Mon17 is a G, the nitrogenous base of Mon18 is a G, the nitrogenous base of Mon19 is a G, the nitrogenous base of Mon20 is a T or a G, C, U, or A, the nitrogenous base of Mon21 is a G, the nitrogenous base of Mon22 is a G, the nitrogenous base of Mon23 is a G or a T, the nitrogenous base of Mon24 is a G, the nitrogenous base of Mon25 is a G, the nitrogenous base of Mon26 is a T or a G, A, U, or C, the nitrogenous base of Mon27 is a G, the nitrogenous base of Mon28 is a G, and the nitrogenous base of Mon29 is a T or a G, C, A, or U.

Figure 4A:
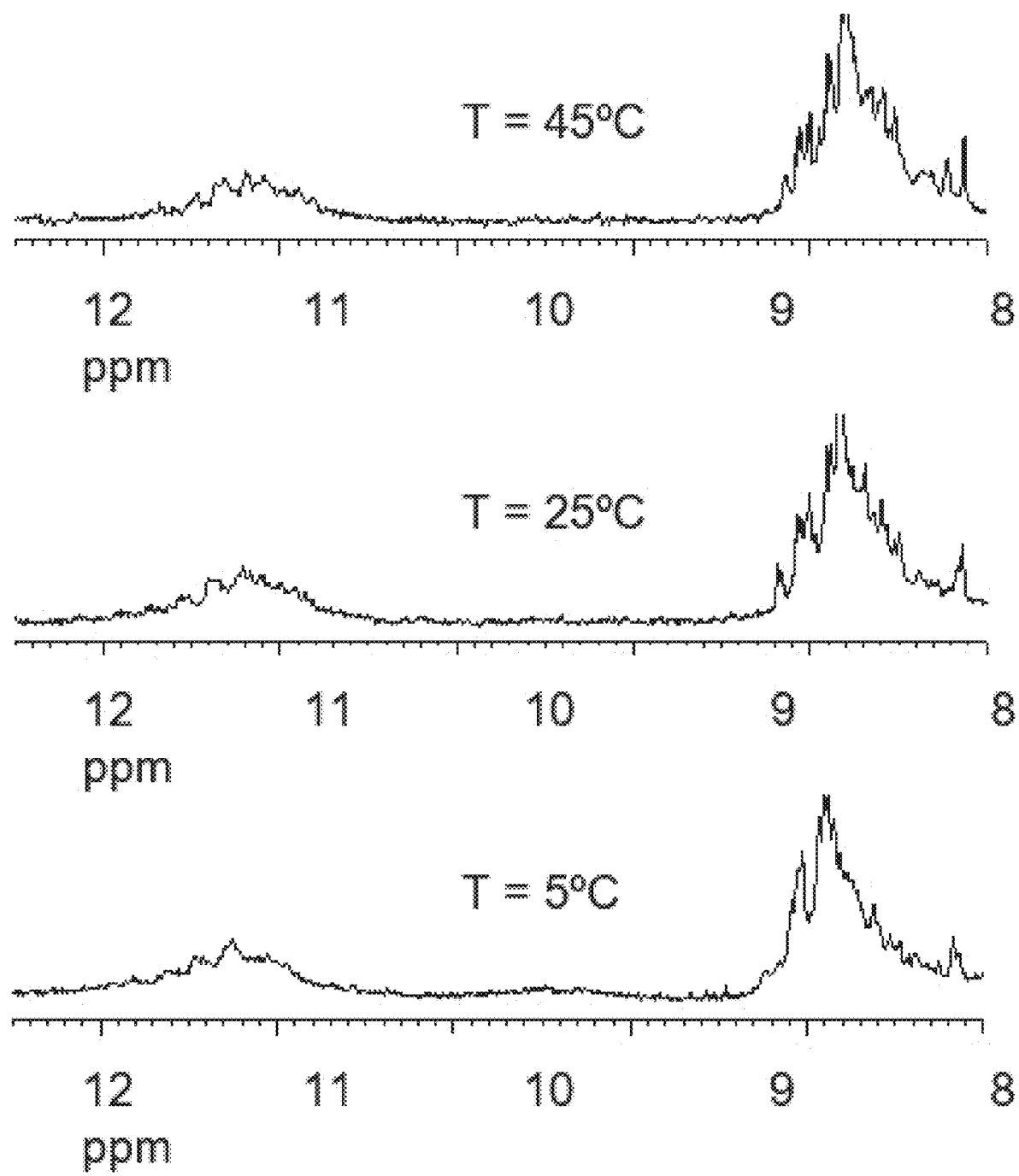
FIGS. 4A-4D. Study of the imino regions of the one-dimensional NMR spectra (FIG. 4A) of apMNKQ2 in 10 mM of potassium phosphate (pH 7) at different temperatures (top) and two-dimensional (NOESY) NMR spectra (FIGS. 4B and 4C). Proposed structural model of aptamer apMNKQ2 (FIG. 4D). The analysis suggests two parallel G-quadruplexes with 3 and 2 tiers interacting through the 3'terminal tetrad of one G-quadruplex with the 5'terminal of the other G-quadruplex to form a 5-tiered parallel G-quadruplex.
Figure 4B:
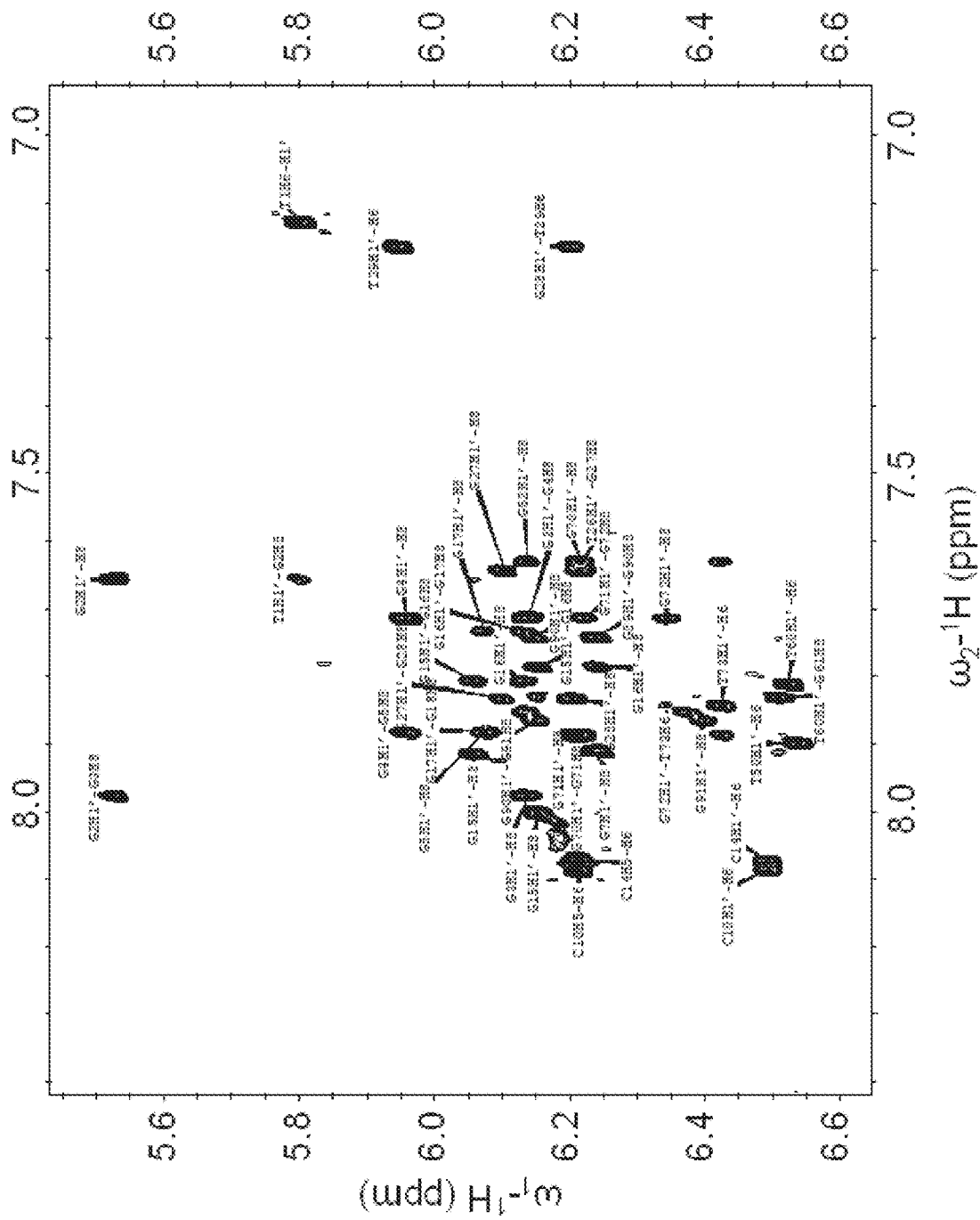
Figure 4C:
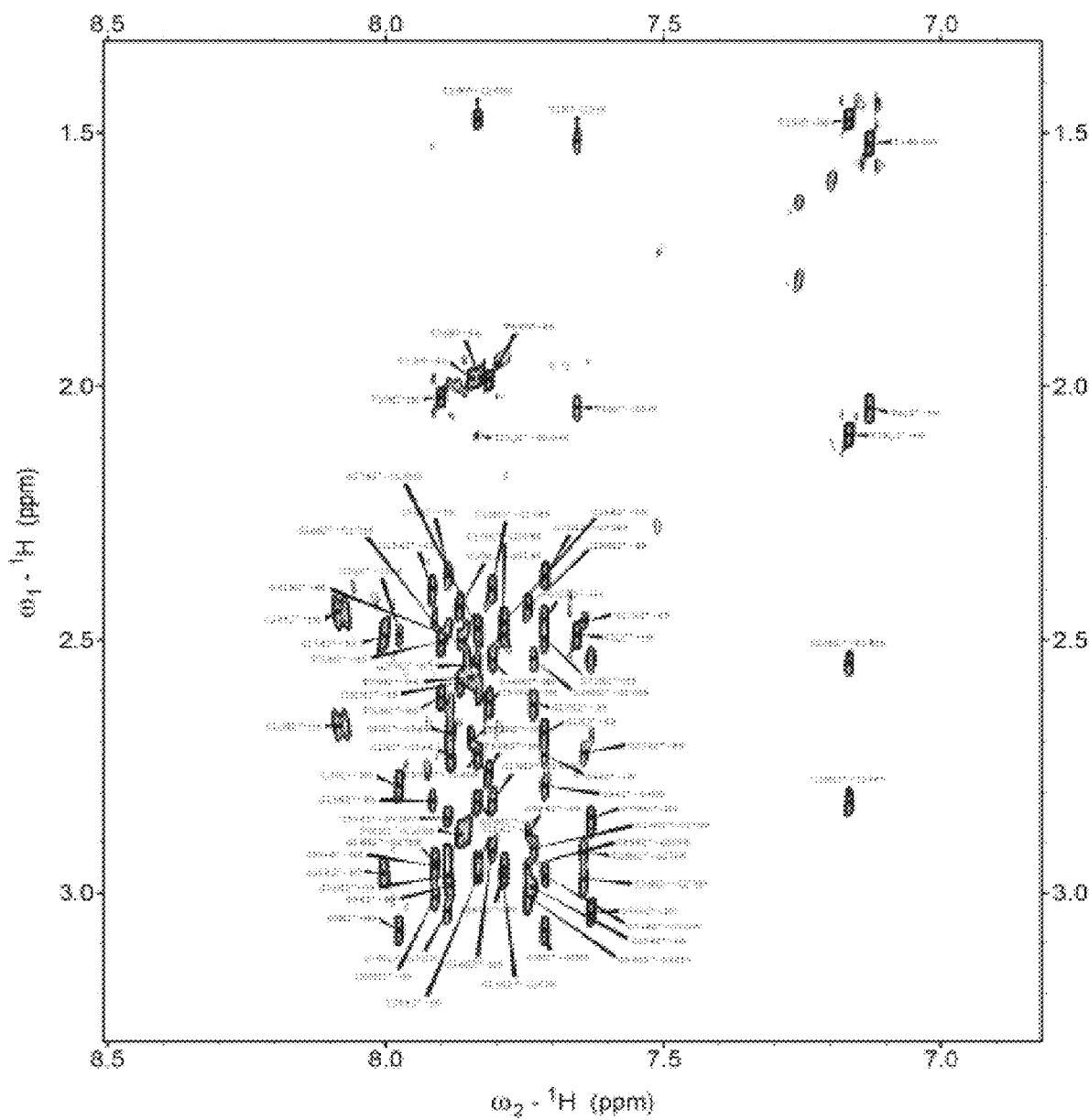
Figure 4D:
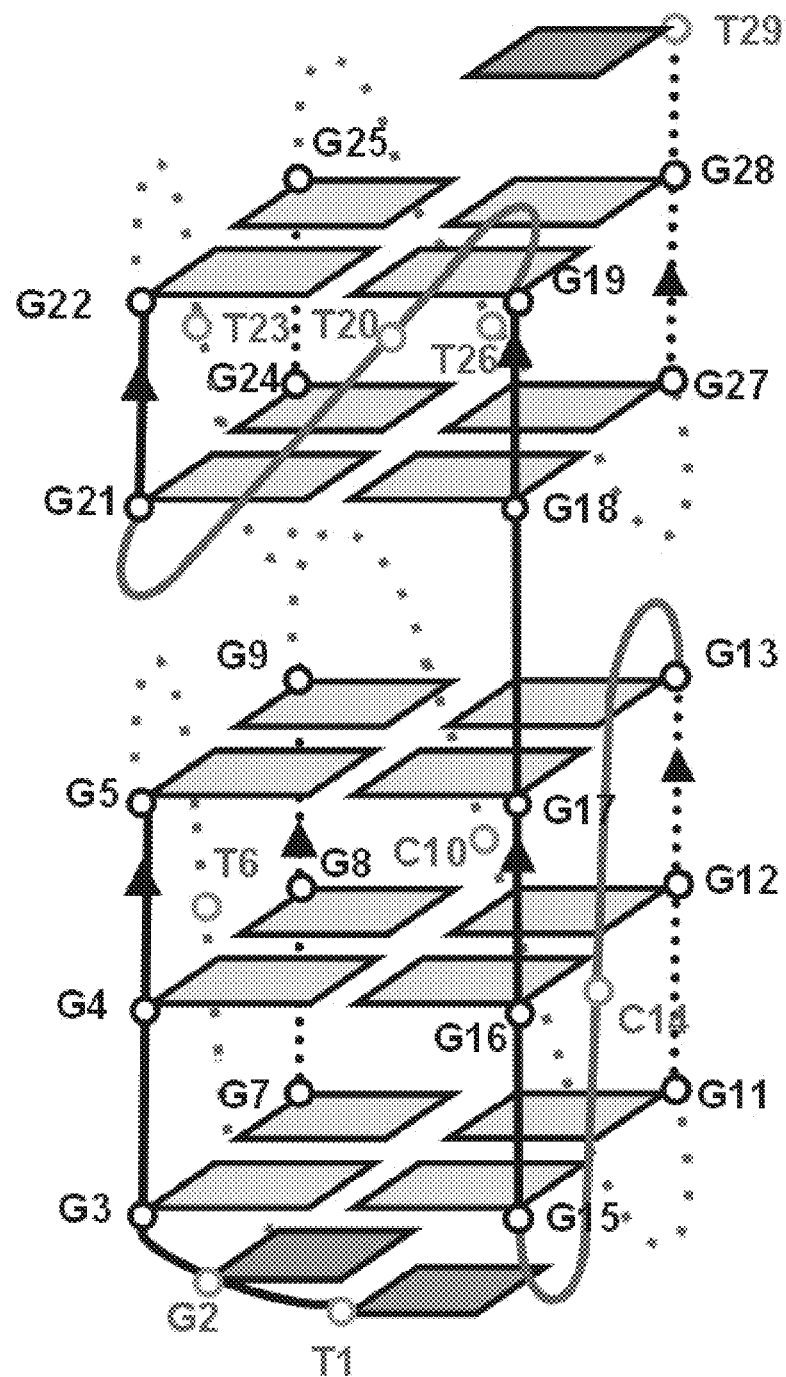

It must be noted that the aptamers of the present invention allow the replacement of one or more of the nitrogenous bases of the monomers of a nucleic acid or of a chemical nucleic acid analogue described in the preceding paragraph with another base, even the elimination of one or more of said monomers from the aptamer structure, provided that said modifications allow maintaining the G-quadruplex structure shown in FIG. 4D. These modifications include, among others, the substitution of the nitrogenous base cytosine (C) of Mon14 with a guanine (G), a thymine (T), an adenine (A), or a uracil (U), the substitution of the nitrogenous base thymine (T) of Mon20 with a guanine (G), a cytosine (C), an adenine (A), or a uracil (U), the substitution of the nitrogenous base cytosine (T) of Mon26 with a guanine (G), a cytosine (C), an adenine (A), or a uracil (U), and the substitution of the nitrogenous base thymine (T) of Mon29 with a guanine (G), a cytosine (C), an adenine (A), or a uracil (U).

Additionally it must be noted that the aptamers of the present invention preferably incubated in the presence of 1 unit of DNase I for 5 minutes at 37° C. maintain a stability greater than 80%, whereas the same treatment of the parental aptamer apMNK2F under the same assay conditions causes complete degradation thereof (stability 0%). Alternatively, the aptamers of the present invention preferably show a stability greater than 80% in the presence of human plasma after 72 h at 37° C., calculated by dividing the amount of aptamer that maintains its integrity after treatment by the initial amount of the aptamer.

In the context of the present invention, the term "incubated" is understood to mean being subjected to the assay conditions, specifically to incubation in a buffer with 10 mM Tris HCl, pH 7.5, 2.5 mM $MgCl_2$, and 0.1 mM $CaCl_2$).

In the context of the present invention, the term "1 unit of DNase I" is understood to mean the amount of DNase I which completely degrades 1 µg of DNA in 10 minutes at 37° C.

In the context of the present invention, "DNase I" is understood to mean the deoxyribonuclease-I protein encoded by the human DNASE1 gene. DNase I is a nuclease which cleaves DNA preferably at phosphodiester bonds adjacent to a pyrimidine nucleotide, producing 5'-phosphate-terminated polynucleotides with a free hydroxyl group in position 3', producing on average tetranucleotides.

In the context of the present invention, the expression "maintains stability greater than 80%" is understood to mean the preservation of more than 80% of the integrity of the molecules with respect to the aptamer not treated with DNase I.

Therefore, in a preferred embodiment of the present invention the aptamers of the invention incubated in a buffer with 10 mM Tris HCl, pH 7.5, 2.5 mM $MgCl_2$, and 0.1 mM $CaCl_2$), in the presence of 1 unit of DNase I for 5 minutes at 37° C., and subsequently stopping the reaction by adding 1 µL of EDTA 50 mM and heating at 65° C. for 10 minutes, maintain a stability greater than 80%, wherein said percentage of stability is calculated by dividing the value obtained for the aptamer treated in the presence of 1 unit of DNase I by the value obtained for the untreated aptamer.

In the context of the present invention, the term "maintaining the G-quadruplex structure formed by SEQ ID NO 2 or SEQ ID NO 3" is understood to mean maintaining the spatial arrangement of G monomers located in positions Mon3, Mon4, Mon5, Mon7, Mon8, Mon9, Mon11, Mon12, Mon13, Mon15, Mon16, and Mon17 of SEQ ID NO 2 and G monomers located in positions Mon3, Mon4, Mon5, Mon7, Mon8, Mon9, Mon11, Mon12, Mon13, Mon15, Mon16, Mon17, Mon18, Mon19, Mon21, Mon22, Mon24, Mon25, Mon27, and Mon28 of SEQ ID NO 3.

Even more preferably, the aptamers of the invention have a length in number of monomers not greater than 40, preferably not greater than 35, preferably not greater than 34, 33, 32, 31, 30, or 29 monomers.

In the scope of the present invention, the term "aptamer" refers to an RNA molecule, DNA molecule, or any chemical nucleic acid analogue comprising a sequence of a succession of nitrogenous bases, wherein said succession of nitrogenous bases is responsible for the activity thereof regardless of the polymer backbone to which they are anchored (which will determine whether it is a natural nucleic acid such as DNA or RNA, or a chemical analogue thereof). In the context of this invention, the principle of action of any nucleic acid analogue is exactly the same as that of DNA or RNA, and is defined by the sequence of the nitrogenous bases it contains. Nevertheless, these analogues generally have a higher stability than natural nucleic acids do. In fact, the use of analogous molecules of natural nucleic acids for various therapeutic and diagnostic applications has been extremely useful (reviews by Geyer et al., 2003; Briones and Moreno, 2012). In the current state of the art, several types of chemical nucleic acid analogues, such as, for example and without limitation, those defined in the present description, are known.

Among said nucleic acid analogues, the case of locked nucleic acids (abbreviated as LNAs), characterized by being polymers consisting of nucleotides of B-D-ribofuranose modified with a methylene 2'-O, 4'-C linker, is particularly interesting. This type of bond restricts or "locks" the ribofuranose in its 3'-endo conformation. The LNA forms hybrids with DNA and RNA and said hybrids are much more stable than the DNA-DNA, DNA-RNA, or RNA-RNA dimers themselves. Another interesting feature of LNAs is that nucleotides with this conformation can bind to conventional DNA or RNA nucleotides, forming hybrid molecules in which interaction with another nucleic acid through sites occupied by LNA monomers is promoted.

Nucleic acid analogues referred to as peptide nucleic acids (PNAs) are also very useful. PNA is a peptide polymer, unlike the sugar and phosphate backbone characteristic of natural nucleic acids. The PNA backbone, formed by N-(2-aminoethyl)-glycine units bound by peptide bonds, is achiral, electrically neutral, and lacks phosphorus atoms. The purine nucleotide bases (A and G) and pyrimidine nucleotide bases (C and T) are bound to the PNA backbone by means of methylenecarbonyl linkers in a conformation such that they allow interaction by means of hydrogen bridges with the nucleotide bases of natural nucleic acids, as occurs naturally between same in DNA and RNA. PNA forms extremely stable dimers with both DNA and RNA. In relation to PNA, nucleic acid analogues referred to as thioester peptide nucleic acids or thioester PNAs (tPNAs) have been synthesized.

Other nucleic acid analogues are the following: i) glycerol-derived nucleic acids (GNAs), the backbone of which is formed by acyclic glycerol units bound by phosphodiester bonds; ii) pyranosyl-RNA (p-RNA), containing rings having six atoms of ~-D-ribopyranoside type instead ribofuranosyl like RNA, bound by 4'-2' phosphodiester bonds; iii) threose nucleic acids (TNAs), based on a-L-threofuranosyl units bound by 3'-2' phosphodiester bonds; iv) phosphoramidate morpholino oligomers (PMOs), the monomers of which are formed by morpholino rings bound to one another by phosphorodiamidate bonds.

Therefore, in the chemical nucleic acid analogues, each of the monomeric units forming same is one selected from the following group:

a. β-D-ribofuranoside modified with a 2'-O, 4'-C methylene linker, with a nitrogenous base bound by means of an N-glycosidic bond between nitrogen 9 of purines or 1 of pyrimidines and carbon 1', in the case of LNA analogues; said monomer can be polymerized by means of a 5'-3' phosphodiester bond;

b. N-(2-aminoethyl)-glycine, with a nitrogenous base bound by means of a methylenecarbonyl linker between nitrogen 9 of purines or 1 of pyrimidines and the amino group of the glycine backbone, in the case of PNA analogues; said monomer can be polymerized by means of a peptide bond between the carbon of the carboxyl group of the glycine backbone and the terminal nitrogen of the aminoethylene group;

c. Amino acid cysteine, with a nitrogenous base bound by means of a methylenecarbonyl linker between nitrogen 9 of purines or 1 of pyrimidines and sulfur of the cysteine backbone, in the case of tPNA analogues; said monomer can be polymerized by means of a conventional peptide bond;

d. 1,2,3-propanetriol (also called glycerol), with a nitrogenous base bound by means of an N-glycosidic bond between nitrogen 9 of purines or 1 of pyrimidines and carbon 1', in the case of GNA analogues; said monomer can be polymerized by means of a 3'-2' phosphodiester bond;

e. β-D-ribopyranoside, with a nitrogenous base bound by means of an N-glycosidic bond between nitrogen 9 of purines or 1 of pyrimidines and carbon 1', in the case of p-RNA analogues; said monomer can be polymerized by means of a 4'-2' phosphodiester bond;

f. α-L-threofuranoside, with a nitrogenous base bound by means of an N-glycosidic bond between nitrogen 9 of purines or 1 of pyrimidines and carbon 1', in the case of TNA analogues; said monomer can be polymerized by means of a 3'-2' phosphodiester bond;

g. Tetrahydro-1,4-oxazine (also called morpholino), with the nitrogenous base bound by means of an N-glycosidic bond between nitrogen 9 of purines or 1 of pyrimidines and carbon 1' of the morpholino ring, in the case of PMO analogues; said monomer can be polymerized by means of phosphoroamidate linkers bound by amide bonds with nitrogen 4' and ester with oxygen 11.

Up until now, most chemical nucleic acid analogues have been synthesized by means of chemical synthesis methods similar to that used for the chemical synthesis of conventional nucleic acids such as, by way of example and without limitation, solid phase synthesis using phosphoramidite-protected derivatives as monomers for polymerization (Horvath et al., 1987). The possibility of polymerizing certain nucleic acid analogues by means of enzyme systems using genetically modified variants of natural polymerases has also been described (Pinheiro et al., 2012).

In the scope of the present invention, aptamer derivatives refer to RNA or DNA aptamers, wherein preferably at least one of the nucleic acid monomers of said aptamer may present a chemical modification. The person having ordinary skill in the art would know that introducing chemical modifications which do not alter the nucleotide sequence or the spatial arrangement of the nitrogenous bases does not modify the functionality of the molecule of the aptamers described in the present invention, which depends essentially on the principle of sequence complementarity between the aptamer and its target molecule. However, such modifications do have a positive effect since they increase the stability and half-life of the aptamer. The increase in stability results in an increase in the overall efficiency of the aptamer given that its increased resistance to degradation entails an increase in the intracellular availability of the inhibitor. By way of example and without limitation, this modification may be useful to increase resistance to degradation by nuclease enzymes (RNases or DNases) present in biological media. Nucleotide modifications which cause such an increase in resistance to enzymatic degradation comprise a substituent selected, without limitation, from the following list: a fluorine atom, an amino group, a methyl group, a methoxy group, and any combination thereof. An increase in the resistance of the aptamers to exonuclease degradation is also achieved by means of blocking their 5' or 3' ends using different types of molecules or substituents, such as introducing as a substituent, for example, a molecule which blocks the phosphate group of the 5' end of the nucleic acid, or the hydroxyl group of its 3' end.

As understood in the invention, nucleotide modifications to cause resistance to enzymatic degradation of the aptamer comprising fluorine atoms refer to the substitution of at least one of the chemical groups of the nucleotide molecule by a chemical group containing at least one fluorine atom, as occurs and without limitation in (2'-deoxy-2'-fluoro)-nucleotides. As understood in the invention, nucleotide modifications to cause resistance to enzymatic degradation of the aptamer comprising an amino group refer to the substitution of at least one of the chemical groups of the nucleotide molecule by a chemical group containing at least one amino group, as occurs and without limitation in 2'-O-(3-aminopropyl)-nucleotides.

As understood in the invention, nucleotide modifications to cause resistance to enzymatic degradation of the aptamer comprising a methyl group refer to the substitution of at least one of the chemical groups of the nucleotide molecule by a chemical group containing at least one methyl group, as occurs and without limitation in 2'-O-methyl-nucleotides.

As understood in the invention, nucleotide modifications to cause resistance to enzymatic degradation of the aptamer comprising a methoxy group refer to the substitution of at least one of the chemical groups of the nucleotide molecule by a chemical group containing at least one methoxyethyl group, as occurs and without limitation in 2'-O-methoxyethyl-nucleotides.

As understood in the invention, nucleotide modifications to increase the resistance of the aptamer to exonuclease degradation by means of blocking the phosphate group of the 5' end refer to the covalent binding of an atom or an organic or inorganic molecule to said phosphate group.

As understood in the invention, nucleotide modifications to increase the resistance of the aptamer to exonuclease degradation by means of blocking the hydroxyl group of the 3' end refer to the covalent binding of an atom or an organic or inorganic molecule to said 3'-hydroxyl group, such as and without limitation the binding by means of a 31-3 phosphodiester linker of a thymine deoxyribonucleoside.

Likewise, other aptamer modifications contemplated in the present invention are those in which at least one of the nucleic acid monomers in RNA aptamers is substituted with an LNA monomer (described above), thereby resulting in a molecule similar to said RNA which can also be optionally modified, as explained, with fluorine atoms or amino, methyl, or methoxy groups. On the other hand, the enantiomeric forms of the RNA or DNA aptamers, which may optionally have any of the modifications herein described, are also useful for the purpose of increasing the resistance of the aptamers to nuclease degradation.

In a preferred embodiment of the aptamer or of any of its derivatives defined above in this aspect of the invention, in addition to the structure with sequence $Mon^1$-$Mon^2$-$Mon^3$-$Mon^4$-$Mon^5$-$Mon^6$-$Mon^7$-$Mon^8$-$Mon^9$ . . . . $Mon^{18}$ (SEQ ID NO 7) or sequence $Mon^1$-$Mon^2$-$Mon^3$-$Mon^4$-$Mon^5$-$Mon^6$-$Mon^7$-$Mon^8$-$Mon^9$ . . . . $Mon^{29}$ (SEQ ID NO 6), it also comprises an upstream flanking region bound to the monomer Mon1 and/or a downstream flanking region bound to the monomer $Mon^{18}$ or to $Mon^{29}$ of said structure. According to the invention, each flanking region comprises a sequence the length of which is of at least 1, 2, 3, or 4 monomers of a nucleic acid and/or a chemical nucleic acid analogue, preferably said flanking region does not produce aptamers with a size of more than 40 monomers, wherein said flanking structure(s) must allow maintaining the G-quadruplex structure shown in FIG. 4D, such that the aptamer is capable of binding specifically to the protein kinase MNK1, more specifically to MNK1a and MNK1b, particularly with an affinity that is at least two-, three-, or four-fold higher for MNK1b than for MNK1a. Additionally, said flanking structure must allow the resulting aptamers incubated in the presence of 1 unit of DNase I (ThermoFisher Scientific, USA) for 5 minutes at 37° C., and subsequently stopping the reaction by adding 1 µL of EDTA 50 mM (ThermoFisher Scientific, USA) and heating at 65° C. for 10 minutes, to maintain a stability greater than 80%.

Besides being used to form the preceding structure, the flanking regions can be defined by sequences used for stabilizing and directing the aptamer to a subcellular compartment, such as, for example and without limitation, by means of using snRNA U6 hairpins, such that the aptamer can be located in the cell nucleus. In that sense, such hairpins are but one example of the "flanking regions" described above, regardless of the structure they form and the additional functionality they provide. Another possible example would be the one described for the nucleolar localization of a TAR-specific aptamer by means of the incorporation of respective snRNA U16 terminal regions (as described in Kolb et al., 2006).

According to the invention, the length of the aptamer may vary depending on the size of the flanking regions (whether or not they are functional, and whether they are naturally occurring or artificial) to be added to the aptamer to confer any additional property thereto. In this sense, in a preferred embodiment the aptamer or any of its derivatives comprises a sequence structure $Mon^{na}$ . . . . $Mon^{2a}$-$Mon^{1a}$-$Mon^1$-$Mon^2$-$Mon^3$-$Mon^4$-$Mon^5$-$Mon^6$-$Mon^7$-$Mon^8$-$Mon^9$ . . . . $Mon^{29}$-$Mon^{1b}$-$Mon^{2b}$. $Mona^{nb}$ (SEQ ID NO 6) or sequence $Mon^{na}$ . . . . $Mon^{2a}$-$Mona^{1a}$-$Mon^1$-$Mon^2$-$Mon^3$-$Mon^4$-$Mon^5$-$Mon^6$-$Mon^7$-$Mon^8$-$Mon^9$ . . . . $Mon^{18}$-$Mon^{1b}$-$Mon^{2b}$. $Mona^{nb}$ (SEQ ID NO 7), where Monta to $Mon^{na}$ and $Mon^{1b}$ to $Mon^{nb}$ are monomers of a nucleic acid or a chemical nucleic acid analogue, such that:

the nitrogenous bases of $Mon^{1a}$ to $Mon^{na}$ are independently selected from the following group: A, C, G, T, and U; and the nitrogenous base of $Mon^{1b}$ to $Mon^{nb}$ are independently selected from the following group: A, C, G, T, and U.

In a preferred embodiment of the aptamer or of any of its derivatives defined above in this aspect of the invention, the structure with sequence $Mon^1$-$Mon^2$-$Mon^3$-$Mon^4$-$Mon^5$-$Mon^6$-$Mon^7$-$Mon^8$-$Mon^9$ . . . . $Mon^{18}$ consists of or comprises the sequence SEQ ID NO 2.

In another preferred embodiment of the aptamer or of any of its derivatives defined above in this aspect of the invention, the structure with sequence $Mon^1$-$Mon^2$-$Mon^3$-$Mon^4$-$Mon^5$-$Mon^6$-$Mon^7$-$Mon^8$-$Mon^9$ . . . . $Mon^{29}$ consists of or comprises the sequence SEQ ID NO 3.

A second aspect of the invention relates to a DNA gene construct useful for the in vitro (IVT) or intracellular synthesis by transcription of an RNA aptamer of the invention, characterized in that it comprises a DNA nucleotide sequence encoding the RNA aptamer nucleotide sequence.

A third aspect of the invention relates to the use of an aptamer of the invention as an inhibitor for inhibiting the replication of cancer cell lines, preferably breast cancer, more preferably triple-negative breast cancer, in a cell culture.

A fourth aspect of the invention relates to the use of an aptamer of the invention for manufacturing a pharmaceutical composition, or alternatively for the use thereof in therapy.

In a fifth aspect, the invention relates to said pharmaceutical composition. The pharmaceutical composition according to the present invention comprises at least one aptamer or any of its derivatives. Said composition may likewise be referred to herein as "pharmaceutical composition of the invention" or "composition of the invention," and may simultaneously comprise more than one aptamer of any of the aptamers defined in the first aspect of this invention. Additionally, it may comprise other therapeutic or potentiating molecules together with optionally one or more pharmaceutically acceptable vehicles and/or adjuvants. Preferably, the pharmaceutical composition comprises as a therapeutic molecule an inhibitor of mammalian target of rapamycin (mTOR). More preferably, said inhibitor is sirolimus or the 40-O-(2-hydroxyethyl) derivative of sirolimus, Everolimus.

According to the present invention, the pharmaceutical compositions of the invention can be administered to humans or can be used in veterinary medicine, particularly with other mammals. The administration will be carried out with a "therapeutically effective dose," being sufficient to demonstrate a benefit for the patient which is generally linked to a decrease in tumor size in the affected organism or to the inhibition of metastasis or an improvement in the clinical symptoms of the disease. The prescription of the treatment, i.e., decisions concerning dose, frequency, duration, etc., shall fall under the responsibility of the general physician or specialist taking care of the infected patient.

In the scope of the present invention, the term "therapeutically effective dose" refers to an amount of a drug or compound (or amount per unit of mass of the individual to whom the drug or compound is administered) which causes a detectable therapeutic effect in an individual or a group of individuals to whom the drug or compound is administered, causing minimum side or toxic effects. The term "therapeutically effective dose-50" or "therapeutically effective dose-95" includes a statistical value in which the therapeutic effect must be able to be detected in 50% or 95% of the individuals to whom the drug or compound is administered. With respect to the toxic effects of the drug or compound, the effective therapeutic dose preferably does not cause any such effects. However, although toxic effects may arise in some cases, a compromise can be reached in which these effects are considered as being preferred over the normal development of the disease, infection, or illness without the administration of the drug or compound, and these effects can in turn be treated by means of additional therapies.

The pharmaceutical compositions according to the present invention may comprise, in addition to the active ingredient, one or more pharmaceutically acceptable vehicles and/or adjuvants known by those skilled in the art. Such materials must not be toxic and furthermore must not interfere with the efficacy of the active ingredient (the aptamer, in the case of the present invention). The precise nature of the carrier or of the coadjuvant material will depend on the route of administration which can be, for example and without serving as a criterion for exclusion, by oral route, inhalation, cutaneous or mucosal absorption, or by means of injection, for example, cutaneous, subcutaneous, or intravenous injection. Particularly preferred pharmaceutical compositions are those in which the active molecule is in a form that is widely used for delivery into a cell, such as, for example, in a transfection system such as jetPEI®, or Lipofectamine™ 2000, or into a vesicle formed by fatty acids, a liposome formed by lipids, a nanostructure formed by proteins or other molecular components for such purposes known by those skilled in the art.

Dosage forms for oral administration can be in the form of tablets, capsules, powder, or liquid solution. A tablet may contain a solid carrier such as gelatin or an adjuvant. Liquid pharmaceutical compositions generally comprise a liquid carrier such as water, animal, vegetable, or synthetic oils. Physiological saline solutions may contain dextrose or another saccharide or glycol solution such as ethylene glycol, propylene glycol, or polyethylene glycol. For intravenous, cutaneous, or subcutaneous injection, or injection at the site of the disease, the active ingredient will preferably be in a form that is widely used for delivery into a cell, such as, for example, in a transfection system such as jetPEI®, or Lipofectamine™ 2000, or in a vesicle formed by fatty acids, a liposome formed by lipids, a nanostructure formed by proteins or other molecular components for such purposes known by those skilled in the art. Furthermore, for intravenous, cutaneous, or subcutaneous injection, or injection at the site of the disease, the active ingredient preferably delivered as indicated, will be in the form of a parenterally acceptable aqueous solution, which is pyrogen-free and has a suitable pH, stability, and tonicity. Those skilled in the art will be able to prepare suitable solutions using, for example, isotonic vehicles such as a saline injection, injection with Ringer's solution, and injection with Ringer's lactate solution. Preservatives, stabilizers, buffer systems, antioxidants, and/or other additives may be included, when required.

Another aspect of the invention relates to the use of the aptamers of the invention in medicine, and therefore also to the use of at least one aptamer of the invention for manufacturing a pharmaceutical composition for the treatment and/or prevention of a disease, preferably an oncological disease, preferably in a human subject, preferably, but not limited to, the treatment of breast cancer, uterine cancer, colorectal cancer, prostate cancer, liver cancer, lung cancer, bladder cancer, tongue cancer, head and neck cancer, skin cancers, brain cancer, esophageal cancer, stomach cancer, testicular cancer, ovarian cancer, kidney cancer, neuroendocrine cancers, and bone cancer, lymphomas, leukemias, myelomas, and carcinomas of unknown origin, more preferably for the treatment of breast cancer, even more preferably triple-negative breast cancer, comprising the administration of a therapeutically effective amount of an aptamer of the invention.

EXAMPLES

Materials and Methods

Cells

MCF 7 (ATCC® HTB-22TM): Epithelial cell line derived from human breast adenocarcinoma. These cells are characterized by expressing the estrogen receptor (ER+), progesterone receptor (PR+), and not overexpressing human epidermal growth factor receptor 2 (HER2-). MDA-MB-231 (ATCC® HTB-26TM): Epithelial cell line derived from human breast adenocarcinoma. They are characterized by being triple-negative cells: ER-, PR-, and HER2-. MDA-MB-468 (ATCC® HTB-132TM): Epithelial cell line derived from human breast adenocarcinoma. They are characterized by being triple-negative cells: ER-, PR-, and HER2-.

Transfection

The Lipofectamine™ 2000 system (Invitrogen, USA) was used to treat cells with the different aptamers. To prepare the DNA-lipofectamine complex, lipofectamine and DNA were separately diluted in opti-MEM (Gibco, USA) and left to incubate at room temperature for 5 minutes. They were then mixed to form lipofectamine-DNA complexes and incubated for 20 minutes at room temperature. Finally, the mixture was added to the cells that had been washed twice with antibiotic-free medium to prevent the interference thereof with lipofectamine. The cells were incubated at 37° C. for 5 hours, after which the reagent was removed and a complete medium was added.

For transfection in the in vivo model, the in vivo-jetPEI® transfection system (Polyplus, France) was used according to the manufacturer's instructions. The aptamer and jetPEI® reagent were separately diluted in glucose for the subsequent addition of the jetPEI® complex to that of the aptamer, such that the final glucose concentration is 5%. It was added to the cultures or injected into animals according to the assay.

Cell Viability and Proliferation Assays

Two methods were used as a cell viability and/or proliferation measurement:

Trypan blue exclusion. Cells (live and dead) were collected in their corresponding medium, trypan blue (Sigma-Aldrich, USA) was added, and the cells were counted using the TC20 counter (BioRad, USA). Living cells are those which exclude the dye. The results were expressed as the number of living cells/mL.

MTT activity. The cells were seeded in 96-well plates and after having been transfected, the culture medium was removed and 100 µL/well of MTT at 1 mg/ml in culture medium were added. The plates were incubated for 90 minutes in an incubator with a moisture-saturated environment at 37° C. and 5% $CO_2$/95% $O_2$ and 100 µL/well of a lysis solution (10% SDS and 10 mM HCl) were added for dissolving the crystals. After 48 hours, the reduction of MTT was determined by means of spectrophotometry in Infinite F200 (TECAN, Switzerland) at 540 nm.

The results were expressed as the percentage of viability with respect to the control or in absorbance units.

Determination of the Structure by NMR

To perform nuclear magnetic resonance (NMR) experiments, the samples were dissolved in a 10 mM potassium phosphate buffer. They were dissolved in 300 µL of $D_2O$ or 9:1 $H_2O/D_2O$. The concentrations of the resulting solutions were 10 µM.

NMR spectra were obtained using Bruker Avance 600 MHz or 800 MHz spectrometers (Bruker, USA) and processed with the Topspin software. The NOESY experiment was carried out in $H_2O$ at 35° C. at a mixing time of 150 ms; water suppression was carried out with the WATERGATE module.

ELONA and Apta-Western

To determine the binding of the aptamers to MNK1a or MNK1b, 200 ng of protein/well diluted in a coating solution (KPL, USA) in a final volume of 100 µL/well were added to a Maxisorp Nunc 96-well ELISA plate (ThermoFisher Scientific, USA). The plate was incubated overnight at 4° C. under stirring. Aptamers were then added at the corresponding concentration according to the assay, in a final volume of 100 µL/well of BSA-free aptamer buffer for 1 hour at 37° C. under stirring. All the aptamers used were labeled with biotin and had been previously denatured at 90° C. for 10 minutes and then kept at 4° C. for 10 minutes in the BSA-free aptamer buffer. To detect the binding of the aptamer to the protein, 100 µL/well of streptavidin-peroxidase (GE Healthcare, United Kingdom) diluted 1/1000 in the aptamer buffer at 37° C. for 1 hour under stirring were added. To develop the plate, 100 µL/well of ABTS solution (Roche, Switzerland) were added, and it was incubated in darkness at room temperature, with measurements being taken every 10 minutes at a wavelength of 405 nm in an Infinite F200 spectrophotometer (TECAN, Switzerland).

In the apta-western assays, the proteins were resolved in polyacrylamide gels in native or denaturing conditions, transferred to PVDF membranes, and incubated with aptamers and streptavidin-peroxidase as indicated above after blocking with 5% PBS-BSA. Finally, the signal was visualized with the chemiluminescence developing system (Clarity Western ECL, BioRad, USA).

Stability Assays

The previously structured aptamer apMNKQ2 (1 μg) was incubated in the presence of 1 unit, 0.5 units, and 0.25 units of the enzyme DNase I (ThermoFisher Scientific, USA) in the buffer supplied by the company (10 mM Tris HCl, pH 7.5, 2.5 mM $MgCl_2$, 0.1 mM $CaCl_2$)) for 5 minutes at 37° C., and the reaction was then stopped by adding 1 μL of 50 mM EDTA (ThermoFisher Scientific, USA) and heating at 65° C. for 10 minutes. For plasma stability assays, 2.4 μg of aptamer apMNKQ2 were incubated with 16 μL of human plasma at 37° C. Aliquots of 5 μL of the aptamer-plasma solution were taken at 0, 6, 24, and 48 hours. The aliquots were heated at 65° C. for 10 minutes to inhibit the activity of the nucleases present in the plasma, said aliquots were then left on ice for 10 minutes and kept at −20° C. The samples were analyzed using an Experion™ DNA 1K Analysis Kit chip (BioRad, USA). The intensity of each of the bands corresponding to the aptamers treated or not treated with DNase I or plasmas was assessed and the percentage of stability was calculated by dividing the value obtained for each of the treated aptamers by the value obtained for the untreated aptamer.

Apoptosis Assays

Determination of the Number of Apoptotic Cells by Annexin V/Propidium Iodide

The assays were carried out by seeding $5\times10^5$ cells/well in 6-well plates and transfecting the cells 24 hours later. After 24 hours of transfection, the cells were collected and washed twice with PBS. They were then resuspended in a 1× binding buffer and left at a concentration of $1\times10^6$ cells/mL. Aliquots of $10^5$ cells were separated from the preceding solution, as many as the number of treatments, and the annexin V and propidium iodide dyes were added to obtain: a double negative control (without labeling, living cells), a double positive for both types of labeling (late apoptotic cells and necrotic cells will be labeled), and cells labeled separately with annexin V and propidium iodide. They were incubated in darkness for 15 minutes at room temperature and brought to a final volume of 500 μL with a 1× binding buffer. Finally, the cells were passed through a flow cytometer (BD FACSCalibur™, BDBiosciences, USA) within a time no more than 1 hour after labeling. The data obtained was analyzed by means of the Flowing software 2.5.1 program.

Analysis of Caspase 3 Activity

Caspase 3 activity was assessed by means of western blot with two endogenous substrates of this protein:

the enzyme poly ADP-ribose (PARP), fractionated in late apoptotic stages, using a specific antibody that only recognizes the PARP fragment processed by caspase 3.

the protein α-spectrin, with an antibody capable of recognizing the complete form and the fragments obtained after being broken down by caspase 3.

Colony Formation Assays

To perform these assays, $3\times10^4$ cells/well were seeded in 24-well plates with every 2 wells being considered an experimental point. At 16-24 hours, the cells were transfected with apMNKQ2 or the control aptamer. At 16-24 hours post-transfection, the cells of every two wells were pooled, resuspended in the corresponding medium, counted, and after performing the suitable dilutions, reseeded $1\times10^3$ or $5\times10^3$ cells/well in duplicate in 6-well plates. These plates were left in the incubator with a moisture-saturated environment at 37° C. and 5% $CO_2$/95% $O_2$ for 8-9 days. After this time, the colonies were fixed with methanol (Merck, Germany) for 10 minutes, stained with 0.02% giemsa (Sigma-Aldrich, USA) for 30 minutes, washed with water to eliminate the remaining dye, and left to dry at room temperature. To count the colonies, a colony counter pen (Heathrow Scientific® LLC, United Kingdom) and a magnifying glass (1.75×) (Bel-Art Scienceware, USA) were used. The results were expressed in number of colonies and normalized in percentage with respect to the control.

Migration and Invasion Assays

Cell migration and invasion assays were performed using transwell (Corning, USA). The cells, previously transfected and incubated for 16 hours, were deprived of serum for 18 hours. After that time, they were collected, counted, and reseeded $4\times10^4$ cells in 300 μl of a serum-free complete medium inside the transwell (migration) or a transwell on which a layer of 100 μL of Matrigel (Corning, USA) (invasion) had previously been polymerized. The transwells were introduced in wells of a 24-well plate, with a final volume of 500 μL of complete medium with 10% SBF as chemoattractant in the bottom part. After 24 hours (migration) or 48 hours (invasion) of assay, the medium was eliminated from both the inside of the transwell and the bottom part of the well of the plate. The membrane of the transwell, which will contain cells that have migrated, was fixed by immersing same in 4% paraformaldehyde for 2 minutes, followed by 20 minutes in 100% methanol. The cells were then stained by immersing the transwell in a 30 μM Hoechst solution for 15 minutes protected from light. Finally, two washes in PBS were performed, and 5 photographs of each membrane of the transwell were taken using a fluorescence microscope (Olympus IX70). The number of cells was analyzed using the imageJ program.

Analysis of mRNA Levels

Total RNA was obtained from cells using the NucleoZOL reagent (MACHEREY-NAGEL, Germany) according to the manufacturer's instructions. Obtained RNA purity and integrity analyses were performed using the Experion™ RNA HighSens Analysis Kit chip (BioRad, USA). For the quantitative analysis of the mRNA levels, cDNAs were obtained with the SensiFAST™ cDNA synthesis kit (Bioline, United Kingdom) and real-time PCR was carried out in an IQ5 thermocycler (BioRad, USA) with the FastGene IC Green 2×qPCR Universal Mix kit (NIPPON Genetics, Germany).

Assays in Mice with Orthotopic Breast Tumors

In vivo assays were performed with nude mice inoculated with MDA-MB-231 cells and orthotopic tumors were generated. When these tumors reached a volume of 100 $mm^3$, the mice were randomly distributed into two groups of 9 animals. The treated group (1.8 mg/kg) was intravenously injected with 100 μl of 5% glucose containing 46 μg (5 nmol) of apMNKQ2 and 5.6 μl of jetPEI® transfectant (N/P ratio of 6) three times a week. The control group was injected with the 5% glucose solution containing the same volume of in vivo-jetPEI® reagent and aptamer buffer. As monitoring parameters, the tumor volume, assuming they are ellipsoids, and the weight of the animals were measured. At 18 days, the animals were sacrificed and the tumors were weighed and divided into two fragments, one to be frozen and another for fixing and inclusion in paraffin.

The immunohistochemical determination of the proliferating cell nuclear antigen (PCNA), sections of the paraffinized samples were made and they were then deparaffinized and rehydrated. The antigen was unmasked by incubating the sections in a 10 mM citrate buffer in a pressure cooker at maximum pressure for 2 minutes. After performing two quick washes with distilled water and two 5-minute washes with TBS, the sections were incubated in a blocking solution (3% fetal bovine serum in TBS with 0.05% triton X-100) for 30 minutes at room temperature. The samples were then incubated with the primary antibody PCNA (Santa Cruz Biotechnology, USA) at a dilution of 1:100 at room temperature overnight. At the end of incubation, two 5-minute washes with TBS were performed, and the signal of the primary antibody was amplified and detected by means of the Master Polymer Plus Detection System Peroxidase kit (Master Diagnóstica, Spain) according to the manufacturer's specifications. Finally, the samples were stained with hematoxylin and mounted on slides with DEPEX mounting medium.

Efficacy Study in a Breast Cancer Orthotopic Mice Model with Spontaneous Metastasis The anti-tumour activity and the effect on and spontaneous metastasis of aptamers in BALBc mice bearing ortothopically human 4T1 breast tumours. When these tumors reached a volume of 100 mm³, the mice were randomly distributed into two groups of 9 animals. The treated group (3.6 mg/kg) was intravenously injected three times a week. The control group was injected with the 5% glucose solution containing the same volume of in vivo-jetPEI® reagent and aptamer buffer. As monitoring parameters, the tumor volume, assuming they are ellipsoids, and the weight of the animals were measured. At 18 days, the animals were sacrificed and the tumors were weighed and divided into two fragments, one to be frozen and another for fixing and inclusion in paraffin. The number of lung tumors metastasis was checked by inverse tincture method.

Results

Structural and Functional Characterization of apMNKQ2

Figure 2A:
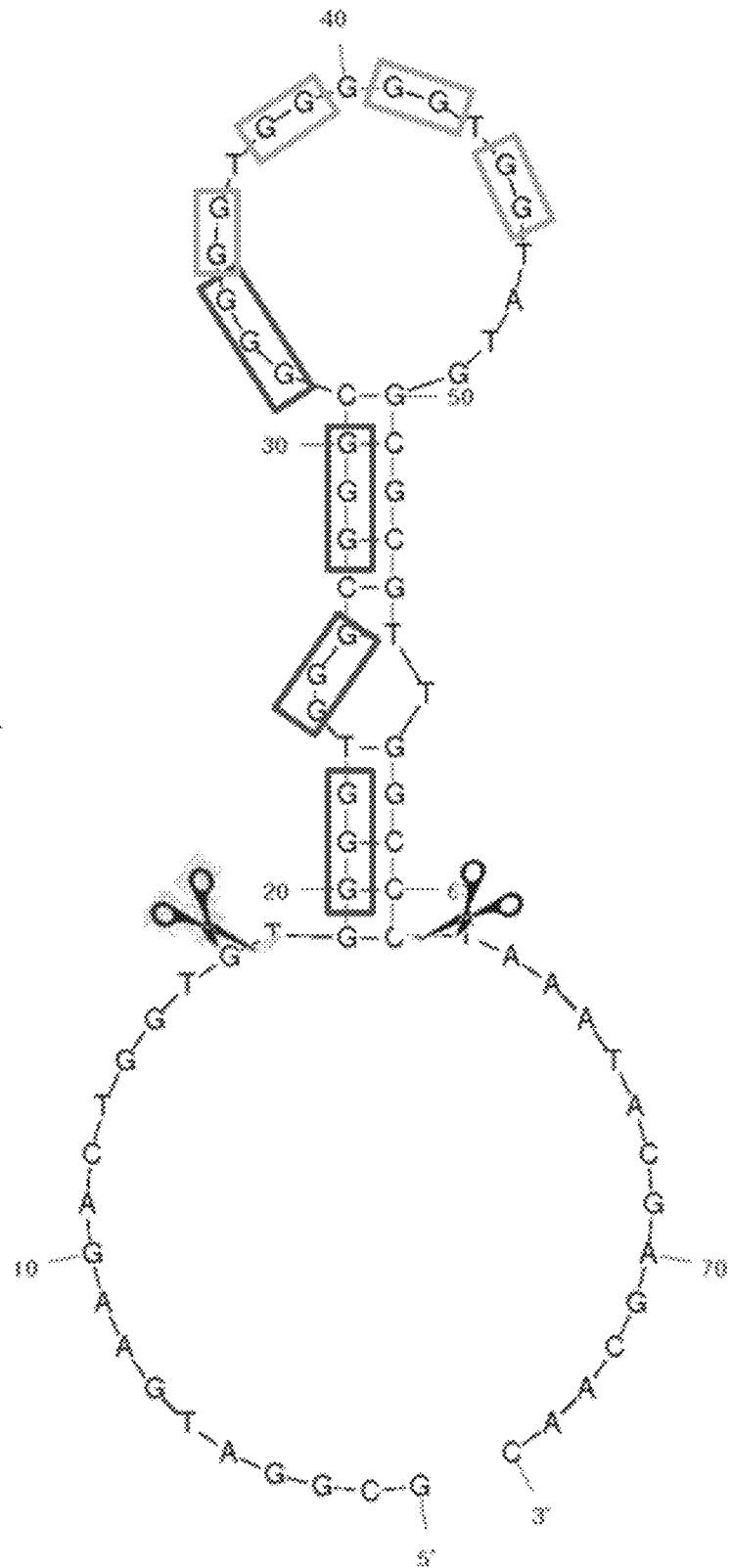
FIGS. 2A and 2B. Secondary and G-quadruplex structures. Graphical representation of the prediction of the secondary and G-quadruplex structures of the precursor aptamer apMNK2F (FIG. 2A) and the truncated aptamer apMNK2FT (FIG. 2B) by means of the bioinformatics sequence analysis with mFold and QGRS Mapper programs.
Figure 2B:
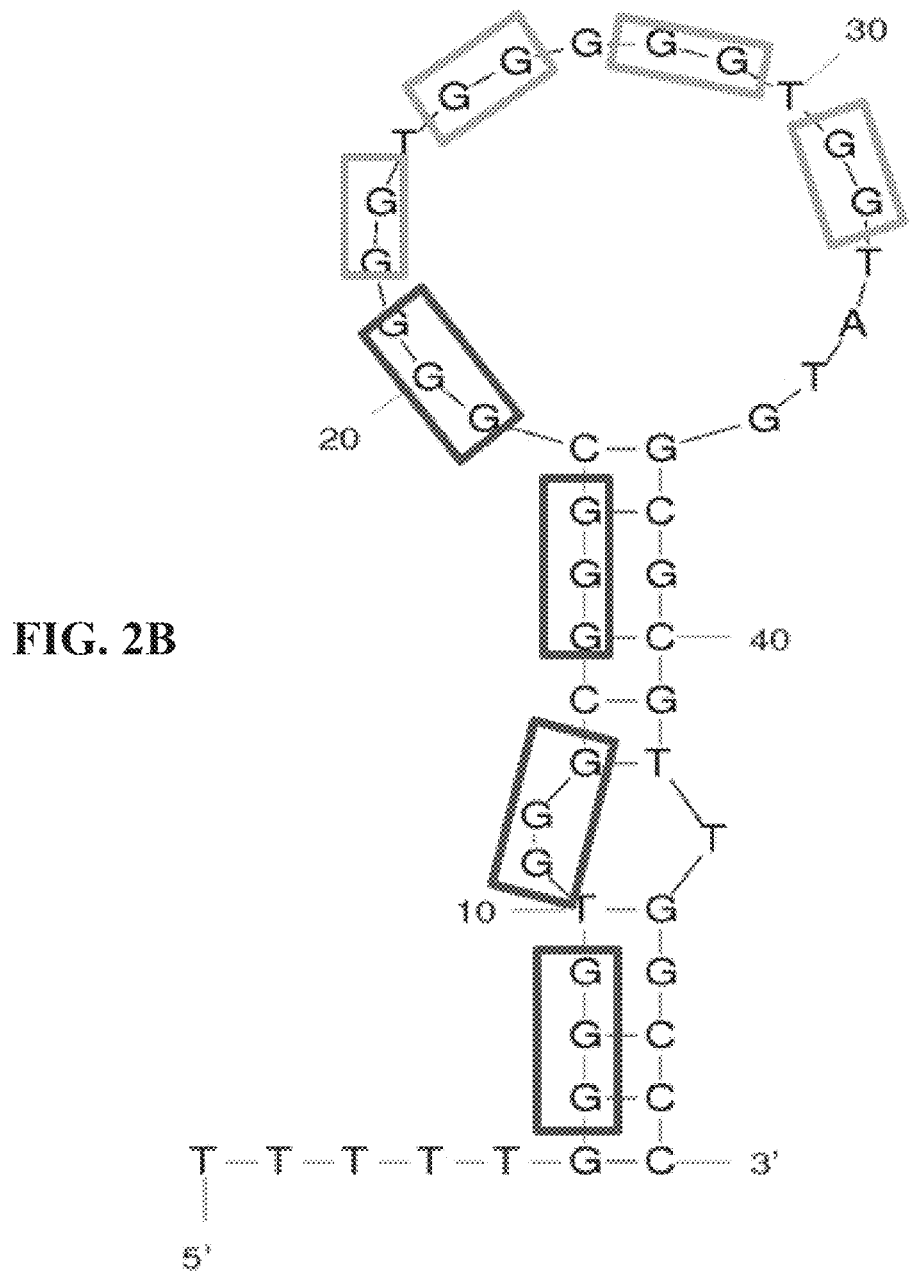

The structure of the aptamer apMNK2F as described above (Garcia-Recio, Pinto-Diez et al. 2016) was analyzed in silico by means of mFold and QGRS Mapper computer programs. This analysis led to the possibility of truncating this aptamer to eliminate regions which would not, a priori, constitute an impediment to the binding thereof to the target and which would, in turn, make the aptamer smaller, more cost-effective to synthesize, easier to administer, etc. As shown in FIGS. 2A and 2B, the first 19 nucleotides were eliminated from the 5' end, which were substituted with 5 thymines so as to add an extender, and the last 14 nucleotides were eliminated from the 3' end. In total, 33 nucleotides out of 75 nucleotides were eliminated from the precursor aptamer apMNK2F to synthesize the truncated 48-nucleotide aptamer apMNK2FT.

A more detailed analysis provided by the QGRS Mapper program allowed designing four different sequences from apMNK2FT (SEQ ID NO 1), based on the formation of G-quadruplex (Table 1). These sequences were referred to as apMNKQ1 (SEQ ID NO 2), apMNKQ2 (SEQ ID NO 3), apMNKQ3 (SEQ ID NO 4), and apMNKQ4 (SEQ ID NO 5) with 18, 29, 13, and 22 nucleotides, respectively.

TABLE 1

Design and synthesis of four sequences from the aptamer apMNK2FT depending on the possible G-quadruplex structures: aptamers apMNKQ1 (18 nt), apMNKQ2 (29 nt), apMNKQ3 (13 nt), and apMKQ4 (22 nt).

| | | SEQ ID NO. |
|---|---|---|
| apMNK2FT: | 5'-TTTTTGGGGTGGGCGGGCGGGGGTGGGGGTGGTATGGCGCGTTGGCCC-3' | 1 |
| apMNKQ1: | 5'TGGGGTGGGCGGGCGGGG-3' | 2 |
| apMNKQ2: | 5'TGGGGTGGGCGGGCGGGGGTGGGGGTGGT-3' | 3 |
| apMNKQ3: | 5'GGGTGGGGGTGGT-3' | 4 |
| apMNKQ4: | 5'-GGGTGGTATGGCGCGTTGGCCC-3' | 5 |

Figure 3:
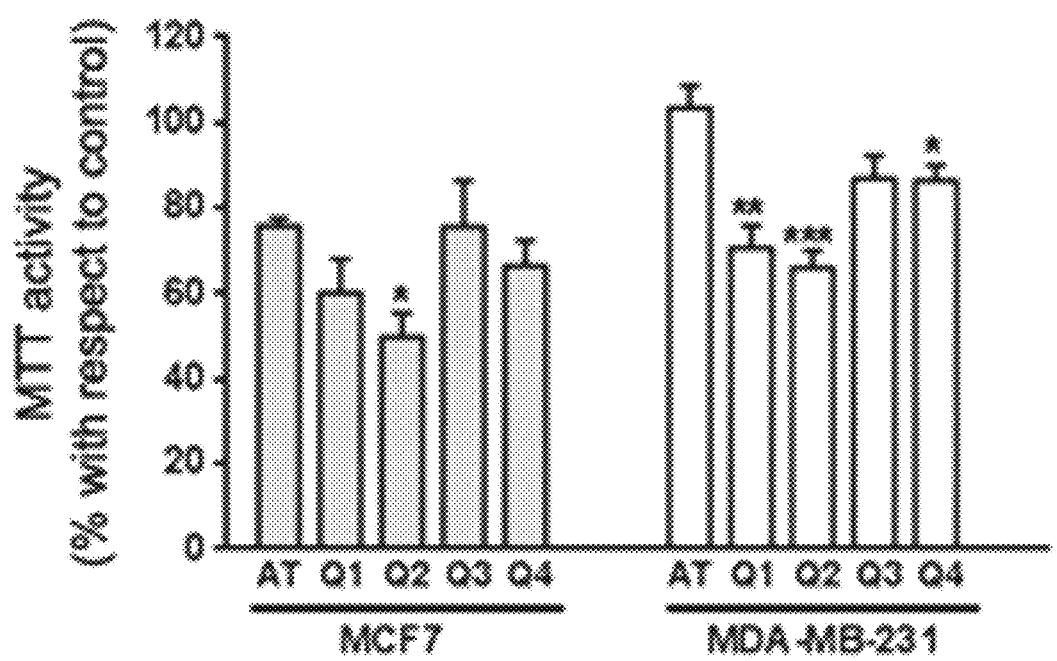
FIG. 3. Effect of the aptamers on MTT activity of MCF7 and MDA-MB-231 cells. The cells were seeded in 96-well plates at a density of $10^4$ cells/well. After 16-24 hours, they were transfected with aptamers apMNKQ1, apMNKQ2, apMNKQ3, and apMNKQ4 at 250 nM for 48 hours after which MTT activity assays were performed. The bars represent the mean±SEM of 3-6 independent experiments ($*p<0.05$, $p<0.01$, and $*p<0.001$ with respect to the control aptamer AT).

The antiproliferative activity of the four aptamers was analyzed in MCF7 and MDA-MB-231 lines. In parallel, a non-specific aptamer consisting of a central region of 20 consecutive AT pairs flanked by sequences corresponding to primers F3 and R3, referred to as aptamer AT, was used at the same concentrations. As shown in FIG. 3, the (29-nucleotide) aptamer apMNKQ2 has the greatest effect on MTT activity in both lines, reducing cell proliferation to 51% for MCF7 and to 36% for MDA-MB-231. In the MCF7 line, the aptamers apMNKQ1, apMNKQ3, and apMNKQ4 have a partial effect, similar to that obtained with the non-specific AT control. In the MDA-MB-231 line, apMNKQ1 shows 30% inhibition whereas apMNKQ3 and apMNKQ4 have a slight effect on MTT activity (of about 15%).

The Q2 NMR analysis (FIGS. 4A-4C) showed very broad signals, so guanine at position 23 was substituted with a thymine to improve the NMR spectra and enable finding a structure, as the bands overlap in apMNKQ2. The analysis of this aptamer suggests a construct with two parallel G-quadruplex segments (one with three tiers and another with two) interacting through the 3' terminal tetrad of one segment with the 5' terminal of the other segment, and forming as a whole a five-tiered parallel quadruplex (FIG. 4D).

The aptamer apMNK2F was capable of recognizing the two isoforms of MNK1, but with a higher affinity for MNK1b, whereas apMNK2FT recognized both isoforms in a similar manner.

Figure 5A:
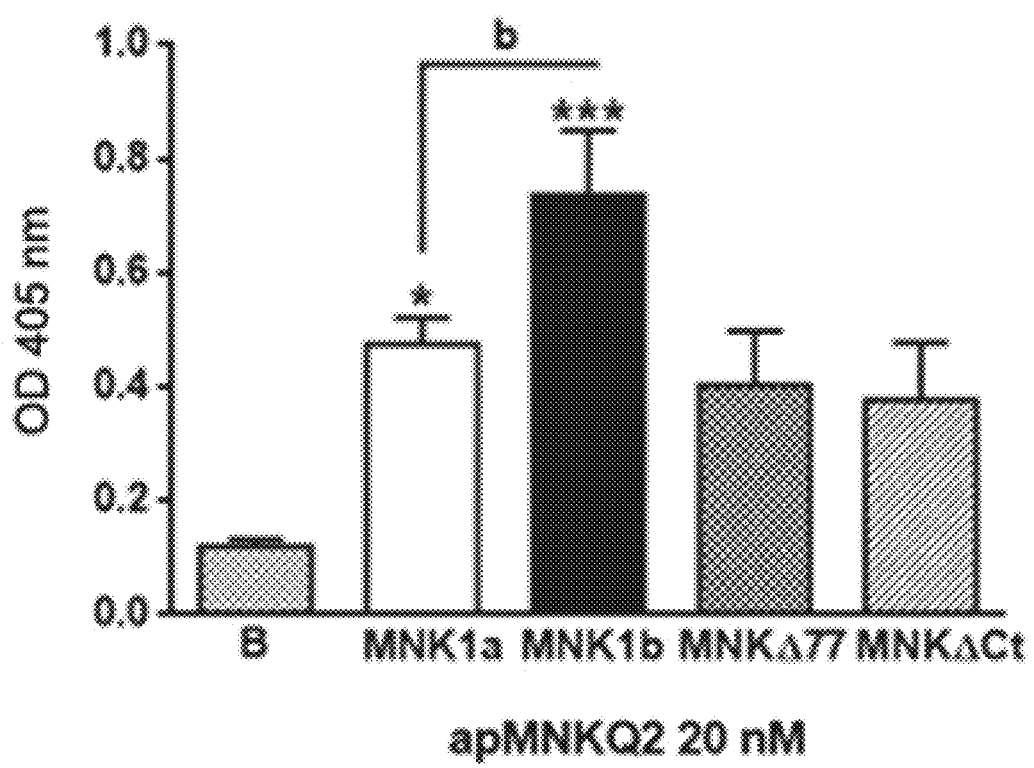
FIGS. 5A-5C. Characterization of the interaction of aptamer apMNKQ2 with MNK1 by means of ELONA. (A) ELONAs in which GST-MNKs previously adsorbed in 96-well plates at 0.2 µg/well (3 pmol/well) with apMNKQ2-Bio at 20 nM were incubated (FIG. 5A). The bars represent the mean±SEM of at least 3 independent experiments ($*p<0.05$, $p<0.01$, and $*p<0.001$ with respect to the blank and c $p<0.05$, b $p<0.01$, and a $p<0.001$ MNK1b with respect to MNK1a). ELONAs in which concentrations of 0 to 500 nM of apMNKQ2 were incubated (FIGS. 5A and 5C).
Figure 5B:
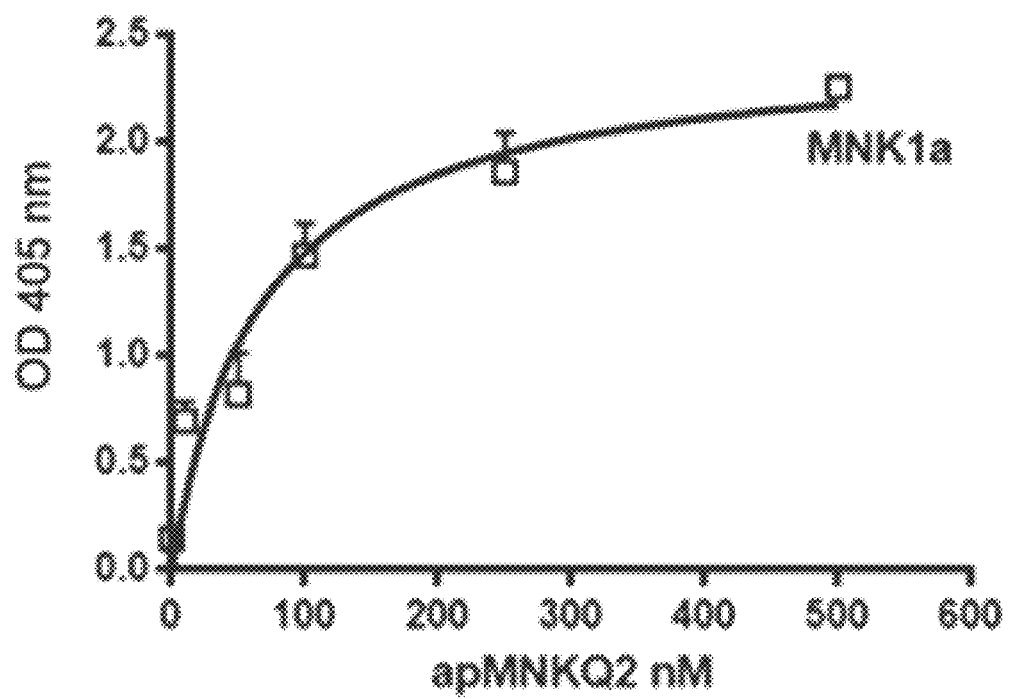
Figure 5C:
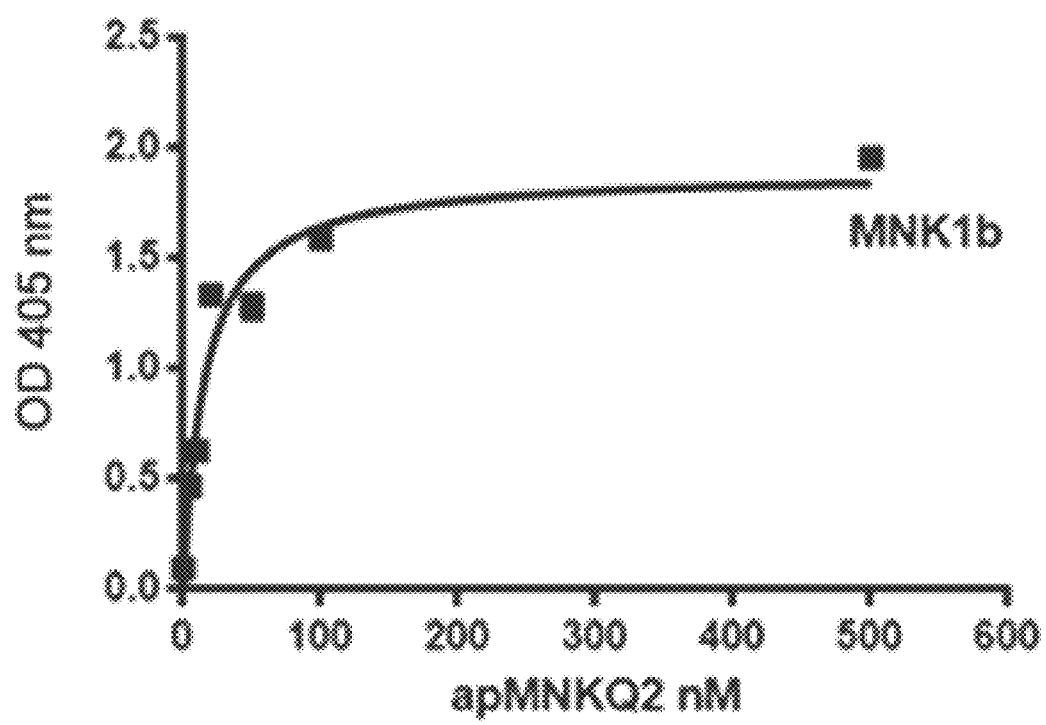

To analyze the affinity of the new aptamer apMNKQ2, ELONA assays were carried out with the four MNK1 constructs. As seen in FIGS. 5A-5C, apMNKQ2 binds significantly to both isoforms, with a significantly higher affinity for MNK1b than for MNK1a. In contrast, binding to the MNK1aΔ77 and MNK1ΔCt mutants was not significant, so it can be deduced that the nucleotides eliminated from the sequence of the aptamer allow it to be folded, such that it can specifically recognize its target with a higher affinity. As it has a smaller size, the aptamer could gain better access to the site of interaction with the protein. The affinity constant of apMNKQ2 was obtained by incubating increasing concentrations of biotin-labeled apMNKQ2 with the GST-MNK1a protein (FIG. 5B) or GST-MNK1b protein (FIG. 5C). The aptamer apMNKQ2 is capable of detecting both proteins in a concentration-dependent manner with a $K_D$ of 66.13±20.18 and 15.47±2.36 nM, for MNK1a and MNK1b, respectively, corroborating that apMNKQ2 has an affinity that is four-fold higher for MNK1b than it is for MNK1a.

Figure 6A:
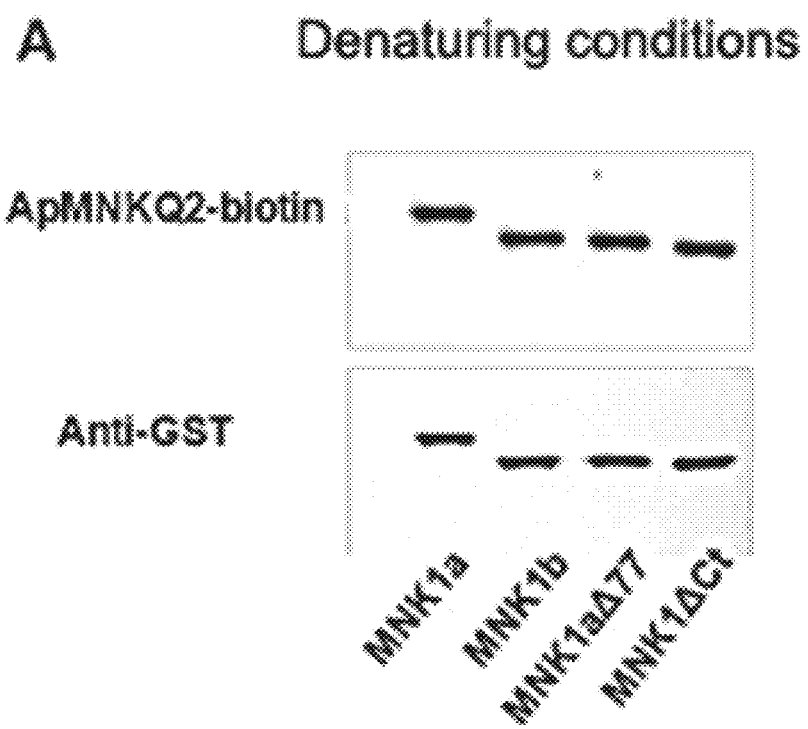
FIGS. 6A-6C. Characterization of the interaction of aptamer apMNKQ2 with MNK1 by means of Apta-western. Detection of MNK1a and MNK1b, as well as of the two GST-bound variants MNK1aΔ77 and MNK1aΔCt, with biotin-labeled aptamer apMNKQ2 in electrophoresis (12%) in denaturing conditions (FIG. 6A) and in native conditions (without SDS or β-mercaptoethanol) (FIG. 6B). Quantification of protein levels in relation to MNK1a ($*p<0.05$ with respect to 1) (FIG. 6C).
Figure 6B:
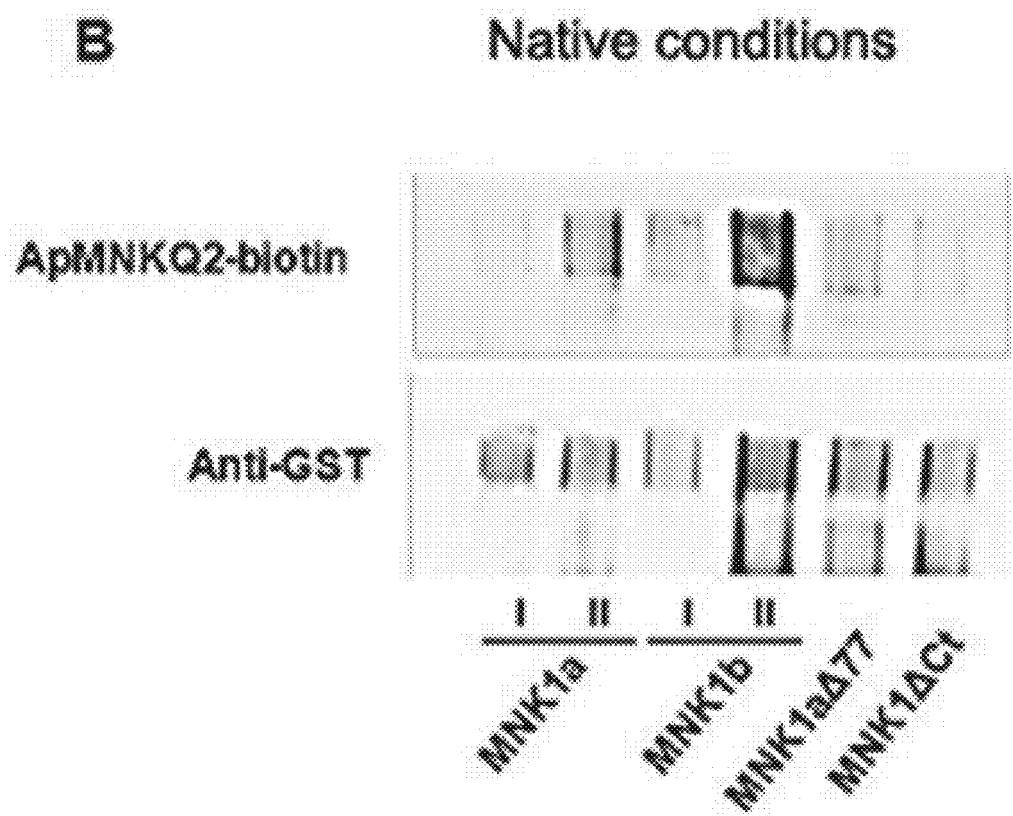
Figure 6C:
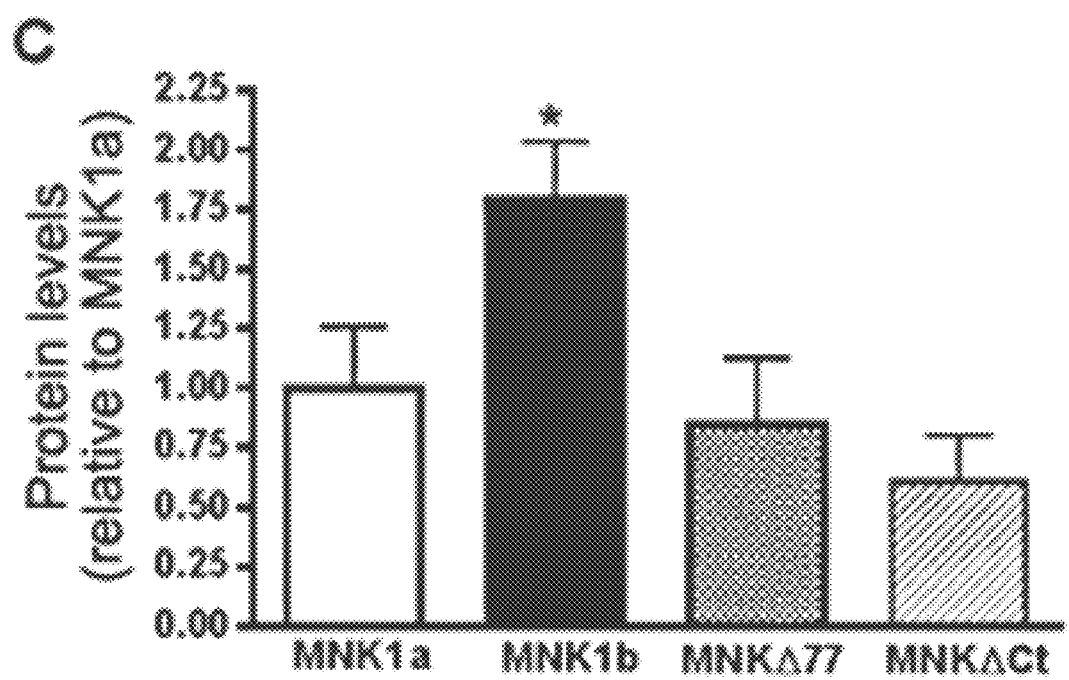

On the other hand, apta-western assays were carried out to confirm the affinity of the aptamer apMNKQ2 for proteins MNK1a and MNK1b. To that end, the four constructs used in FIG. 5A were analyzed by electrophoresis, blot, and apta detection. In denaturing conditions (FIG. 6A), apMNKQ2 is capable of recognizing and binding to the four isoforms of the protein in a similar manner. This may be due to the fact that the site the aptamer recognizes may not be accessible in all the proteins when they are structured and said site may be exposed as the proteins denature. To that end, other assays in which electrophoresis was performed in native conditions (without SDS or β-mercaptoethanol) were carried out. The result is shown in FIG. 6B and quantified in FIG. 6C. In native conditions, the aptamer apMNKQ2 is capable of significantly differentiating MNK1b from other isoforms, confirming the previous result obtained by means of ELONA assays.

The results obtained by means of ELONA and apta-western allow demarcating the region of interaction of the aptamer with the protein, which must be located at the C-terminal end, as this is where differences between the isoforms MNK1a and MNK1b, as well as with mutants MNK1aΔ77 and MNK1ΔCt, can be found.

Study of Aptamer apMNKQ2 Stability in the Presence of DNase and Plasma

Figure 7A:
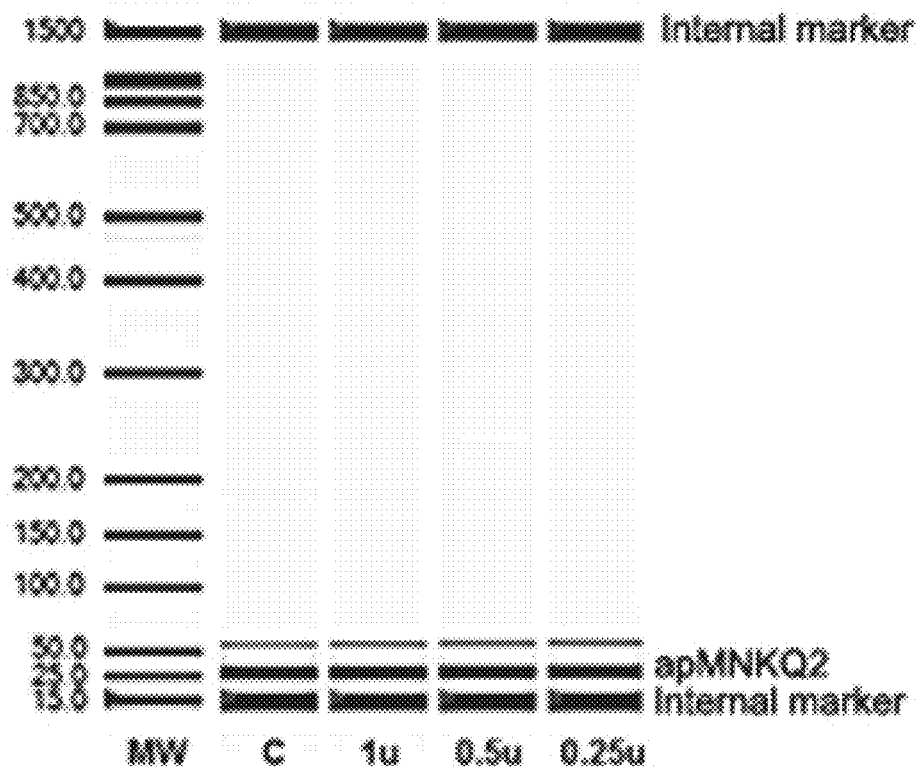
FIGS. 7A and 7B. Stability of apMNKQ2. Chip Experion™ DNA 1K Analysis Kit (BioRad, USA) for analyzing the stability of apMNKQ2 with 1 unit, 0.5 units, and 0.25 units of DNase I (FIG. 7A).
Figure 7B:
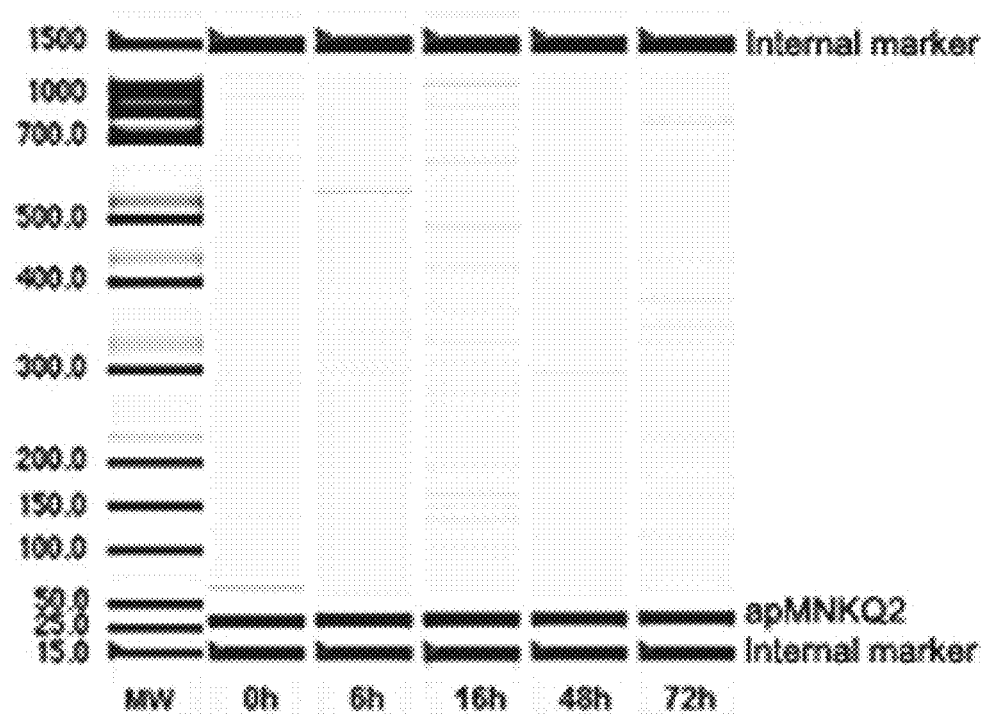

Resistance of the aptamer to degradation by DNases was analyzed by incubating 300 ng of structured apMNKQ2 in the presence of three concentrations of DNase I (Thermo Scientific, USA), as described in the Materials and Methods section. The stability and resistance to degradation of apMNKQ2 at three tested concentrations of DNase I can be seen in FIG. 7A. It must be pointed out that treatment of the aptamer in the presence of 1 unit of enzyme for 5 minutes causes no degradation of the aptamer (stability 100%), whereas treatment of the parental aptamer apMNK2F under the same assay conditions caused a complete degradation of the aptamer (stability 0%) (Garcia-Recio, Pinto-Diez et al. 2016). Resistance of aptamer apMNKQ2 to degradation by plasma proteins (Materials and Methods) was also analyzed by incubating 300 ng of the aptamer in the presence of human plasma for 72 hours and taking aliquots at the times indicated in FIG. 7B. As can be seen, there was no degradation of the aptamer in the presence of proteins present in plasma throughout the duration of the experiment. This is important in view of the possible therapeutic application of aptamer apMNKQ2.

Effect of Aptamer apMNKQ2 on Breast Tumor Lines

Aptamer apMNKQ2 Inhibits Cell Proliferation

Figure 8A:
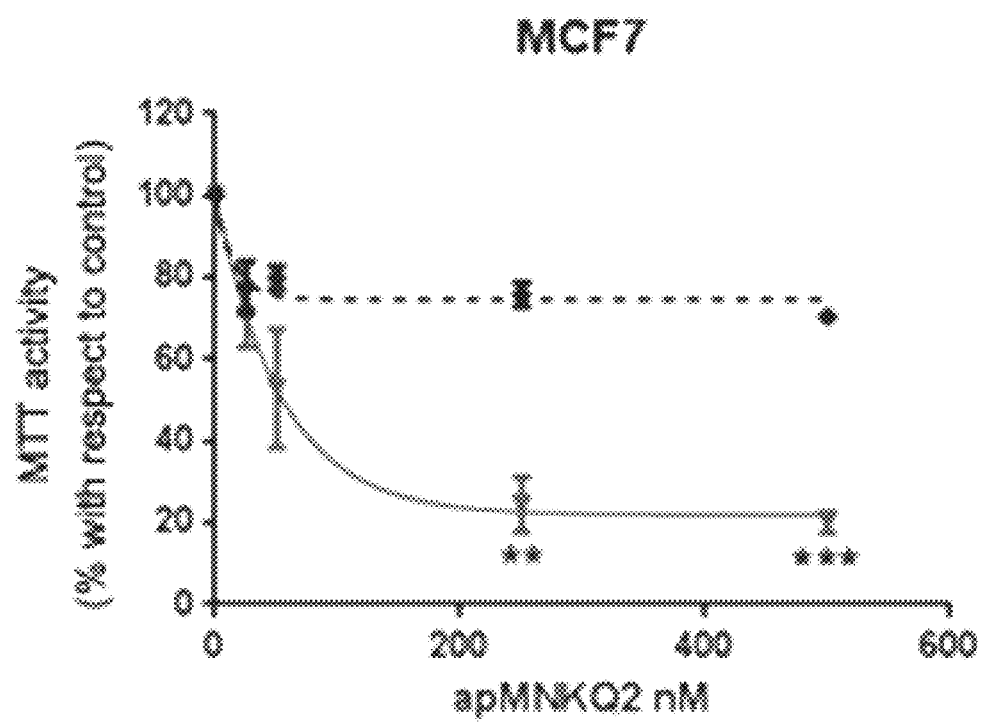
FIGS. 8A-8C. Effect of aptamer apMNKQ2 on MTT activity of breast cell lines. MCF7, MDA-MB-231, and MDA-MB-468 cells were seeded in 96-well plates at a density of $10^4$ cells/well. After 16-24 hours, they were transfected with apMNKQ2 at 0, 25, 50, 250, and 500 nM for 48 hours, after which MTT activity assays were performed. The graphs represent the means±SEM of 3 independent experiments ($*p<0.05$, $p<0.01$, and $*p<0.001$ with respect to the control AT).
Figure 8B:
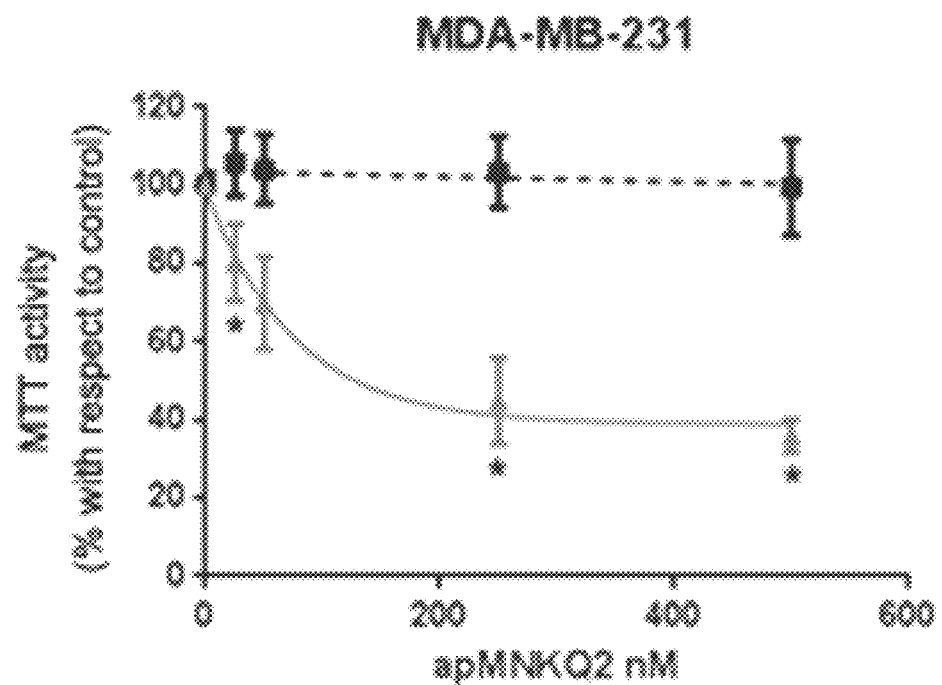
Figure 8C:
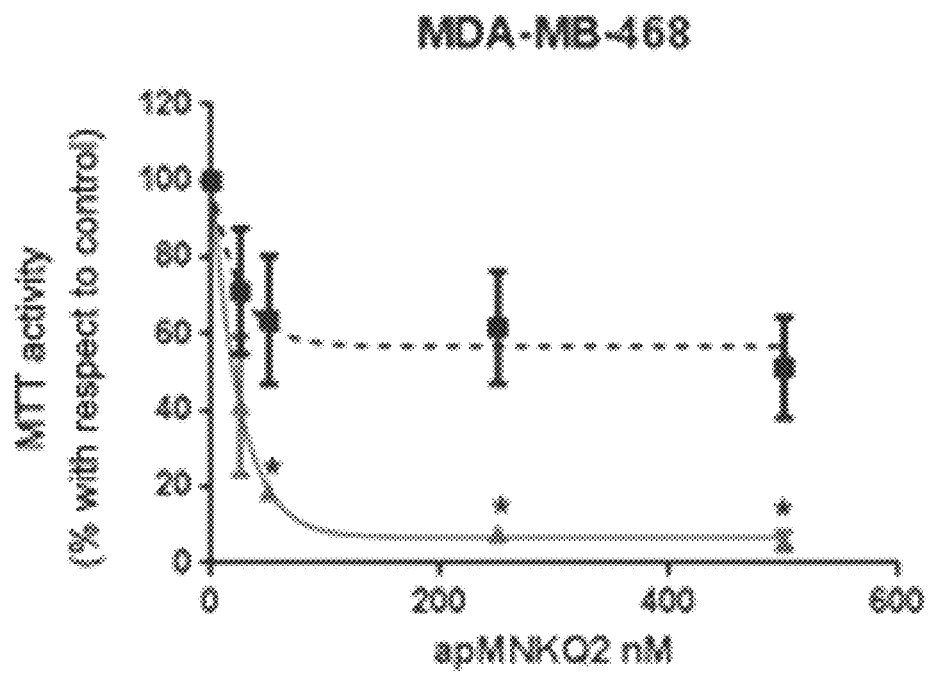

The manner in which aptamer apMNKQ2 affects cell viability was analyzed. To that end, the cells were transfected with increasing concentrations of apMNKQ2 (0 to 500 nM) and MTT activity was measured at 48 hours. In parallel, the non-specific aptamer AT was transfected at the same concentrations. As shown in FIGS. 8A-8C, apMNKQ2 decreased MTT activity in a concentration-dependent manner in the three lines, with the MDA-MB-468 line being the most sensitive. The control aptamer causes a slight effect except on the MDA-MB-468 line in which it causes an inhibition of 40% which is, however, significantly less than the inhibition caused by aptamer apMNKQ2. The GI50 obtained for each of the cell lines used in this experiment was 42 nM, 144 nM, and 19 nM for MCF7 (FIG. 8A), MDA-MB-231 (FIG. 8B), and MDA-MB-468 (FIG. 8C), respectively. For the rest of the experiments, concentrations about three times the GI50, i.e., 150 nM for MCF7, 400 nM for MDA231, and 50 nM for MDA-MB-468, were set.

Figure 9:
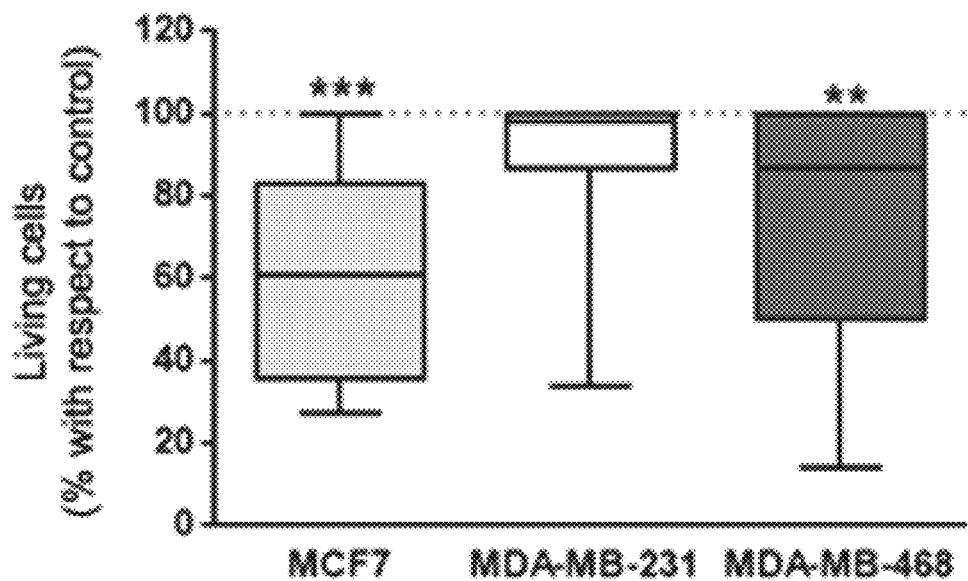
FIG. 9. Cell viability analysis by trypan blue exclusion. MCF7, MDA-MB-231, and MDA-MB-468 cells from different experiments were collected 24 hours after transfection, diluted 1:10 in trypan blue, and counted in a TC20 counter (BioRad, USA). The boxes represent the mean±the maximum and minimum of 12-14 independent experiments ($p<0.01$, and $*p<0.001$ with respect to the control aptamer AT).

The cell lines were then transfected with the previously established concentrations and the number of living cells was determined 24 hours after transfection with apMNKQ2 or with the control aptamer AT by means of trypan blue exclusion. A significant drop in the total number of living cells (FIG. 9) treated with apMNKQ2 is observed in the MCF7 and MDA-MB-468 lines, whereas the MDA-MB-231 line experiences a very slight drop.

Aptamer apMNKQ2 Induces Apoptosis

Figure 10A:
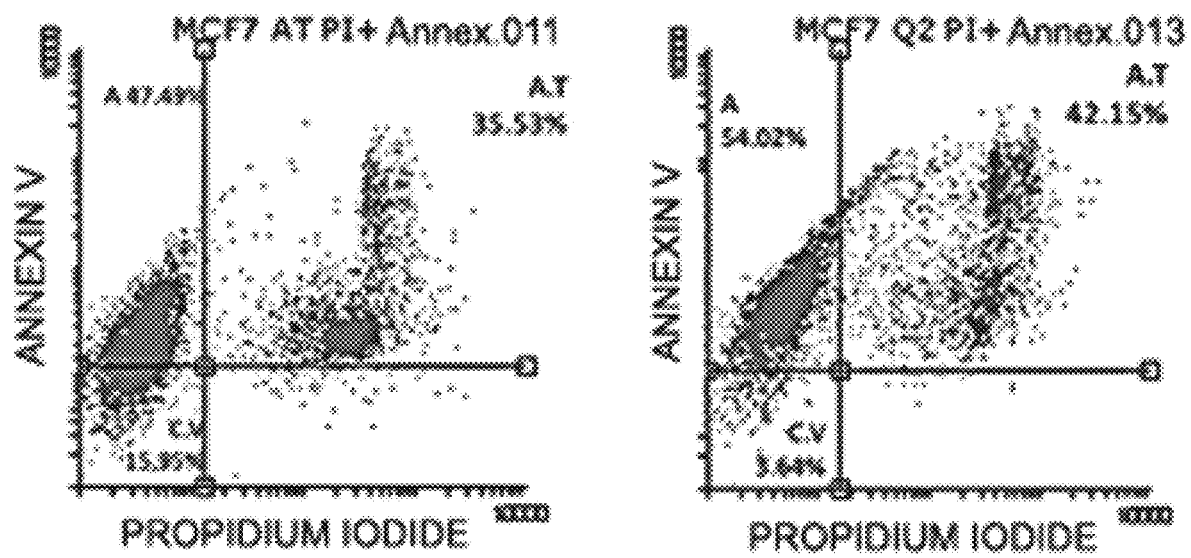
FIGS. 10A-10C. Analysis of the effect of the aptamer on apoptosis with annexin V in breast cell lines. MCF7 (FIG. 10A), MDA-MB-231 (FIG. 10B), and MDA-MB-468 (FIG. 10C) cells were seeded in 6-well plates at a density of $2.5 \times 10^5$ cells/well and transfected at 24 hours with apMNKQ2 at the set working concentrations. After 24 hours, the cells were collected, fixed, and stained with annexin V-FITC and propidium iodide. Finally, they were analyzed by cytometry. The bars represent the mean±SEM of 3 independent experiments ($*p<0.05$, $p<0.01$, and $*p<0.001$).
Figure 10A:
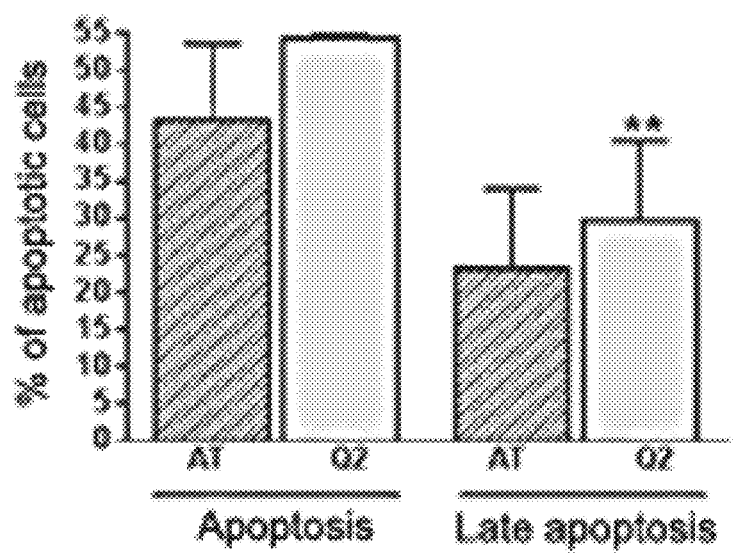
Figure 10B:
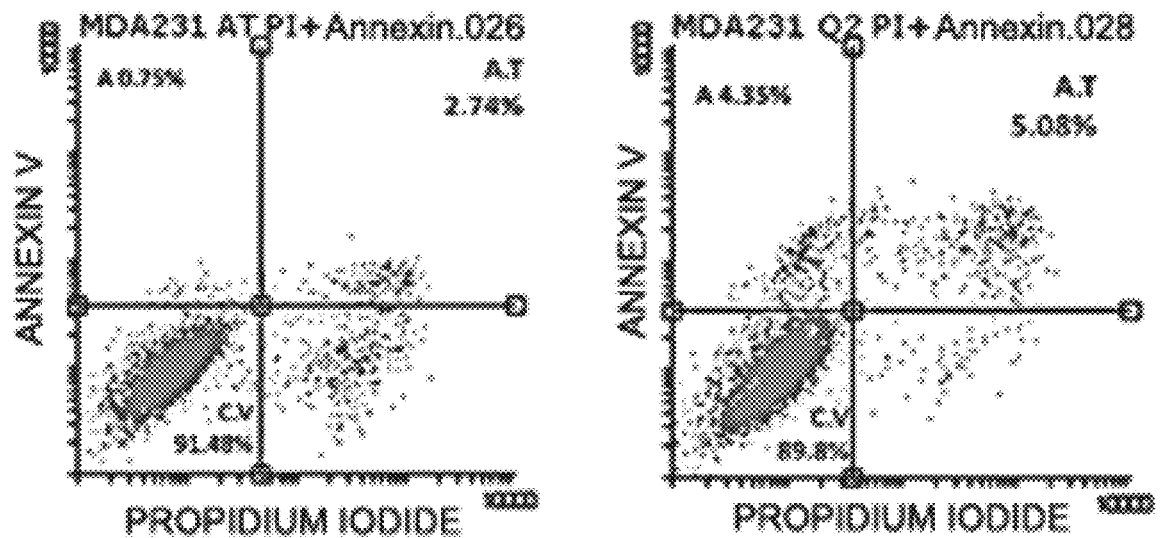
Figure 10B:
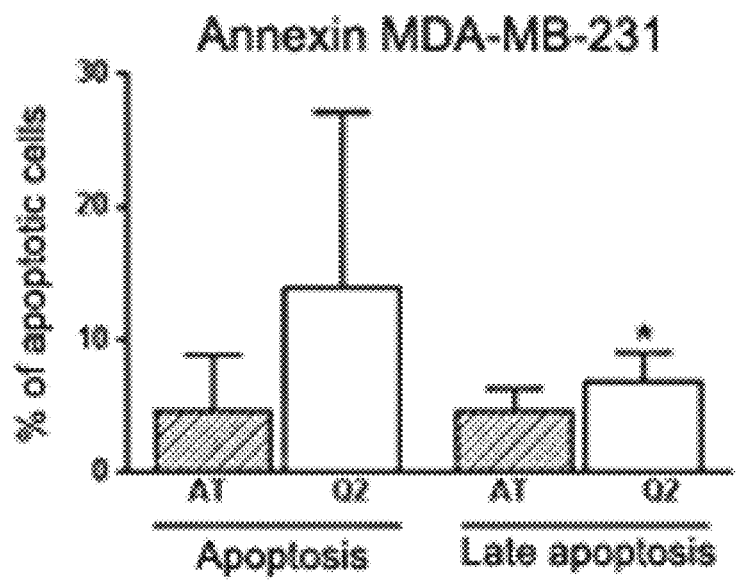
Figure 10C:
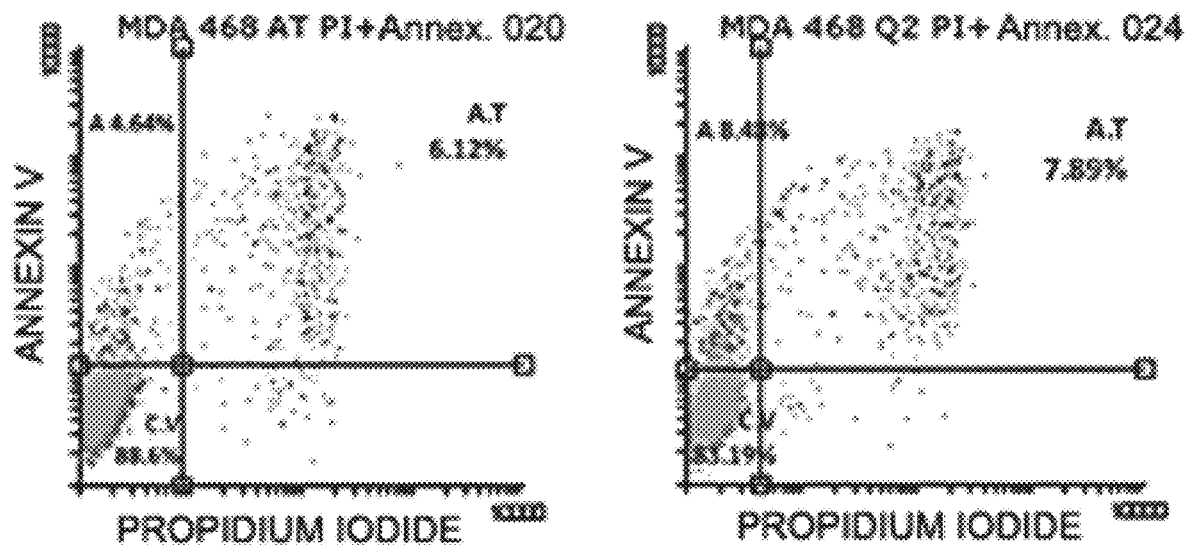
Figure 10C:
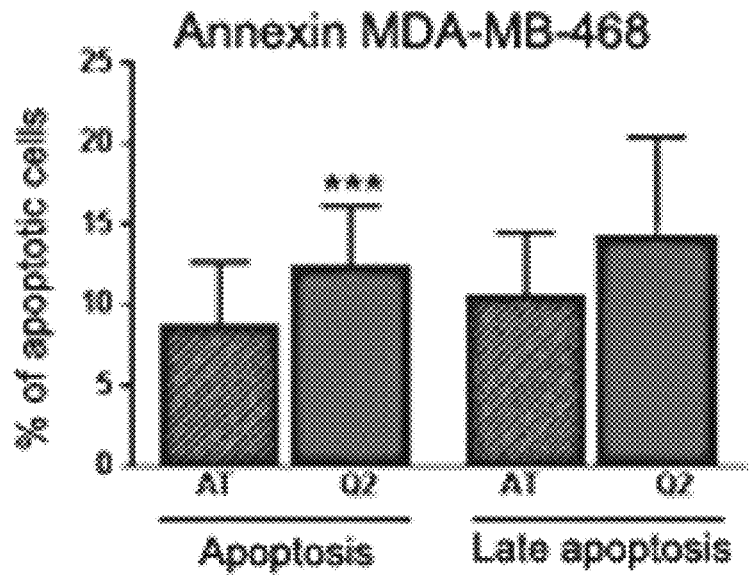

The translocation of the phosphatidylserine protein from the inner face of the plasma membrane of the cells to the outer face by translocases is a process characteristic of apoptotic cells. To study this process, assays with annexin V-fluorescein (FITC) were performed in three cell lines. This recombinant protein binds to the phosphatidylserine residues exposed on the outer face of the plasma membrane of apoptotic cells. Together with said recombinant protein, propidium iodide (IP), an impermeable DNA marker that only enters cells when the membrane is compromised, was also used. To perform these assays, the cells were transfected with apMNKQ2 and with the control aptamer AT at the working concentrations. At 24 hours, the cells were collected, fixed, and stained with annexin V-FITC and propidium iodide. Finally, the cells were analyzed by means of flow cytometry and differentiation was made between non-apoptotic cells (annexin V-FICT negative/IP negative), apoptotic cells (annexin V-FICT positive/IP negative), late apoptotic cells (annexin V-FICT positive/IP positive), and necrotic cells (annexin V-FITC negative/IP positive). The results indicate that aptamer apMNKQ2 is capable of inducing apoptosis in the three cell lines. Although the control aptamer also causes apoptosis, the effect of apMNKQ2 is greater and statistically significant (FIGS. 10A-10C) in the MDA-MB-468 cells (FIG. 10C) with respect to the control aptamer. Late apoptosis in the MCF7 (FIG. 10A) and MDA-MB-231 (FIG. 10B) cell lines is also statistically significant with respect to the control.

Figure 11A:
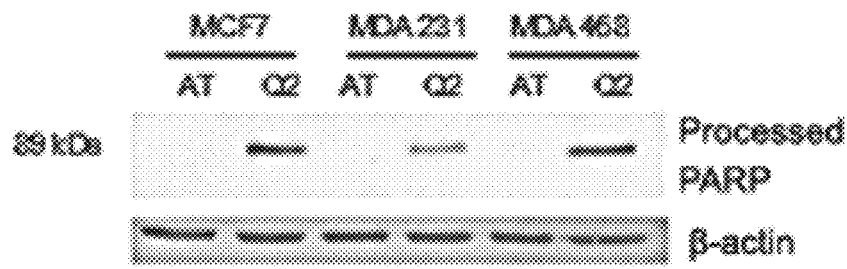
FIGS. 11A & 11B. Effect of apMNKQ2 on caspase 3 activity by means of PARP and α-spectrin substrates in breast cell lines. Immunodetection with specific antibodies by means of 12% SDS-PAGE of "cleaved" PARP (FIG. 11A) and α-spectrin (FIG. 11B) for detecting the proteolytic activity of caspase 3 after the transfection of lines MCF7, MDA-MB-231, and MDA-MB-468 with apMNKQ2 and the control aptamer AT. The activity of this protease gives rise to characteristic proteolysis patterns with specific fragments of 89 kDa for PARP and 150 and 120 kDa for α-spectrin.
Figure 11B:
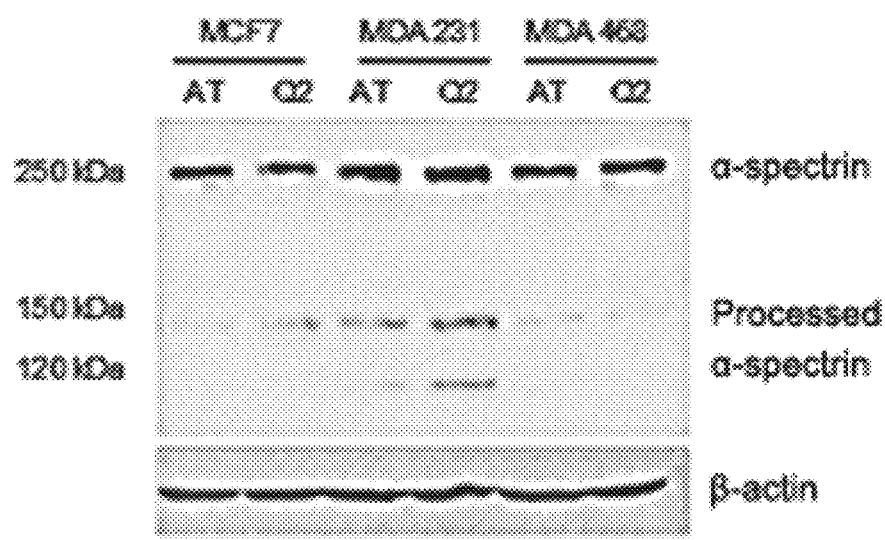

Similarly, to verify that apMNKQ2 is capable of increasing apoptosis in the cell lines, the activity of caspase 3, a protease activated in apoptosis, was assessed. The western blot study was performed on two endogenous substrates of caspase 3: the enzyme poly ADP-ribose (PARP), fractionated in late apoptotic stages, and the protein α-spectrin. The activity of this protease gives rise to characteristic proteolysis patterns on both proteins with specific fragments of 150 and 120 kDa for α-spectrin, and 89 kDa for PARP, which allows differentiating apoptosis from necrosis. FIGS. 11A and 11B show the immunodetection of the fragments produced by the proteolysis of PARP and α-spectrin in MCF7, MDA-MB-231, and MDA-MB-468 cells, 24 hours post-transfection with aptamers apMNKQ2 and AT. The results prove the apoptotic effect of apMNKQ2 on the three cell lines.

Aptamer apMNKQ2 Inhibits Colony Formation (Tumorigenesis)

Clonogenic activity is the capacity of a single cell to form a colony which will be made up of at least 50 cells (Franken, Rodermond et al. 2006). This characteristic of some tumor cells, which arises as a result of contact inhibition loss, will allow studying the effect of aptamer apMNKQ2 on the three cell lines. The effectiveness of the aptamer can therefore be analyzed by studying if the cell maintains the capacity to divide in an unlimited manner after treatment.

Figure 12A:
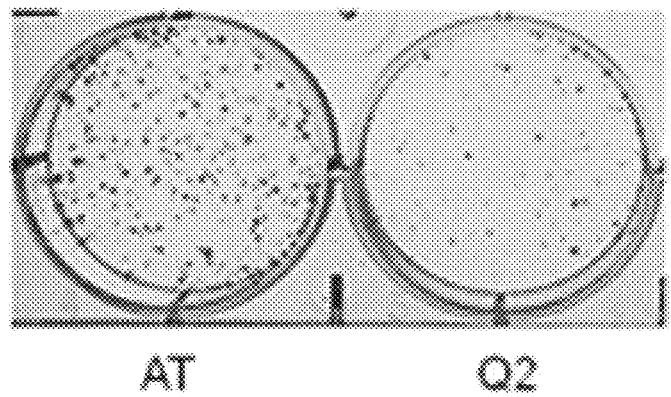
FIGS. 12A & 12B. Effect of apMNKQ2 on cell clonogenicity. MCF7, MDA-MB-231, and MDA-MB-468 cells were seeded in 24-well plates at a density of $3 \times 10^4$ cells/well and transfected at 24 hours with apMNKQ2 at the previously established working concentrations (FIG. 12A). After 24 hours, the cells were collected, counted, and seeded in 6-well plates with 1000 cells/well for MCF7 and MDA-MB-231 and with 5000 cells/well for MDA-MB-468 (FIG. 12B). The boxes represent the mean±the maximum and minimum of 4-5 independent experiments (*p<0.05 and **p<0.01 with respect to the control aptamer AT).
Figure 12A:
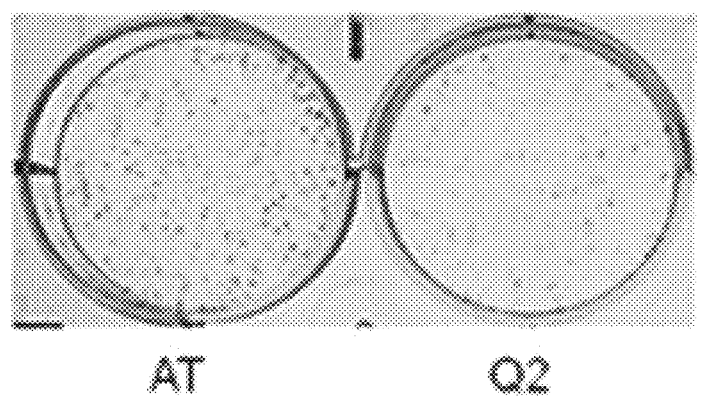
Figure 12A:
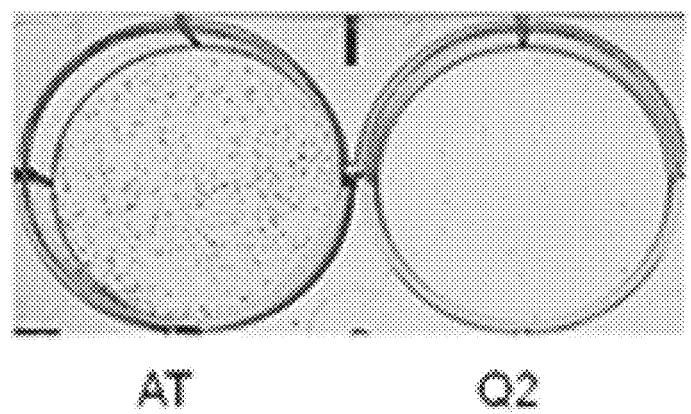
Figure 12B:
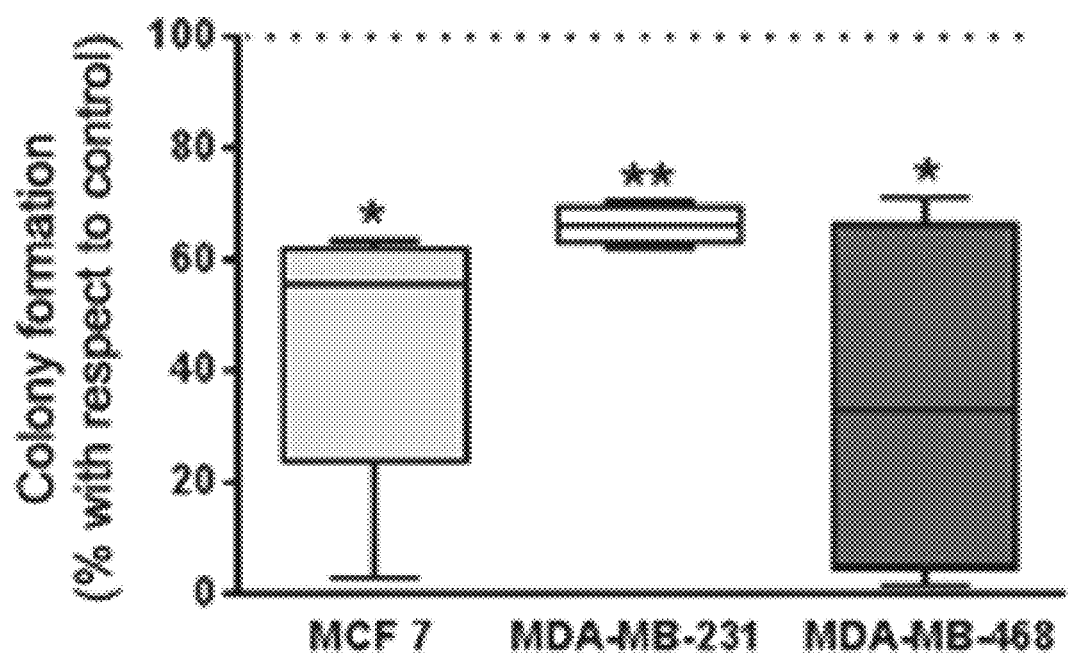

For these assays, 1000 cells/well in 6-well plates had previously been established for the MCF7 and MDA-MB-231 lines, however, the PE of the MDA-MB-468 cells was lower (11.5±5.3%), so 5000 cells were seeded. The cells were transfected with apMNKQ2 and the control AT, and collected and reseeded at 24 hours to perform the colony formation assay. The colonies were quantified 9-12 days after seeding. FIGS. 12A & 12B show the inhibitory action of aptamer apMNKQ2 with respect to the control aptamer AT. This inhibition in colony formation is statistically significant for the three cell lines with respect to the control, and with a different efficacy depending on the cell line.

Aptamer apMNKQ2 Inhibits Migration and Invasion (Metastasis)

Figure 13A:
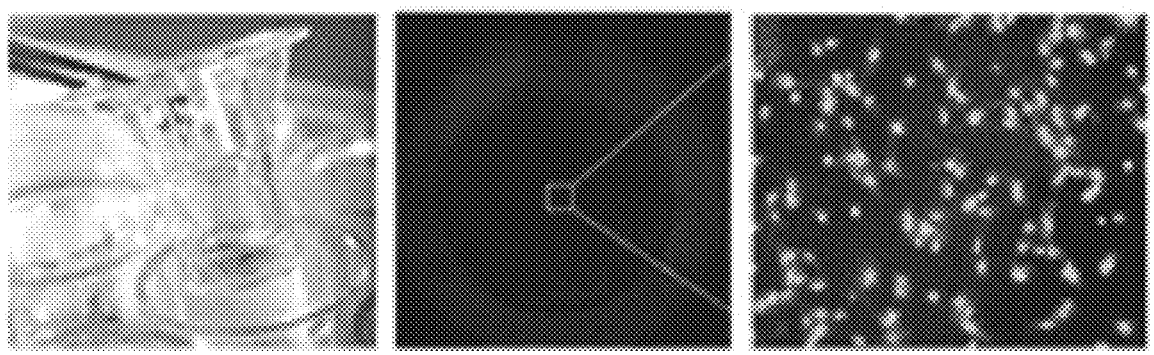
FIGS. 13A, 13B and 13C. Effect of aptamer apMNKQ2 on the migration and invasion of breast cell lines. The three lines of study were seeded in 6-well plates at a density of $2.5 \times 10^5$ cells/well and transfected at 24 hours with apMNKQ2 at the established working concentrations. The cell lines were deprived of serum after 6 hours and collected and re-seeded ($4 \times 10^4$ cells/well) after 24 hours in a transwell with and without Matrigel, in order to perform migration and invasion assays, respectively. At 24 hours, the membranes of the transwell are stained with Hoechst and cells that have gone through the membranes are quantified using fluorescence microscopy (FIG. 13A). The boxes (FIGS. 13B and 13C) represent the mean±the maximum and minimum of 4-5 independent experiments (*p<0.05, p<0.01, and *p<0.001 with respect to the control aptamer AT).
Figure 13B:
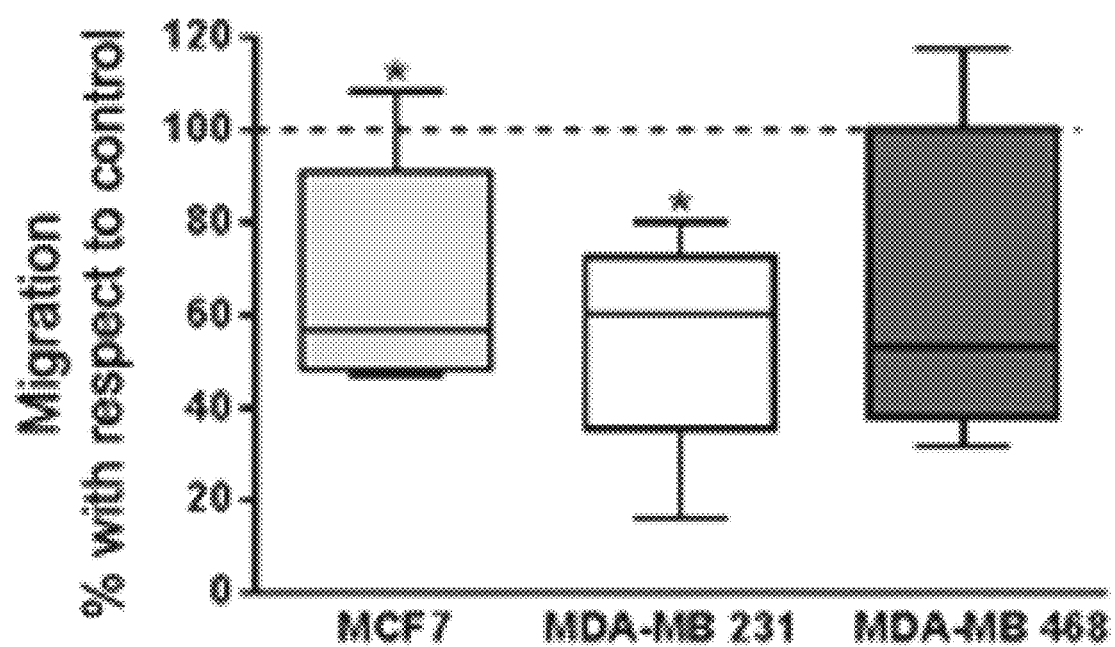

To analyze the effect of the aptamer on cell migration, experiments were carried out using transwells instead of the wound healing technique. The cells are transfected with the aptamers, and the medium is removed at 6 hours and serum-free medium is added. At 18 hours, 40,000 cells are collected, counted, and seeded in small "baskets" in a serum-free medium, and these baskets are immersed in the well of the plate with complete serum, such that the serum acts as a chemoattractant and the cells migrate from the basket to the well, going through the membrane of the transwell. After 24 hours, cells which have gone through the membrane of the transwell are fixed and stained with Hoechst for subsequent quantification by fluorescence microscopy (FIG. 13A). As shown in FIG. 13B, apMNKQ2 was capable of inhibiting migration in the three cell lines, but only in a statistically significant manner in MCF7 and MDA-MB-231.

Figure 13C:
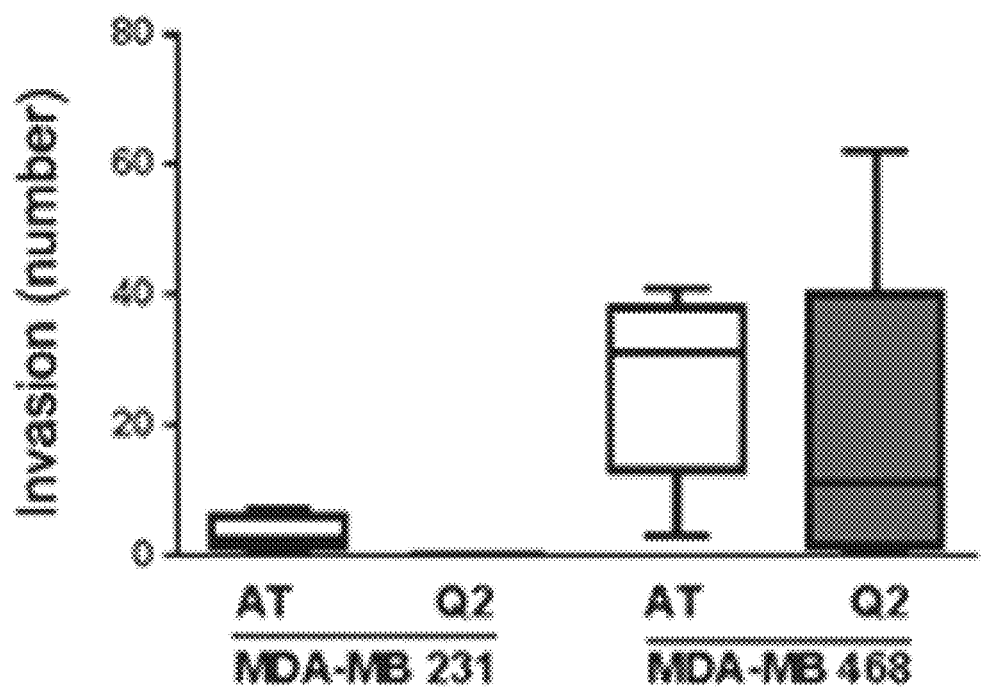

Likewise, invasion assays were performed with transwell, although in this case a Matrigel, a solubilized basement membrane preparation extracted from mouse sarcoma, was added to the "baskets". The cells are seeded thereon, and they will migrate towards the stimulus, degrading the matrix (FIG. 13C). These assays were not performed with the MCF7 cell line because it has no invasive capacity. Aptamer apMNKQ2 caused a significant reduction of invasion in the MDA-MB-231 and MDA-MB-468 cell lines (FIG. 13C). The preceding results show the capacity of aptamer apMNKQ2 to inhibit some of the tumor characteristics of the cells.

To complete these results, assays were carried out to check the effect of apMNKQ2 on epithelial-mesenchymal transition (EMT). To that end, the expression of markers of different stages was analyzed: occludin, a membrane cell adhesion protein which performs the function of binding transmembrane proteins to actin cytoskeleton and to other signaling proteins in the first stage of EMT and is associated with non-migratory cells (epithelial cells), was chosen as the epithelial marker; fibroblast-specific protein 1 (FSP1), which is associated with the morphology and motility of mesenchymal cells and expressed during the transformation occurring in EMT, was studied as the mesenchymal marker.

Figure 14:
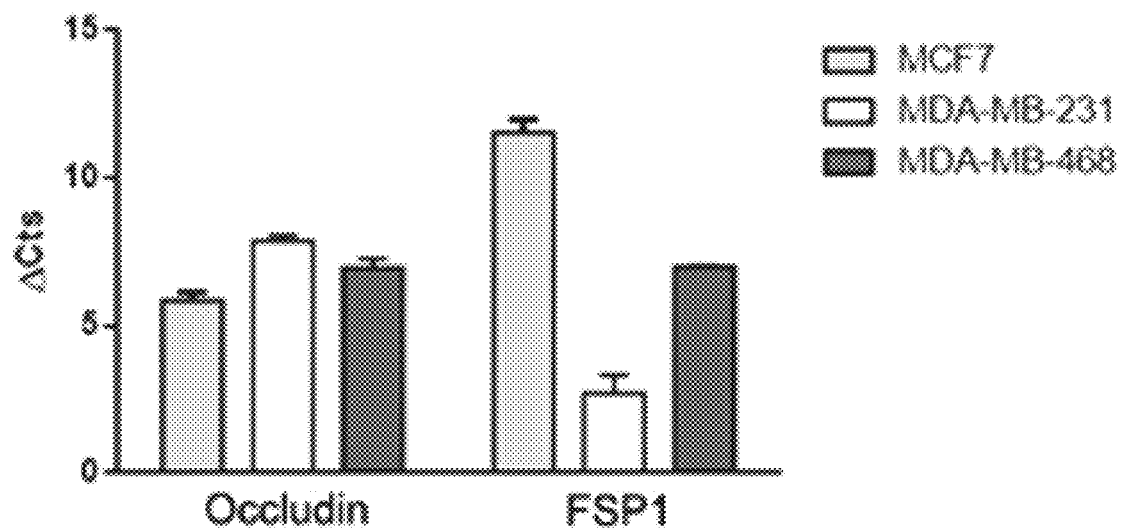
FIG. 14. Expression of EMT markers in breast cell lines. Expression levels of occludin (epithelial state marker) and FSP1 (mesenchymal marker) in MCF7, MDA-MB-231, and MDA-MB-468 cells by means of qPCR as indicated in the Materials and Methods section. The obtained values were normalized with respect to β-actin, and the bars represent the mean±SEM of at least 3 independent experiments.
Figure 15A:
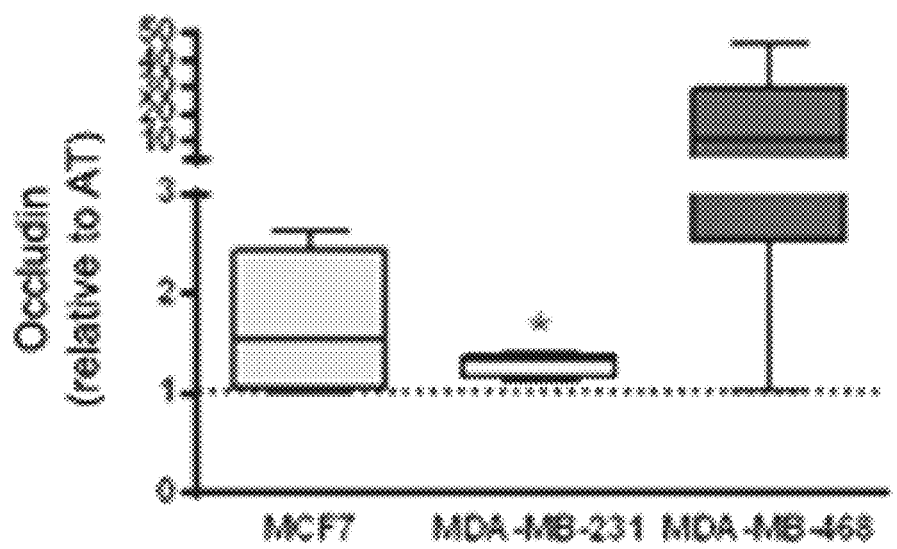
FIGS. 15A & 15B. Effect of the aptamer on the expression levels of EMT markers in breast cell lines. MCF7, MDA-MB-231, and MDA-MB-468 cells were seeded in 6-well plates at a density of $2.5 \times 10^5$ cells/well and transfected with aptamers apMNKQ2 and AT at the working concentration previously established 24 hours after seeding. Twenty-four hours after transfection, the cells were collected and the RNA was isolated and purified as indicated in the Materials and Methods section. A copy of DNA was then obtained, and qPCR assays were performed to analyze the expression of occludin (FIG. 15A) and fibroblast-specific protein 1 (FSP1) (FIG. 15B). The boxes represent the mean±the maximum and minimum of 4-5 independent experiments (*p<0.05 and **p<0.01 with respect to the control AT).
Figure 15B:
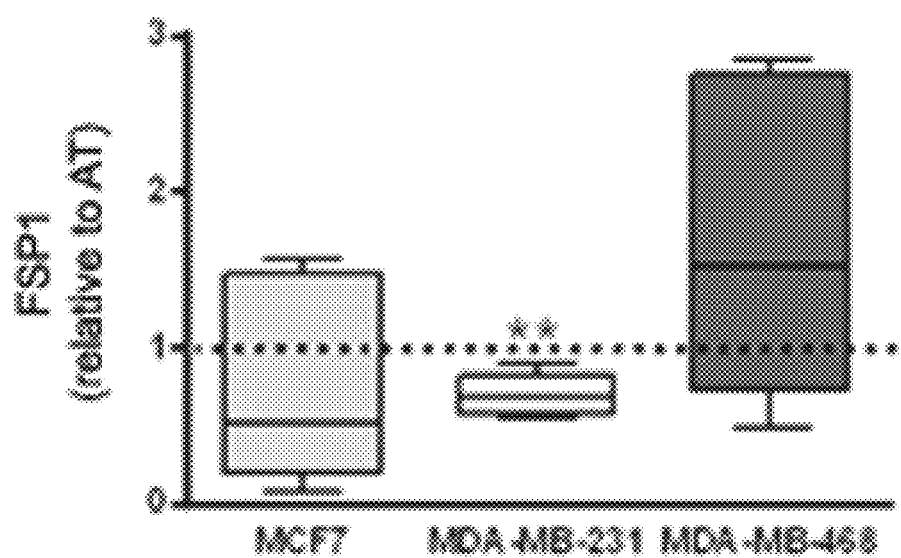

The results obtained in the quantitative PCR of FIG. 14 show that the three cell lines express occludin, with the highest expression in the MCF7 cells (4- and 2-fold higher with respect to MDA-MB-231 and MDA-MB-468, respectively), as it corresponds to epithelial cells. In contrast, the expression of FSP1 is significantly higher in MDA-MB-231 cells. This correlates with the classification of this cell line since it is part of the triple negative B group, with a mesenchymal-type morphology and characteristics. The expression of FSP1 is lower in MDA-MB-468, and very low in MCF7, as it corresponds to luminal cells.

Study of the Effect of Aptamer apMNKQ2 In Vivo in a Breast Cancer Model

Study of Aptamer apMNKQ2 Penetration into Cells

To analyze cell penetration by apMNKQ2, $3 \times 10^4$ cells/well were seeded on cover glasses and the structured, Alexa fluor 488-conjugated aptamer at 250 nM was added to the cell medium at 24 hours. In parallel, the aptamer was transfected with lipofectamine at the same concentration. After 24 hours, the cells were fixed and stained with Hoechst.

Figure 16A:
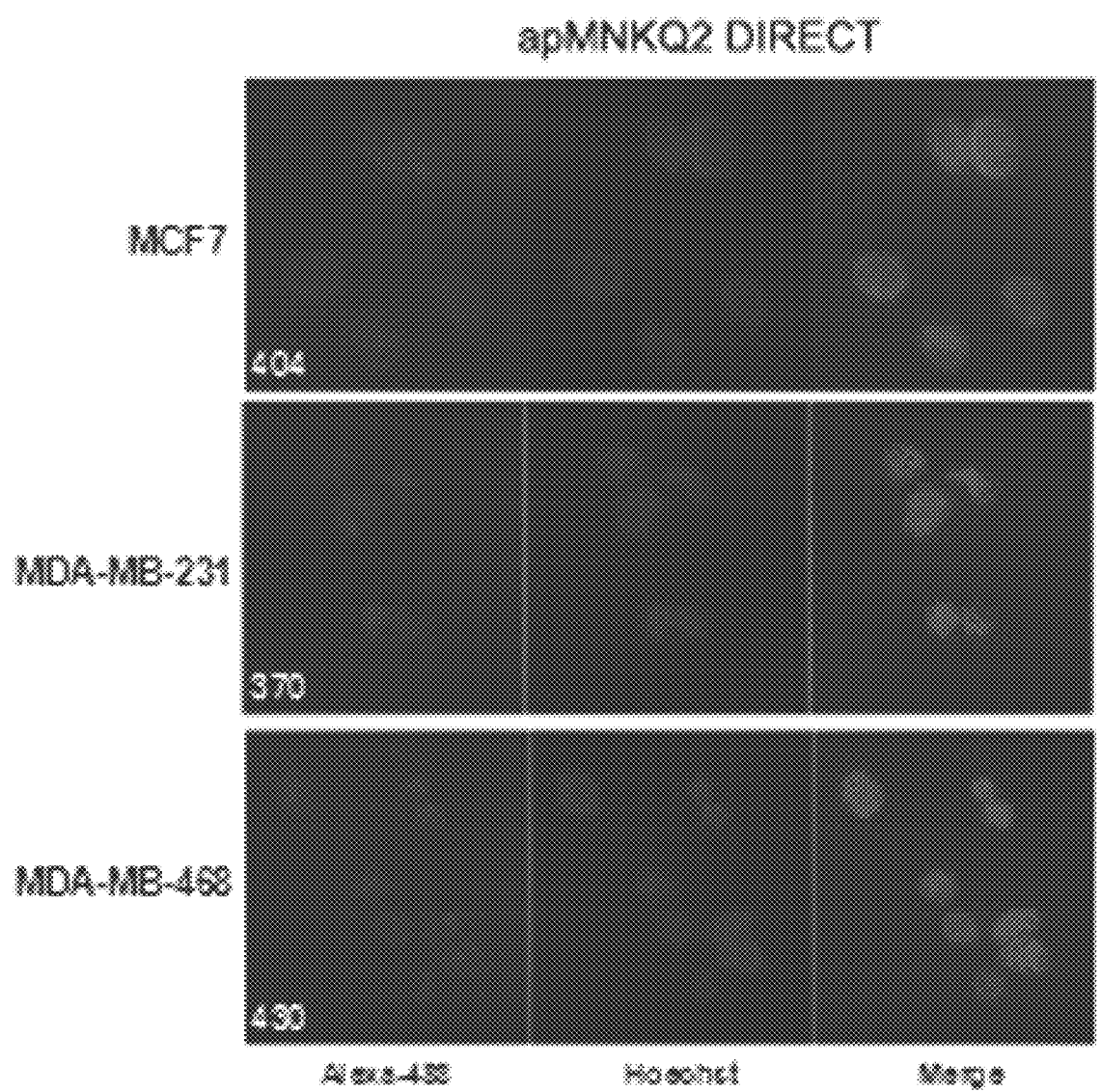
FIGS. 16A & 16B. Study of aptamer apMNKQ2 penetration into cells. MCF7, MDA-MB-231, and MDAMB-468 cells were seeded in 24-well plates with a cover glass at a density of $3 \times 10^4$ cells/well, with the transfection/addition of apMNKQ2 labeled with Alexa-488 at 250 nM at 24 hours. Twenty-four hours after transfection, the cells were fixed, stained with Hoechst, and mounted on slides with Prolong™ mounting medium. The number refers to the intensity of the aptamer measured with the imageJ program and expressed in arbitrary units.
Figure 16B:
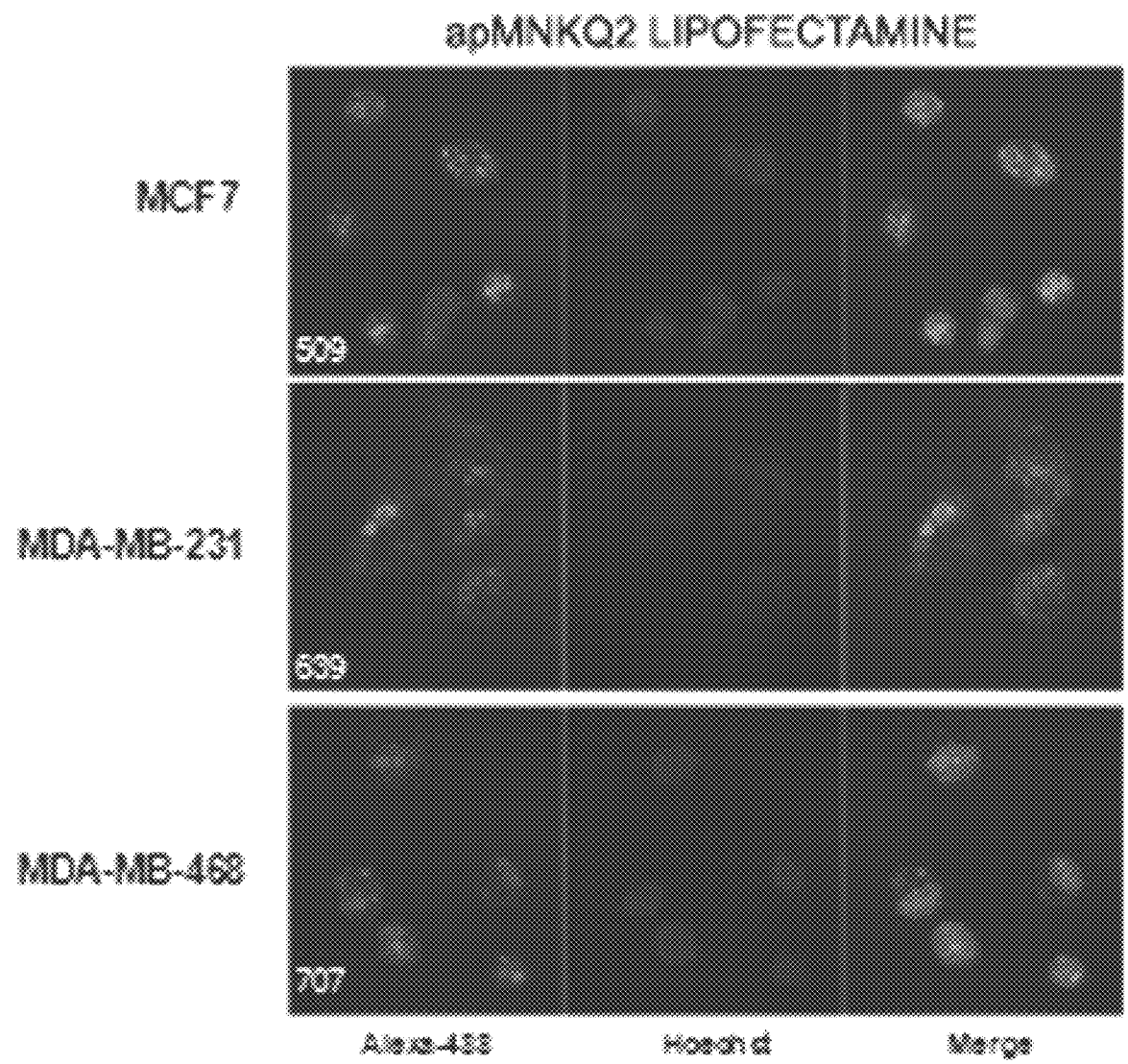
Figure 17:
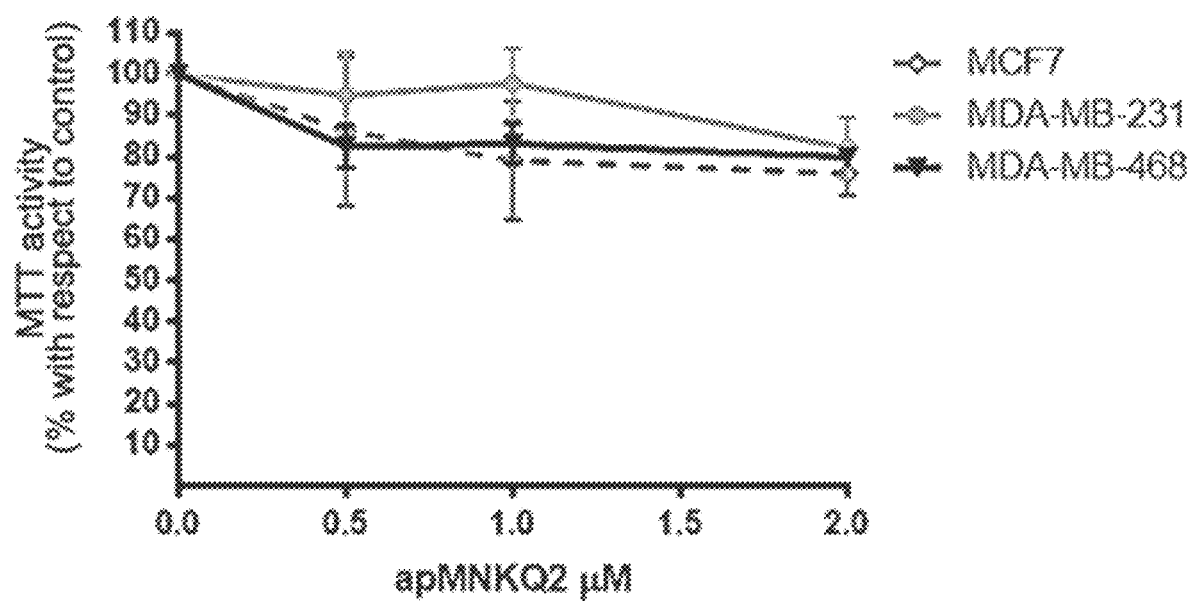
FIG. 17. MTT activity measurement in breast lines after the direct addition of apMNKQ2. MCF7, MDA-MB-231, and MDA-MB-468 cells were seeded in 96-well plates at a density of $10^4$ cells/well, and apMNKQ2 was added at concentrations of 0.5, 1, and 2 µM at 24 hours. MTT assays were performed after 48 hours. The graphs represent the mean of 3 independent experiments, and are normalized with respect to the control of the untreated cells.

As can be observed in FIGS. 16A & 16B, apMNKQ2 is capable of only entering the cells, although with a lower intensity and a distribution that is different from that observed when it is transfected with lipofectamine. The signal of the aptamer with lipofectamine (FIG. 16B) is more intense and less scattered than when the aptamer enters directly (FIG. 16A). The difference is more evident in the aggregates co-localized in the nucleus. In view of this result, the effect of the addition of apMNKQ2 at concentrations higher than those used in MTT activity assays with lipofectamine-transfected cells was assessed. The results show that the aptamer exerts a slight effect, achieving a 15% reduction of MTT activity at the highest tested concentration (FIG. 17). It can be deduced from these assays that the aptamer alone is not capable of producing any effect on the cells, probably because its route of entry, which is different from the route of entry of complexes with lipofectamine, affects the structure. For the rest of the assays, the Lipofectamine™ 2000 transfection system was used.

Figure 18:
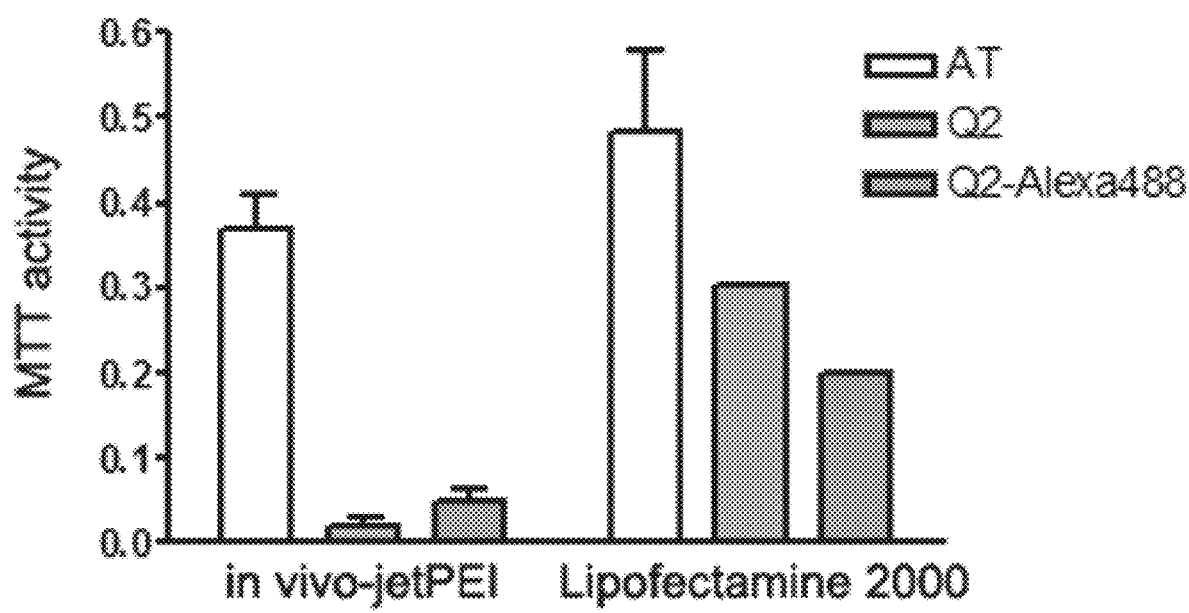
FIG. 18. MTT activity measurement in breast lines after transfection with in vivo-JetPEI® or Lipofectamine™ 2000. MDA-MB-468 cells were seeded in 96-well plates at a density of $10^4$ cells/well and transfected at 24 hours with the different transfectants at a concentration of 400 nM. MTT assays were performed after 48 hours. The graphs represent the mean of 2 independent experiments.
Figure 19A:
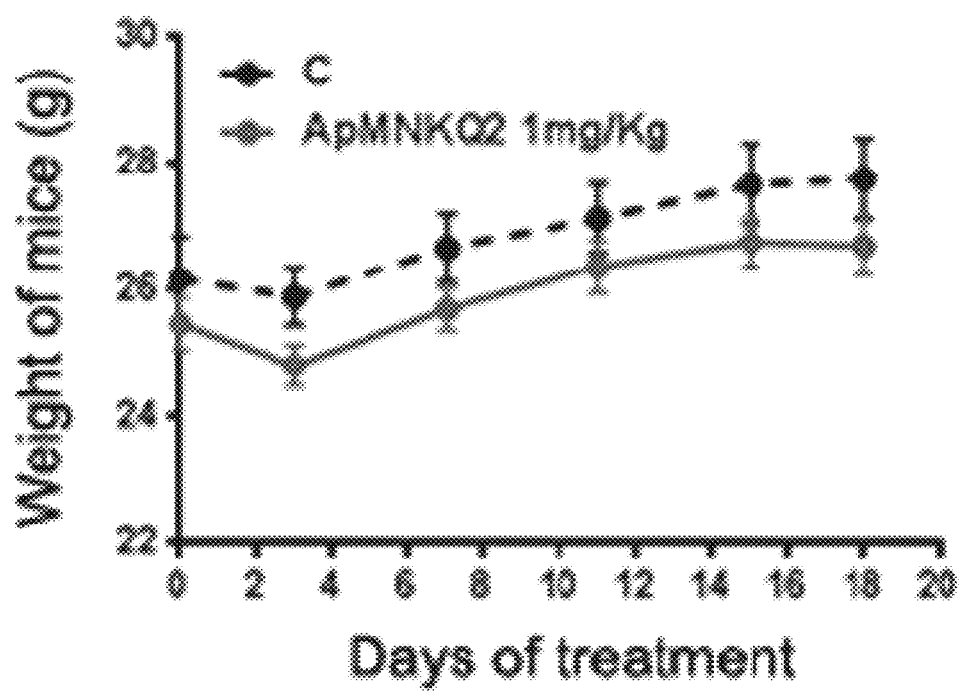
FIGS. 19A-19D. In vivo efficacy of apMNKQ2 in an orthotopic xenograft mouse model of MDA-MB-231 cells. (A) Evolution of the weight of the mouse over days of treatment with apMNKQ2 (FIG. 19A). (B) Relative tumor volume (RTV) over days of treatment (FIG. 19B). (C) Tumor weight after sacrificing the animal (FIG. 19C). (D) Immunohistochemical determination of proliferating cell nuclear antigen (PCNA) levels (FIG. 19D). The analysis of the positive nuclei was performed with the imageJ program. The boxes represent the mean±the maximum and minimum of 5-8 animals (*p<0.05 with respect to the control group).
Figure 19B:
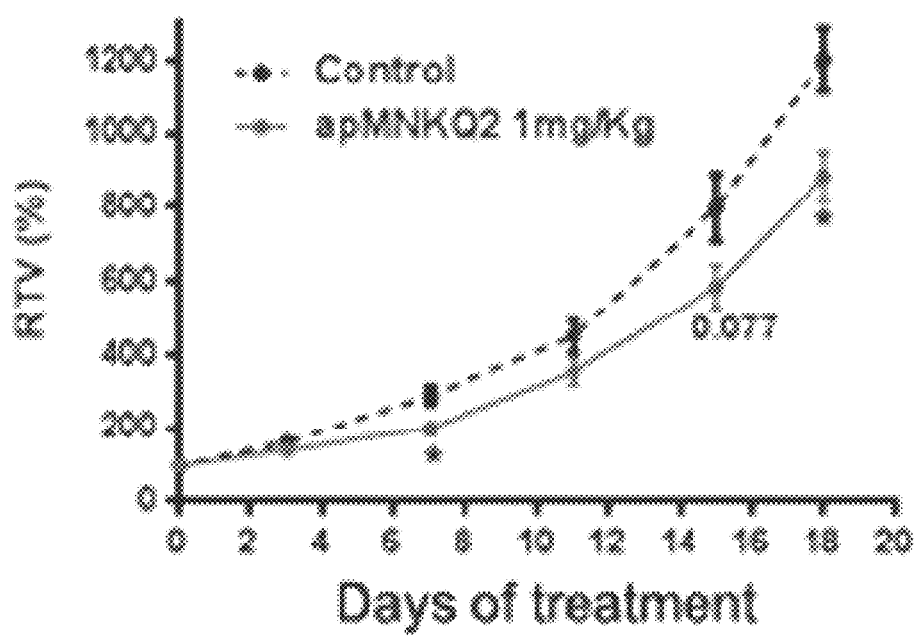
Figure 19C:
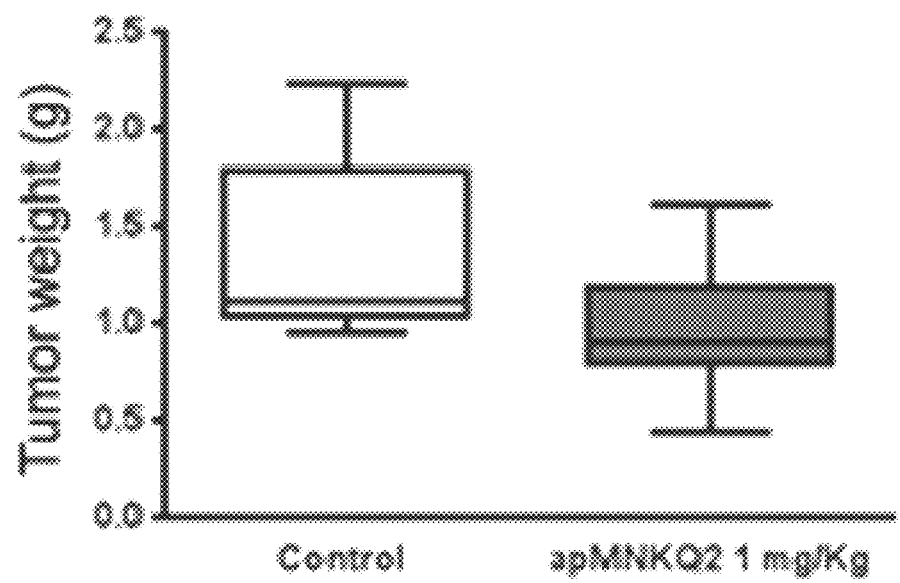
Figure 19D:
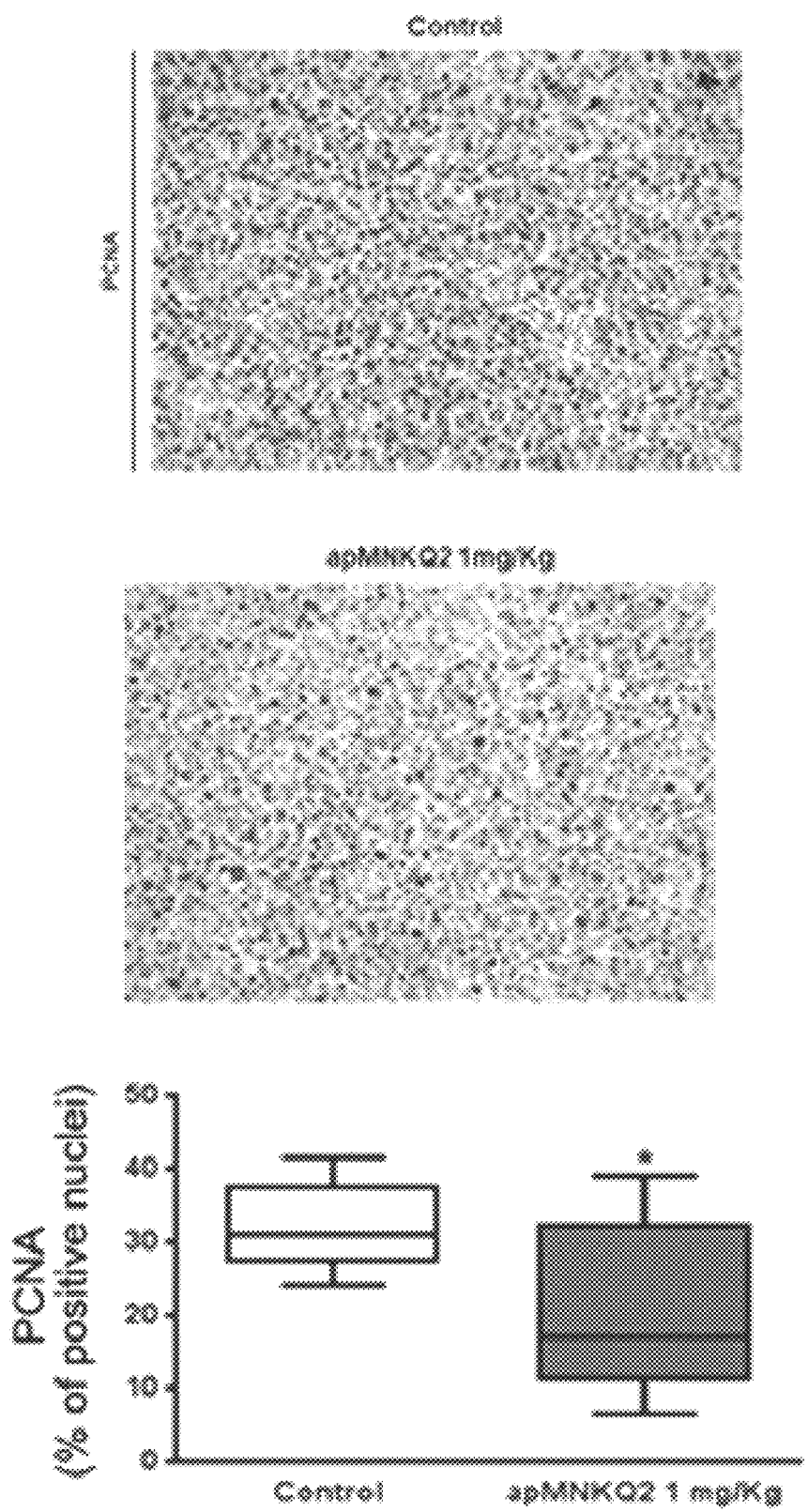

Study of the Efficacy of apMNKQ2 In Vivo in a Triple Negative Breast Cancer Model For these assays, an orthotopic xenograft model with MDA-MB-231 cells is used. In view of the preceding results in which it is observed that aptamer apMNKQ2 is rather inefficient when added alone to the cells (FIG. 17), an in vivo transfection system for DNA and siRNAs, i.e., in vivo-jetPEI® (polyplus transfection), is used. First, the activity of apMNKQ2 and Alexa fluor 488-conjugated apMNKQ2 is confirmed using this transfection system in MDA-MB-231 cell cultures (FIG. 18). The inhibition of MTT activity by (conjugated and non-conjugated) apMNKQ2 is greater than 90% when in vivo-jetPEI® is used, where it is more efficient than Lipofectamine™ 2000. The in vivo assays are performed with nude mice inoculated with MDA-MB-231 cells and orthotopic tumors are generated. When these tumors reach a volume of 100 mm³, the mice are randomly distributed into two groups of 9 animals. The treated group (1.8 mg/kg) is intravenously injected with 100 µl of 5% glucose containing 46 µg of apMNKQ2 and 5.6 µl of jet PEI transfectant (N/P ratio of 6) three times a week. The control group is injected with 5% glucose solution containing the same volume of in vivo-jetPEI® reagent and aptamer buffer. As monitoring parameters, the tumor volume, assuming that they are ellipsoids, is measured and the weight of the animals controlled. The treatment causes no changes in the weight of the mice (FIG. 19A). The obtained results show that the relative size of the tumor is smaller in the group treated with apMNKQ2 (1 mg/kg) than in the control group at the different days of treatment, with this difference being statistically significant at 7 and 18 days of treatment (FIG. 19B). The weight of the tumor after sacrificing the animals decreases by 27%, although it is not statistically significant (FIG. 19C). Finally, cell proliferation in the tumor of mice treated with apMNKQ2, determined by means of immunohistochemistry with the cell proliferation marker PCNA, decreases by 50% with respect to the control group (FIG. 19D).

Figure 20A:
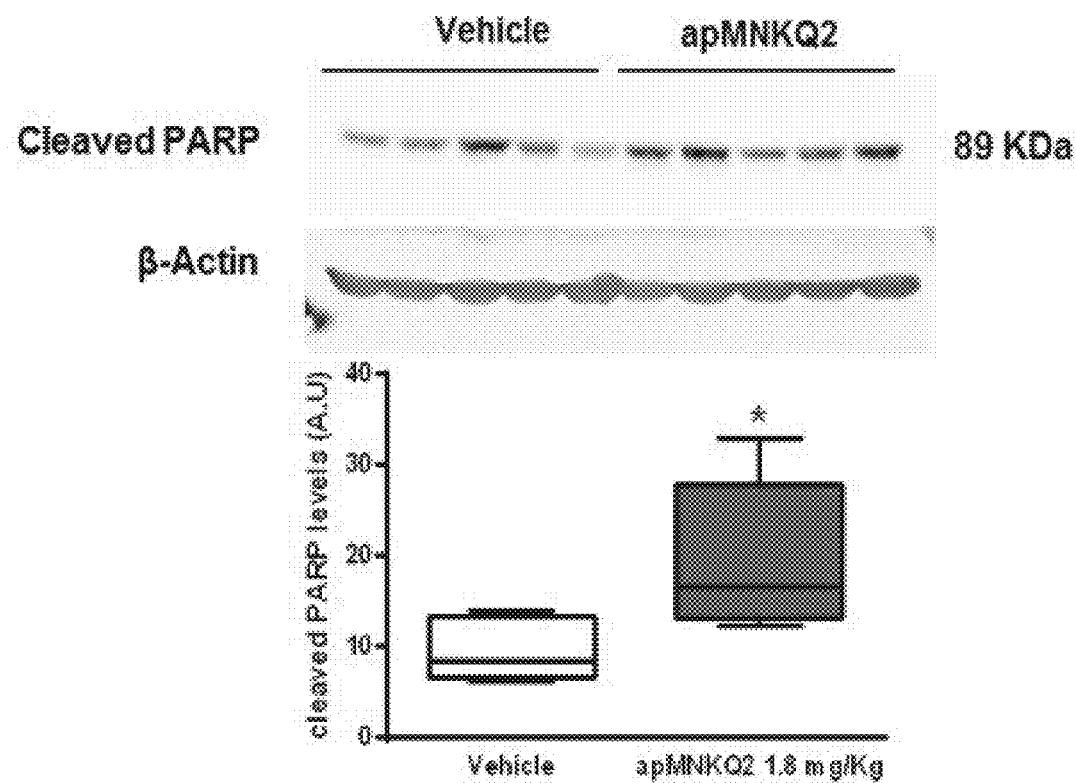
FIGS. 20A-20D. Activation of apoptosis and expression of EMT markers in tumors from the mice with an orthotopic xenograft of MDA-MB-231 cells of FIG. 19. Immunodetection with specific antibodies by SDS-PAGE 12% of "cleaved" PARP (FIG. 10A), a-Spectrin (FIG. 20B) and the anti-apoptotic protein MCL1 (FIG. 20C) in tissue of mice treated with 1.8 mg/Kg of apMNKQ2 or with the vehicle. Expression levels of occludin (epithelial status marker) and FSP1 (mesenchymal marker) in tissue of mice treated with 1.8 mg/kg of apMNKQ2 or with the vehicle using qPCR (FIG. 20D). The values obtained were normalized with respect to β-actin. The boxes represent the mean±the maximum and the minimum of 4-5 animals (*p<0.05, **p<0.01 with respect to the control group).
Figure 20B:
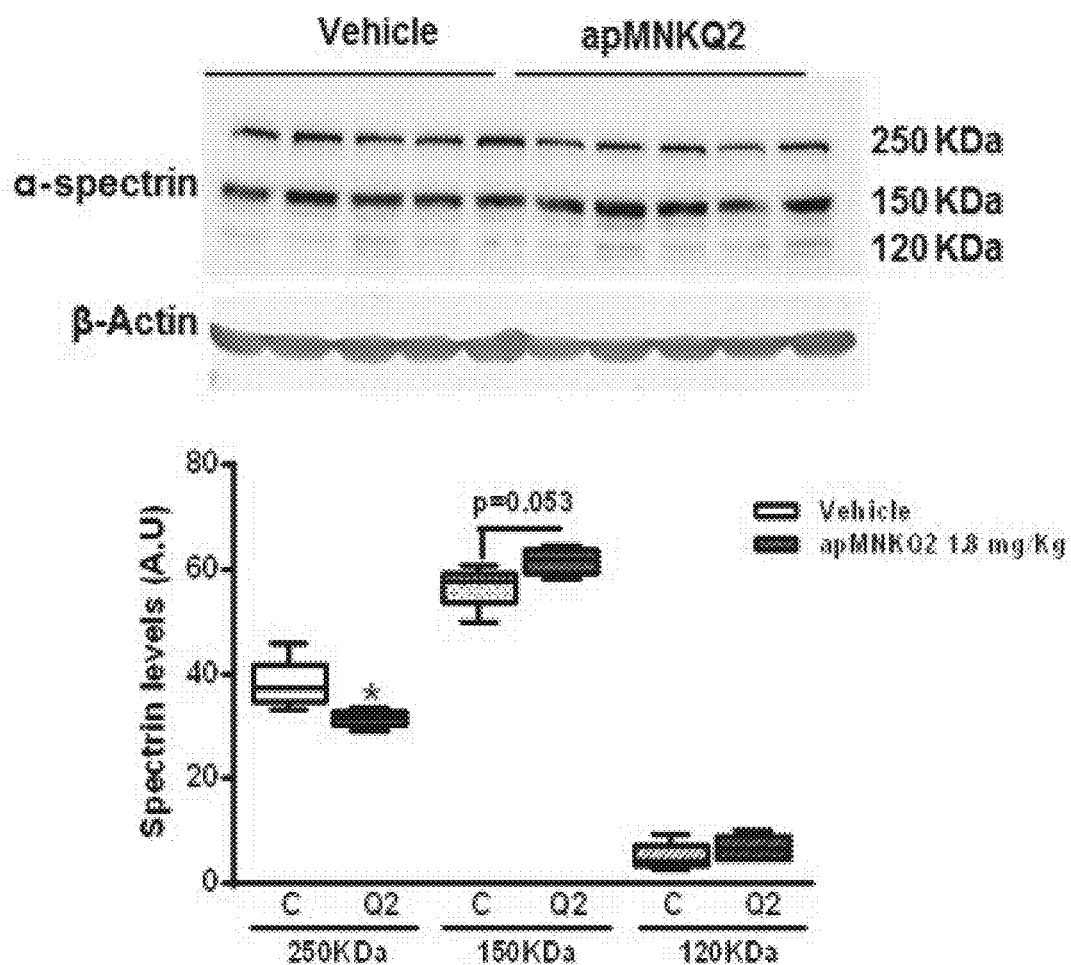
Figure 20C:
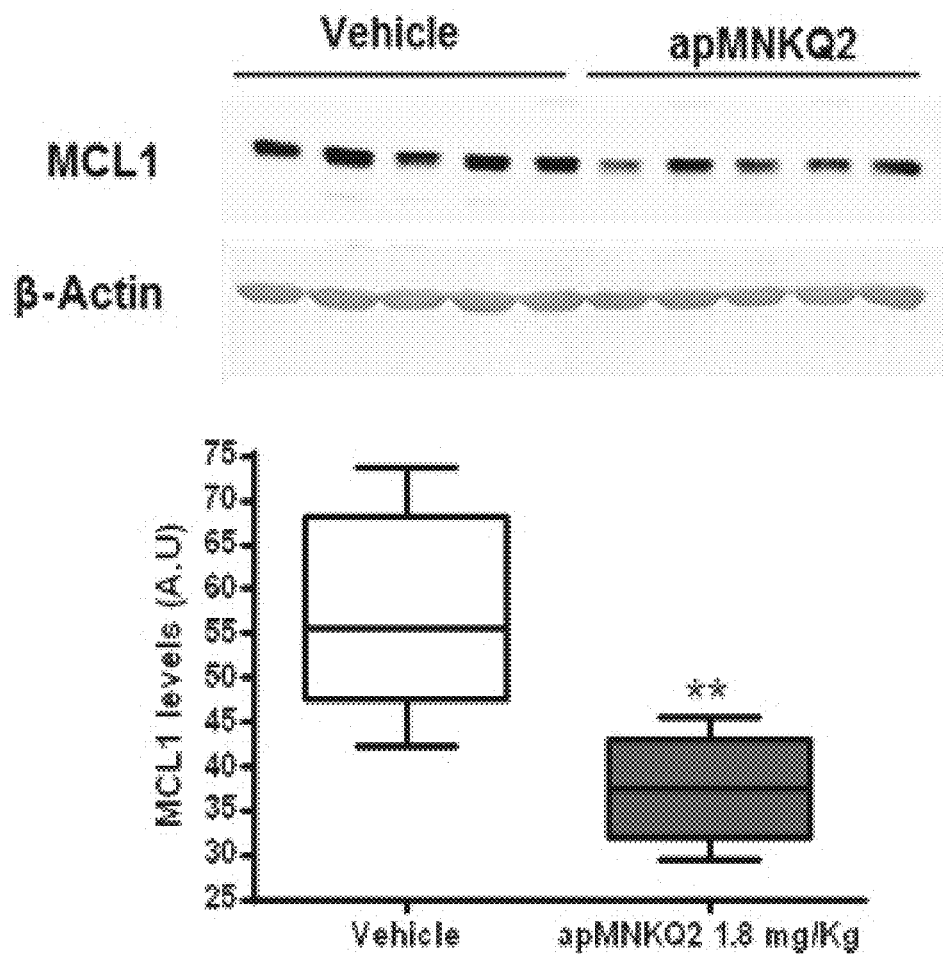
Figure 20D:
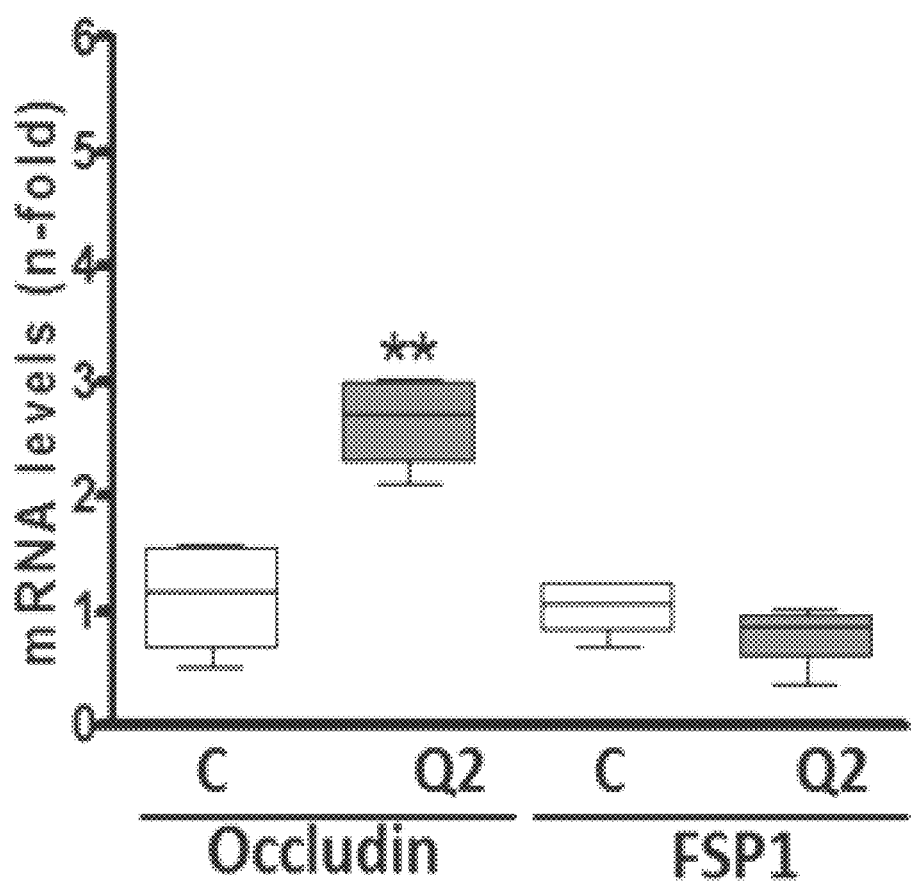

To determine if apMNKQ2 is capable of inducing apoptosis in tumors, caspase 3 activity was assessed by immunodetection of two endogenous substrates PARP1 and a-Spectrin, and from the levels of the MCL1 antiapoptotic protein (FIG. 20A-C) in tumors from control and treated animals with apMNKQ2 (FIGS. 19A-19D). The results show the apoptotic effect of apMNKQ2. In addition, tests were carried out to verify the effect of apMNKQ2 on the Mesenchymal Epithelium Transition (EMT). The results obtained in the quantitative PCR (FIG. 20D) show that occludin epithelial marker expression increases significantly in tumors of animals treated with apMNKQ2. There is also a decrease (although not significant) in the mRNA levels of the mesenchymal marker FSP1.

In Vivo Study of the Effect of apMNKQ2 on Metastasis

Figure 21A:
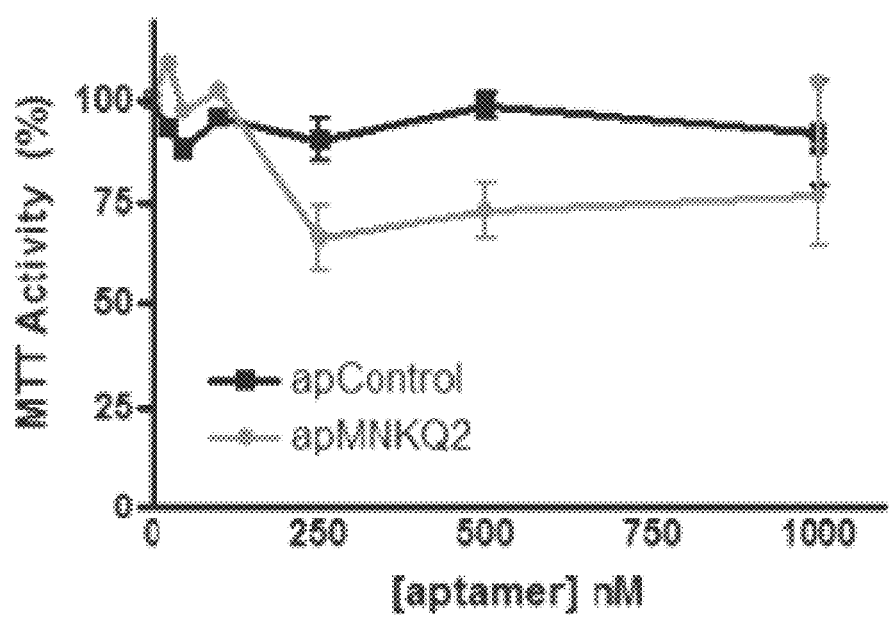
FIG. 21A-21E. In vivo efficacy of apMNKQ2 in a mouse metastatic model with an orthotopic xenograft of 4T1 cells. (A) Effect of apMNKQ2 aptamer on the proliferation of 4T1 cells (mouse breast tumor line). 4T1 cells were seeded in p96 at a density of $1.5 \times 10^3$ cells/well. After 16-24 hours they were transfected with apMNKQ2 at 0, 250, 500 and 1000 nM for 48 hours, after which MTT activity tests were performed. The graph (FIG. 21A) represents the means±SEM of 3 independent experiments. (B) Effect of apMNKQ2 aptamer on migration and invasion of 4T1 cells. Cells were seeded in p6 at a density of $2 \times 10^5$ cells/well and transfected with 500 nM apMNKQ2 at 24 hours. At 6 hours they were deprived of serum, and after 24 hours they were collected and re-seeded ($4 \times 10^4$ cells/well) in a transwell with and without matrigel, to perform migration and invasion tests, respectively. At 24 hours (migration) or 48 h (invasion), the transwell membranes were stained with Hoechst and the cells that had passed through the fluorescence microscopy were quantified. Values (FIG. 21B) represent the mean±SEM of 2-3 independent experiments. In vivo efficacy of apMNKQ2 in a mouse metastatic model with an orthotopic xenograft of 4T1 cells. (C) Evolution of mouse weight on the days of treatment with apMNKQ2 (FIG. 21C). (D) Relative tumor volume (RTV) throughout the days of treatment (FIG. 21D). (E) Number of lung metastases (FIG. 21E). The number of metastases is analyzed by the reverse staining method (with Chinese ink) and the metastases grouped according to their size in four groups (0.5, 1, 2 and >2). The stacked bars correspond to each group and represent the mean±SEM of 8-9 animals (*p<0.05 with respect to the control group).
Figure 21B:
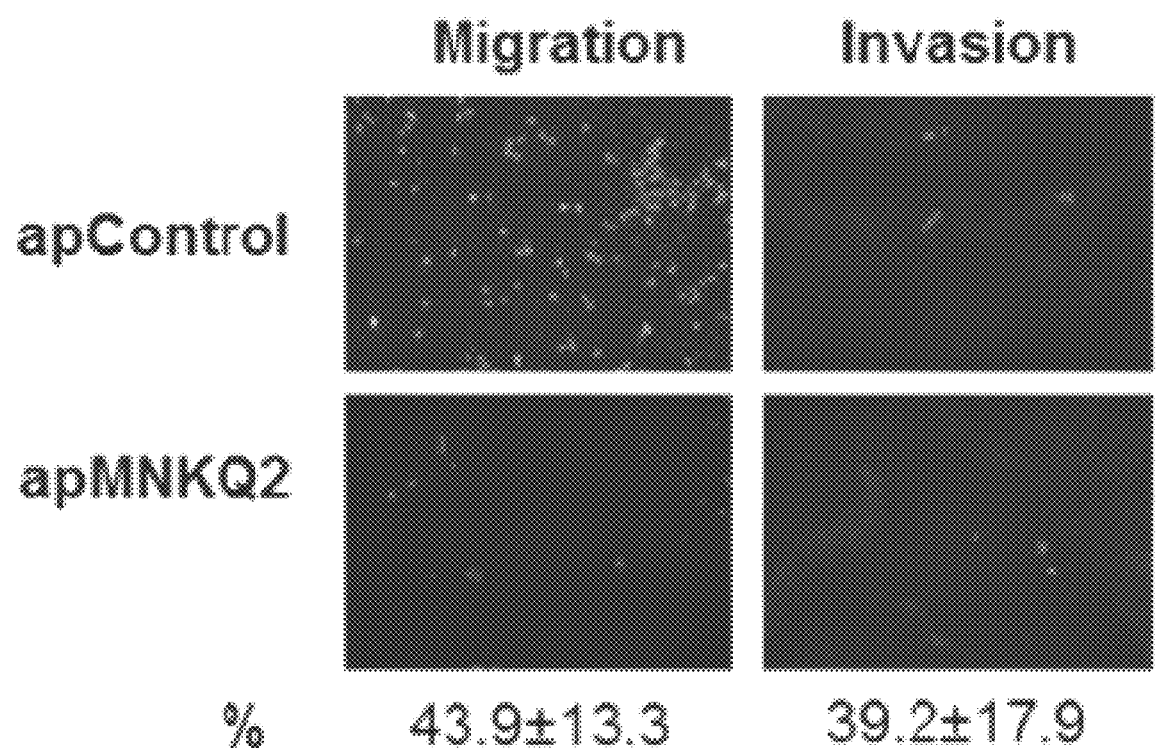
Figure 21C:
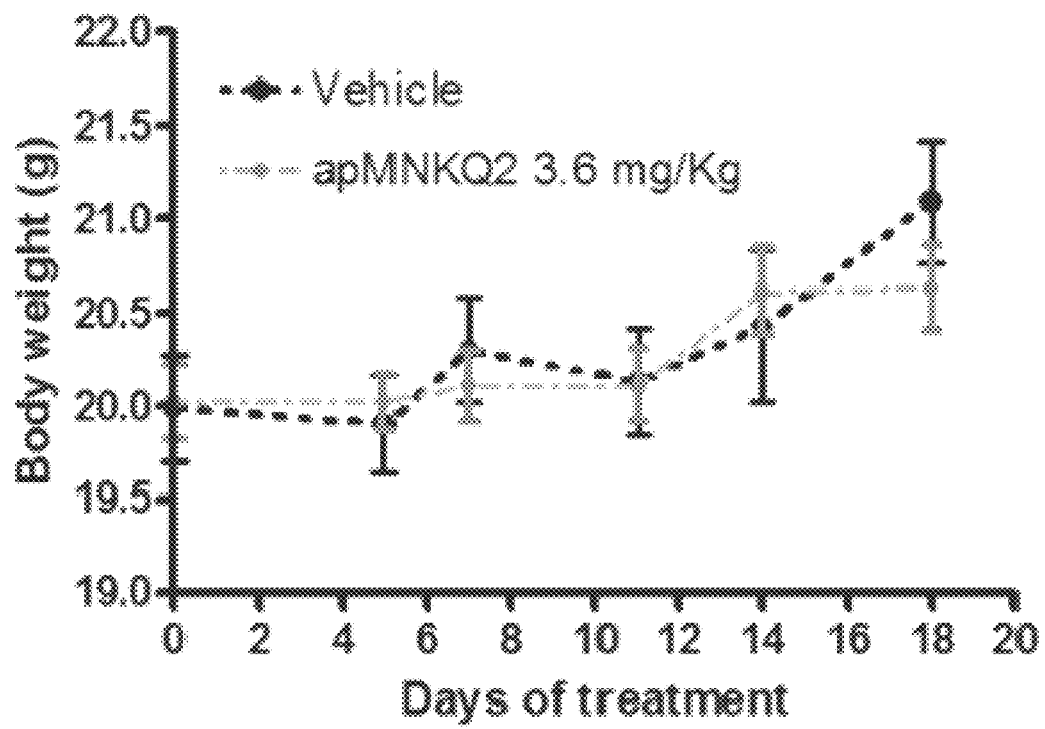
Figure 21D:
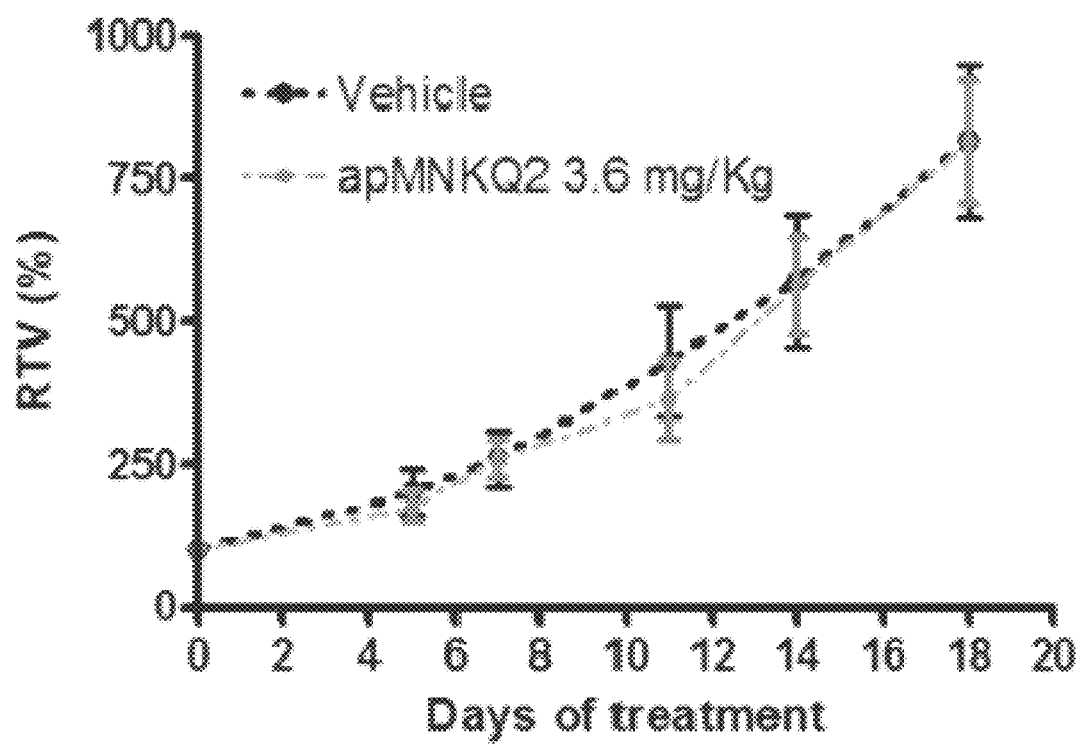
Figure 21E:
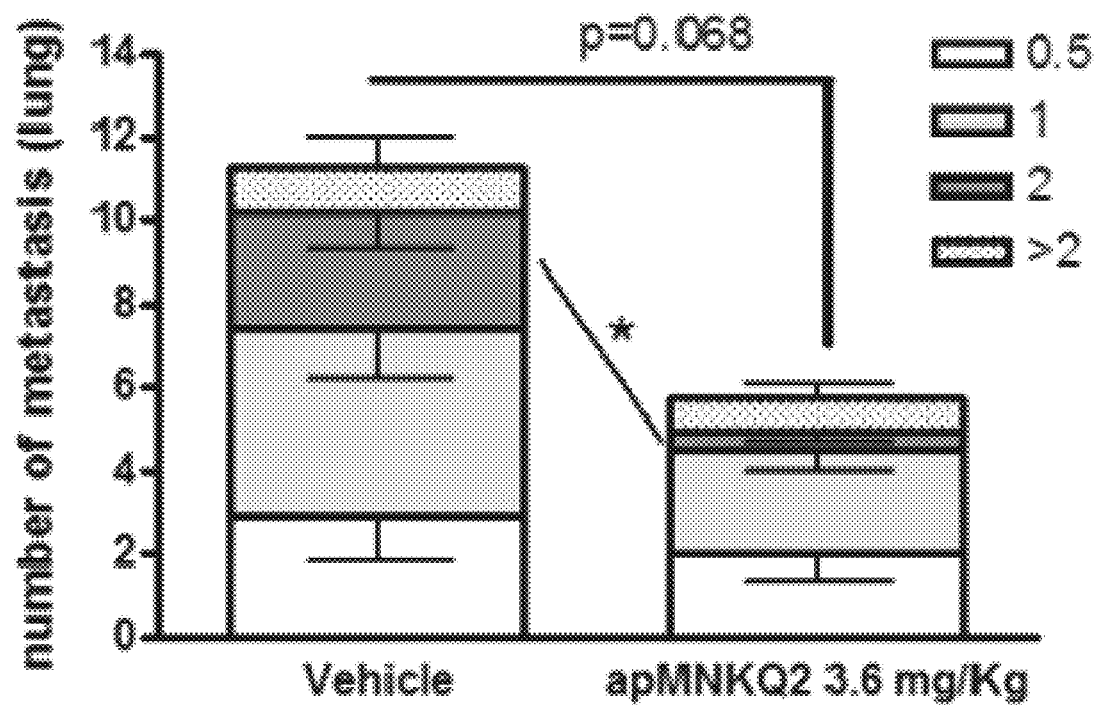

To study the ability of apMNKQ2 to reduce metastasis in vivo, an orthotopic xenograft model with a murine tumor line of triple negative breast cancer, 4T1, was used. These cells have the ability to metastasize in the lung. First, the effect of apMNKQ2 on 4T1 cells in vitro was analyzed. As shown in FIG. 21 (A, B) while the apMNKQ2 aptamer does not affect cell proliferation, as measured by MTT activity, it does significantly decrease the migration and invasion of 4T1 cells. The in vivo assay was performed with an orthotopic model that was inoculated with 4T1 cells. When the tumor reached a volume of 100 mm$^3$, the cells were treated with apMNKQ2 or with the vehicle (control) as described above. The results obtained show that the treatment does not produce changes in the weight of the mice (FIG. 21C) or in the size of the tumors (FIG. 21D). In addition, the number of metastasis decreased after treatment being statistically significant for metastasis of 2 mm (FIG. 21E).

Figure 22A:
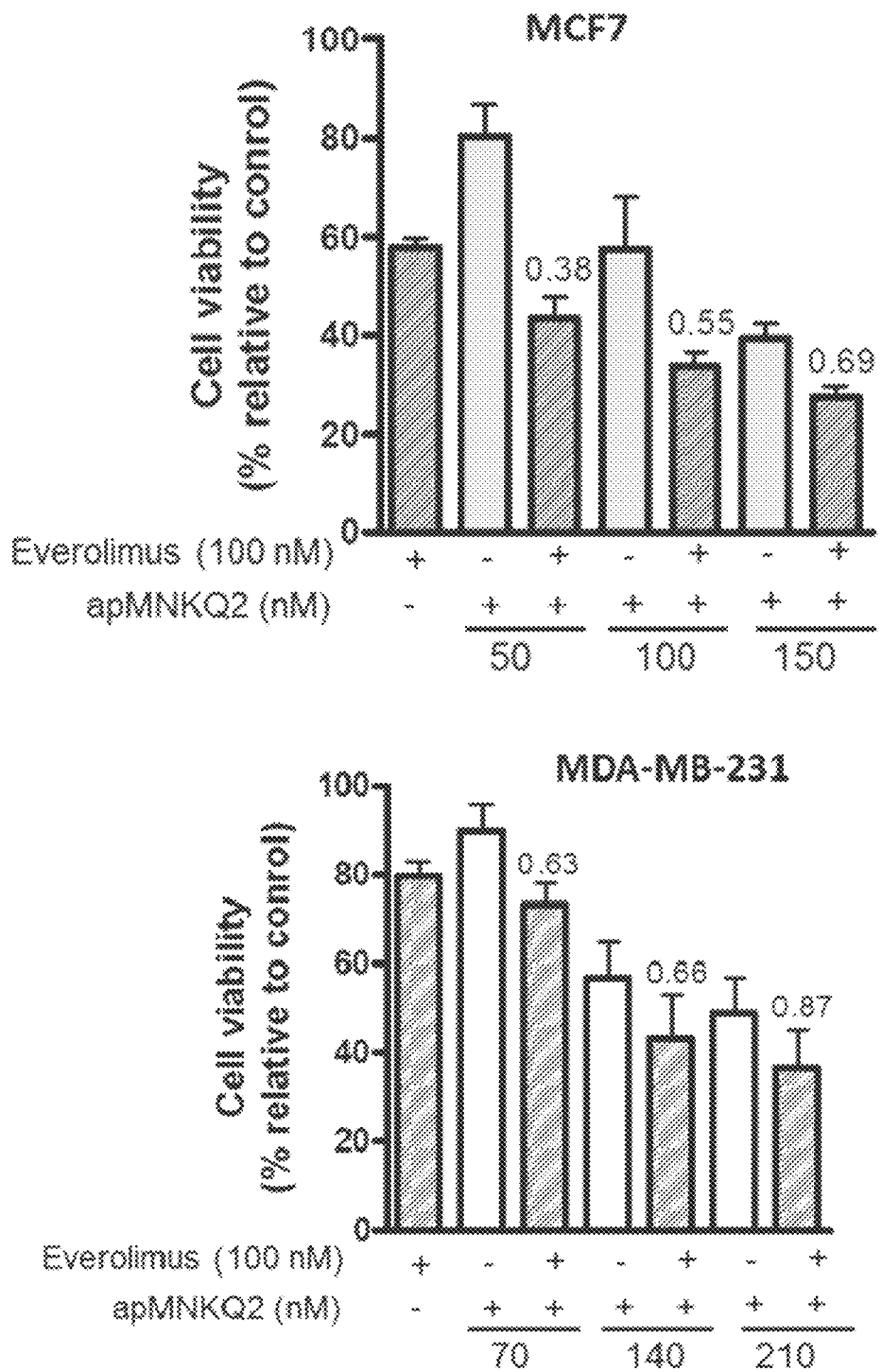
FIG. 22A & 22B. Combined therapy studies of apMNKQ2 and everolimus. (A) MDA-MB-231 and MCF7 cells were seeded in p96 at a density of $10^4$ cells/well. After 16-24 hours they were transfected with apMNKQ2 at the concentrations indicated in the figure (FIG. 22A), after 4 hours the everolimus was added at a concentration of 100 nM and after 72 hours, MTT activity tests were performed. The graphs represent the means±SEM of 3-4 independent experiments. The number on the bars corresponds to the combination index (CI) calculated with the Chou-Talalay method. According to this method, IC values <1 indicate that there is synergy. (B) Western blot of lysates from MDA-MB-231 and control MCF7 cells, treated with apMNKQ2, treated with everolimus and treated with apMNKQ2 and everolimus 24 hours. The different antibodies used are indicated. A representative experiment of three independent experiments is shown (FIG. 22B).
Figure 22B:
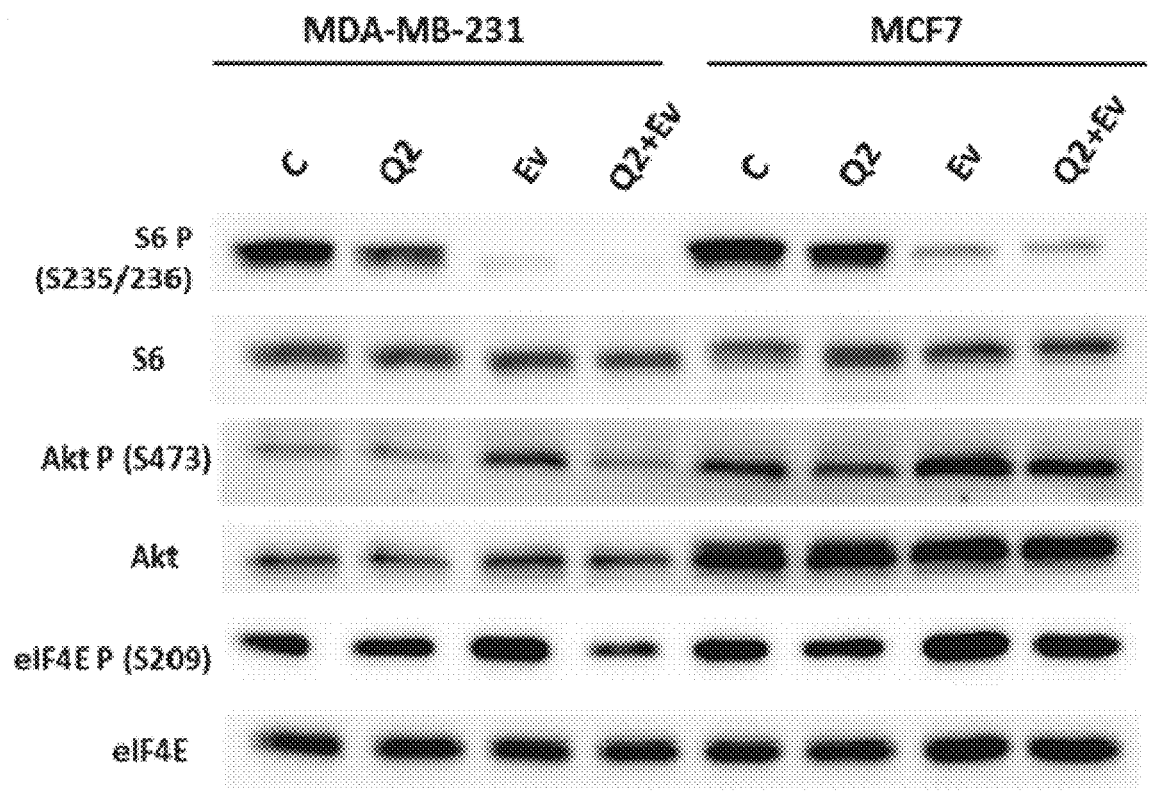

In Vitro Study of the Combined Therapy of apMNKQ2 and the mTOR Inhibitor, Everolimus Everolimus is an mTOR inhibitor that is currently being used in clinic and that in many tumors generates resistance with treatment. It has been shown that this resistance is associated with the increase in phosphorylation of eIF4E, by activation of MNK1, and the phosphorylation of AKT. The MCF7 and MDA-MB-231 breast tumor lines are resistant to everolimus (cells with IC50 greater than 1 nM are considered resistant). To analyze the combined effect of apMNKQ2 with everolimus, cells were transfected with different concentrations of apMNKQ2 and treated with 100 nM everolimus. Seventy-two hours after treatment, MTT activity was measured. The combination index (CI) was calculated using the Chou-Talalay method. According to this method, IC values <1 indicate that there is synergy between the drugs used. The results obtained show that in both tumor lines a synergistic effect of apMNKQ2 aptamer with everolimus is observed at all the apMNKQ2 concentrations studied (FIG. 22A). Western blot analysis of phosphorylation of ribosomal protein S6 (FIG. 22B), phosphorylation dependent on mTOR activity, demonstrates that everolimus is inhibiting mTOR. In addition, apMNKQ2 alone also affects this phosphorylation and the combination of apMNKQ2 and everolimus produces a greater decrease in phosphorylated S6. On the other hand, the phosphorylation of eIF4E and AKT is increased after treatment with everolimus in both cell lines (FIG. 22B), corroborating the resistance to this drug, and apMNKQ2, although it has no effect on the phosphorylations of both proteins, it is capable of very significantly inhibit the effect of everolimus on eIF4EP and AKTP, reversing the mechanisms of resistance of cells to everolimus.

The invention claimed is:

1. An aptamer that binds MAPK interacting serine/threonine protein kinase 1 (MNK1) the aptamer comprising the DNA sequence of SEQ ID NO: 6.

2. The aptamer of claim 1, wherein the DNA sequence is consists of SEQ ID NO: 6.

3. An aptamer that binds MAPK interacting serine/threonine protein kinase 1 (MNK1), the aptamer comprising the DNA sequence of SEQ ID NO: 3.

4. A method for inhibiting the replication of breast cancer cell lines in vitro, the method comprising contacting the aptamer according to claim 1 with a breast-cancer cell line in vitro.

5. A method for inhibiting the replication of breast cancer cell lines in vitro, the method comprising contacting the aptamer according to claim 2 with a breast-cancer cell line in vitro.

6. A method for inhibiting the replication of breast cancer cell lines in vitro, the method comprising contacting the aptamer according to claim 3 with a breast-cancer cell line in vitro.

7. A method for treatment of breast cancer in a human subject in need thereof, the method comprising administering the aptamer according to claim 1 to the subject.

8. A method for treatment of breast cancer in a human subject in need thereof, the method comprising administering the aptamer according to claim 2 to the subject.

9. A method for treatment of breast cancer in a human subject in need thereof, the method comprising administering the aptamer according to claim 3 to the subject.

10. A pharmaceutical composition, comprising at least one aptamer according to claim 1 and a pharmaceutically acceptable vehicle suitable for delivering an active ingredient into a cell by intravenous, cutaneous or subcutaneous injection, or by injection at a site of disease.

11. A pharmaceutical composition, comprising at least one aptamer according to claim 2 and a pharmaceutically acceptable vehicle suitable for delivering an active ingredient into a cell by intravenous, cutaneous or subcutaneous injection, or by injection at a site of disease.

12. A pharmaceutical composition, comprising the aptamer according to claim 3 and a pharmaceutically acceptable vehicle suitable for delivering an active ingredient into a cell by intravenous, cutaneous or subcutaneous injection, or by injection at a site of disease.

13. The pharmaceutical composition according to claim 10, wherein the vehicle is a transfection system.

14. The pharmaceutical composition according to claim 11, wherein the vehicle is a transfection system.

15. The pharmaceutical composition according to claim 12, wherein the vehicle is a transfection system.

* * * * *

SEQUENCE LISTING

<160> NUMBER OF SEQ ID NOS: 8

<210> SEQ ID NO 1
<211> LENGTH: 48
<212> TYPE: DNA
<213> ORGANISM: Artificial Sequence
<220> FEATURE:
<223> OTHER INFORMATION: apMNK2FT
<220> FEATURE:
<221> NAME/KEY: misc_feature
<222> LOCATION: (1)..(48)

<400> SEQUENCE: 1
tttttggggt gggcgggcgg gggtgggggt ggtatggcgc gttggccc                48

<210> SEQ ID NO 2
<211> LENGTH: 18
<212> TYPE: DNA
<213> ORGANISM: Artificial Sequence
<220> FEATURE:
<223> OTHER INFORMATION: apMNKQ1
<220> FEATURE:
<221> NAME/KEY: misc_feature

```
<222> LOCATION: (1)..(18)

<400> SEQUENCE: 2
tggggtgggc gggcgggg                                                    18

<210> SEQ ID NO 3
<211> LENGTH: 29
<212> TYPE: DNA
<213> ORGANISM: Artificial Sequence
<220> FEATURE:
<223> OTHER INFORMATION: apMNKQ2
<220> FEATURE:
<221> NAME/KEY: misc_feature
<222> LOCATION: (1)..(29)

<400> SEQUENCE: 3
tggggtgggc gggcgggggt ggggtggt                                          29

<210> SEQ ID NO 4
<211> LENGTH: 13
<212> TYPE: DNA
<213> ORGANISM: Artificial Sequence
<220> FEATURE:
<223> OTHER INFORMATION: apMNKQ3
<220> FEATURE:
<221> NAME/KEY: misc_feature
<222> LOCATION: (1)..(13)

<400> SEQUENCE: 4
gggtgggggt ggt                                                         13

<210> SEQ ID NO 5
<211> LENGTH: 22
<212> TYPE: DNA
<213> ORGANISM: Artificial Sequence
<220> FEATURE:
<223> OTHER INFORMATION: apMNKQ4
<220> FEATURE:
<221> NAME/KEY: misc_feature
<222> LOCATION: (1)..(22)

<400> SEQUENCE: 5
gggtggtatg gcgcgttggc cc                                               22

<210> SEQ ID NO 6
<211> LENGTH: 29
<212> TYPE: DNA
<213> ORGANISM: Artificial Sequence
<220> FEATURE:
<223> OTHER INFORMATION: aptamer
<220> FEATURE:
<221> NAME/KEY: variation
<222> LOCATION: (14)..(14)
<223> OTHER INFORMATION: g, t, u, or a
<220> FEATURE:
<221> NAME/KEY: variation
<222> LOCATION: (20)..(20)
<223> OTHER INFORMATION: g, c, u, or a
<220> FEATURE:
<221> NAME/KEY: variation
<222> LOCATION: (23)..(23)
<223> OTHER INFORMATION: t
<220> FEATURE:
<221> NAME/KEY: variation
<222> LOCATION: (26)..(26)
<223> OTHER INFORMATION: g, a, u, or c
<220> FEATURE:
<221> NAME/KEY: variation
<222> LOCATION: (29)..(29)
<223> OTHER INFORMATION: g, c, a, or u
```

```
<400> SEQUENCE: 6
tggggtgggc gggcgggggt gggggtggt                                         29

<210> SEQ ID NO 7
<211> LENGTH: 18
<212> TYPE: DNA
<213> ORGANISM: Artificial Sequence
<220> FEATURE:
<223> OTHER INFORMATION: aptamer
<220> FEATURE:
<221> NAME/KEY: variation
<222> LOCATION: (14)..(14)
<223> OTHER INFORMATION: g, t, u, or a

<400> SEQUENCE: 7
tggggtgggc gggcgggg                                                     18

<210> SEQ ID NO 8
<211> LENGTH: 75
<212> TYPE: DNA
<213> ORGANISM: Artificial Sequence
<220> FEATURE:
<223> OTHER INFORMATION: apMNK2F

<400> SEQUENCE: 8
gcggatgaag actggtgtgg ggtgggcggg cgggggtggg ggtggtatgg cgcgttggcc       60
ctaaatacga gcaac                                                        75
```